United States Patent
Liu et al.

(10) Patent No.: US 10,461,800 B2
(45) Date of Patent: Oct. 29, 2019

(54) COMMUNICATION CONTROL METHOD AND RELATED APPARATUS

(71) Applicant: Huawei Technologies Co., Ltd., Shenzhen (CN)

(72) Inventors: Jinnan Liu, Beijing (CN); Chao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 351 days.

(21) Appl. No.: 15/289,254

(22) Filed: Oct. 10, 2016

(65) Prior Publication Data
US 2017/0026073 A1     Jan. 26, 2017

Related U.S. Application Data

(63) Continuation of application No. PCT/CN2014/074906, filed on Apr. 8, 2014.

(51) Int. Cl.
*H04B 1/50* (2006.01)
*H04L 5/14* (2006.01)
(Continued)

(52) U.S. Cl.
CPC ............. *H04B 1/50* (2013.01); *H04L 5/0094* (2013.01); *H04L 5/0096* (2013.01); *H04L 5/14* (2013.01);
(Continued)

(58) Field of Classification Search
CPC .... H04B 1/50; H04B 1/54; H04B 1/56; H04L 5/0094; H04L 5/0096; H04L 5/14;
(Continued)

(56) References Cited

U.S. PATENT DOCUMENTS

2013/0194984 A1    8/2013   Cheng et al.
2014/0348040 A1*  11/2014   Hong .................... H04L 5/0007
                                                                          370/280
(Continued)

FOREIGN PATENT DOCUMENTS

CN          103209415 A      7/2013
CN          103458420 A     12/2013
(Continued)

OTHER PUBLICATIONS

Goyal, S. et al.; "Analyzing a Full-Duplex Cellular System" Polytechnic Institute of New York University, 2013 6 pages.

*Primary Examiner* — Derrick W Ferris
*Assistant Examiner* — Kevin H Lee
(74) *Attorney, Agent, or Firm* — Slater Matsil, LLP

(57) ABSTRACT

A communication control method and a related apparatus are disclosed. A communication control method includes transmitting, by a base station, a configuration message to N user terminals in a cell, where the configuration message carries a secondary configuration indication, and the secondary configuration indication is used to indicate a secondary transmission configuration configured by the base station for the N user terminals, where the secondary transmission configuration of the N user terminals is different from a primary transmission configuration of M user terminals in the cell. The method also includes obtaining, by the base station, interference parameters about interference that the N user terminals receive from neighboring user terminals in a full-duplex subframe, and activating the secondary transmission configuration for K user terminals in the N user terminals by using an activation message.

20 Claims, 11 Drawing Sheets

(51) Int. Cl.
*H04W 72/04* (2009.01)
*H04L 5/00* (2006.01)
*H04W 16/10* (2009.01)
*H04W 72/08* (2009.01)
*H04W 88/08* (2009.01)
*H04W 64/00* (2009.01)

(52) U.S. Cl.
CPC .......... *H04L 5/1461* (2013.01); *H04L 5/1469* (2013.01); *H04W 16/10* (2013.01); *H04W 72/0453* (2013.01); *H04W 72/082* (2013.01); *H04L 5/0053* (2013.01); *H04W 64/00* (2013.01); *H04W 88/08* (2013.01)

(58) Field of Classification Search
CPC .... H04L 5/1461; H04L 5/1469; H04W 16/10; H04W 72/0453
See application file for complete search history.

(56) References Cited

U.S. PATENT DOCUMENTS

| | | | |
|---|---|---|---|
| 2015/0085805 A1 | 3/2015 | Li et al. | |
| 2015/0131494 A1* | 5/2015 | He | H04B 7/0469 370/280 |
| 2017/0005775 A1* | 1/2017 | Cheng | H04L 5/0098 |
| 2017/0064721 A1* | 3/2017 | Noh | H04W 72/082 |

FOREIGN PATENT DOCUMENTS

| | | | |
|---|---|---|---|
| EP | 2858398 A1 | 4/2015 | |
| WO | 2013091187 A1 | 6/2013 | |

\* cited by examiner

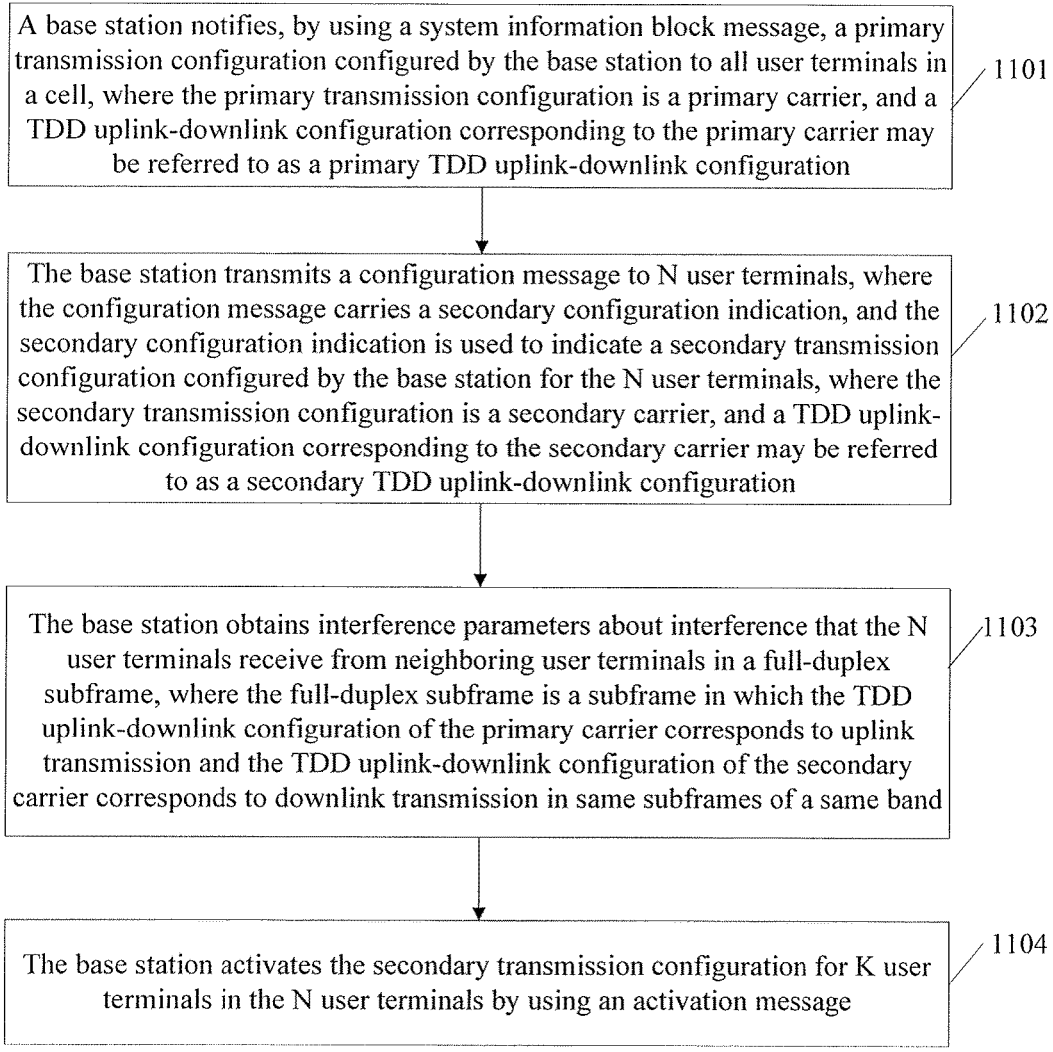
FIG. 11-a

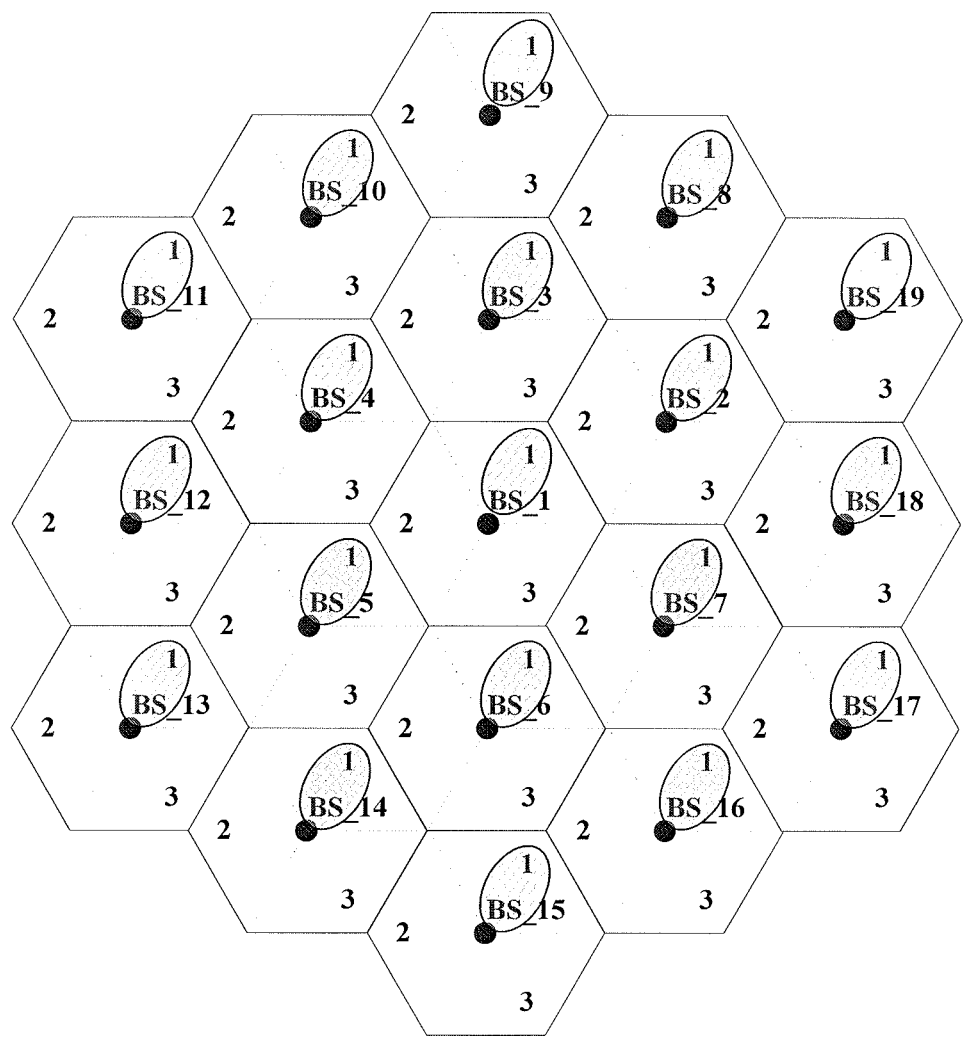
FIG. 11-b

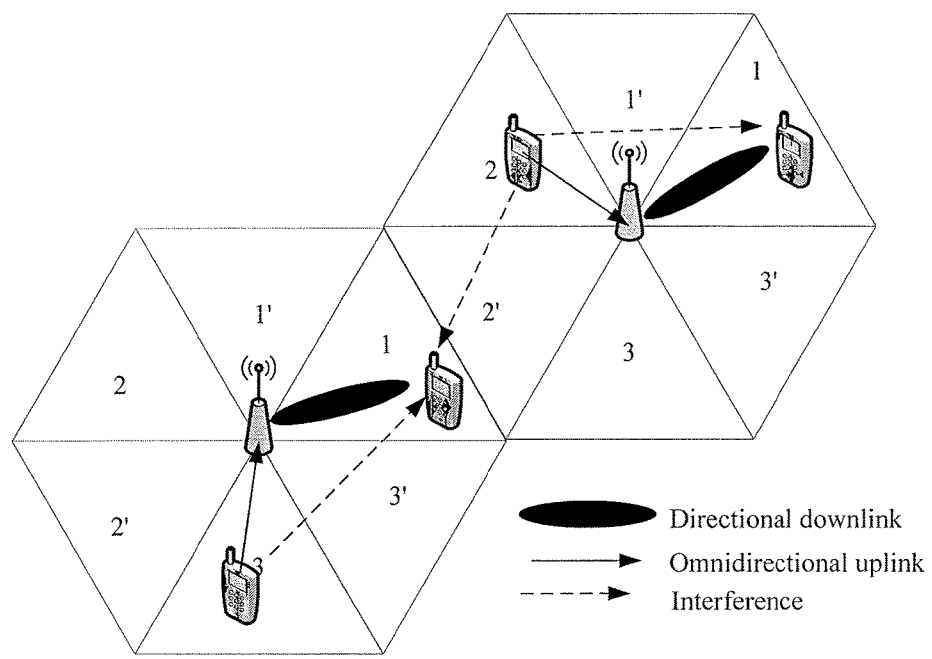
FIG. 11-c
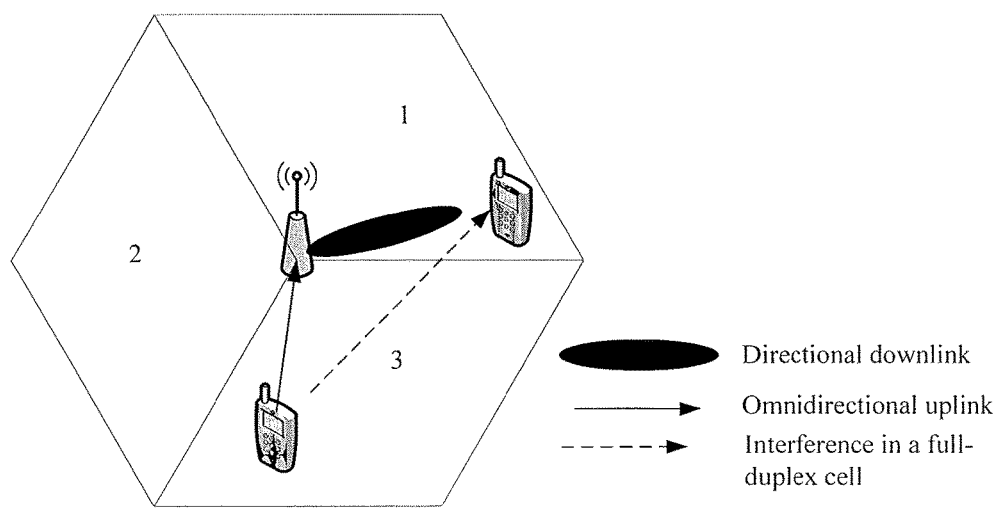
FIG. 11-d

COMMUNICATION CONTROL METHOD AND RELATED APPARATUS

CROSS-REFERENCE TO RELATED APPLICATIONS

This application is a continuation of International Application No. PCT/CN2014/074906, filed on Apr. 8, 2014, the disclosure of which is hereby incorporated by reference in its entirety.

TECHNICAL FIELD

The present invention relates to the field of communications, and in particular, to a communication control method and a related apparatus.

BACKGROUND

Currently, a cellular communications system uses two modes: frequency division duplex (FDD) and time division duplex (TDD). In FDD, reception and transmission are performed on two paired channels that are separated, and an uplink channel and a downlink channel are separated by using a guard band. Therefore, in FDD mode, a terminal device may implement a full-duplex mode to perform reception and transmission in an uplink band and a downlink band simultaneously. In TDD, an uplink channel and a downlink channel are divided by time. Although the uplink channel and the downlink channel use a same frequency, different subframes are used as channel carriers. Therefore, in TDD mode, a terminal device works in half-duplex mode. However, regardless of the FDD mode or TDD mode, within a same frequency or same time, a terminal or a base station is in a receiving or transmitting state only.

Recently, an assumption of single channel full-duplex was proposed by Stanford University, Rice University, and so on. Based on an assumption of receiver self-interference cancellation, this technology cancels interference from a transmitting link to a receiving link, so that data transmission and reception are implemented in a same band. Based on this assumption, a need of paired uplink and downlink bands in the FDD technology may be avoided; a flexible spectrum configuration may be implemented as in TDD; and a problem that only some subframes can be used for uplink or downlink transmission in the TDD technology may be avoided. Therefore, this assumption receives extensive attention in the academic field and industrial field.

Although the single channel full-duplex technology has the foregoing advantages, it is still difficult to apply this technology in a cellular network. Because a full-duplex device requires a large size, the full-duplex technology can hardly be implemented in a user terminal, and may increase implementation complexity and power consumption of the terminal device additionally.

SUMMARY

Embodiments provide a communication control method and a related apparatus to apply a full-duplex technology while minimizing changes to a user terminal.

According to a first aspect, an embodiment provides a base station, which may include a transmitter, configured to transmit a configuration message to N user terminals in a cell, where the configuration message carries a secondary configuration indication, and the secondary configuration indication is used to indicate a secondary transmission configuration configured by the base station for the N user terminals, where the secondary transmission configuration of the N user terminals is different from a primary transmission configuration of M user terminals in the cell, the N user terminals are a subset of the M user terminals, and N and M are positive integers. The base station also includes an obtaining unit, configured to obtain interference parameters about interference that the N user terminals receive from neighboring user terminals in a full-duplex subframe, where the full-duplex subframe is a subframe in which the primary transmission configuration corresponds to uplink transmission and the secondary transmission configuration corresponds to downlink transmission in same subframes of a same band. Additionally, the base station includes an activation control unit, configured to activate the secondary transmission configuration for K user terminals in the N user terminals by using an activation message, where interference parameters about interference that the K user terminals receive from neighboring user terminals meet a specified activation condition, the K user terminals are a subset of the N user terminals, and K is a positive integer. The primary transmission configuration is a primary carrier, and the secondary transmission configuration is a secondary carrier, and an uplink band of the primary carrier is the same as a downlink band of the secondary carrier, and a downlink band of the primary carrier is the same as an uplink band of the secondary carrier; or a band of the primary carrier is the same as a band of the secondary carrier, and a time division duplex (TDD) uplink-downlink configuration of the primary carrier is different from a TDD uplink-downlink configuration of the secondary carrier.

With reference to the first aspect, in a first possible implementation manner of the first aspect, the activation message and/or the configuration message further carry/carries an effective indication parameter, where the effective indication parameter is used to indicate an effective time of the activated secondary transmission configuration.

With reference to the first possible implementation manner of the first aspect, in a second possible implementation manner of the first aspect, the effective indication parameter includes an effective period and an offset, where the configuration message carries the effective period, and the activation message carries the offset, or the configuration message carries the effective period and the offset, or the activation message carries the effective period and the offset.

With reference to the first aspect or the first possible implementation manner of the first aspect or the second possible implementation manner of the first aspect, in a third possible implementation manner of the first aspect, the activated secondary transmission configuration takes effect once, or takes effect multiple times, or takes effect periodically.

With reference to the first aspect or the first possible implementation manner of the first aspect or the second possible implementation manner of the first aspect or the third possible implementation manner of the first aspect, in a fourth possible implementation manner of the first aspect, the activation control unit is further configured to deactivate the activated secondary transmission configuration of some or all user terminals in the K user terminals by using a deactivation message after the secondary transmission configuration is activated for the K user terminals in the N user terminals by using the activation message.

With reference to the first aspect or the first possible implementation manner of the first aspect or the second possible implementation manner of the first aspect or the third possible implementation manner of the first aspect or the fourth possible implementation manner of the first aspect, in a fifth possible implementation manner of the first aspect, the obtaining unit is specifically configured to receive measurement reports reported by the N user terminals, where a measurement report reported by each user terminal in the N user terminals includes an interference parameter about interference that the user terminal receives from a neighboring user terminal in the full-duplex subframe.

With reference to the fifth possible implementation manner of the first aspect, in a sixth possible implementation manner of the first aspect, the interference parameter is used to describe energy of an uplink reference signal of the neighboring user terminal in the full-duplex subframe.

With reference to the sixth possible implementation manner of the first aspect, in a seventh possible implementation manner of the first aspect, the specified activation condition includes: the energy of the uplink reference signal of the neighboring user terminal in the full-duplex subframe, described by the interference parameter, is less than or equal to a first threshold.

With reference to the first aspect or the first possible implementation manner of the first aspect or the second possible implementation manner of the first aspect or the third possible implementation manner of the first aspect or the fourth possible implementation manner of the first aspect, in an eighth possible implementation manner of the first aspect, the obtaining unit is specifically configured to receive location information reported by the N user terminals, and determine, according to the location information reported by the N user terminals, the interference parameters about the interference that the N user terminals receive from the neighboring user terminals in the full-duplex subframe.

With reference to the eighth possible implementation manner of the first aspect, in a ninth possible implementation manner of the first aspect, the interference parameters about the interference that the N user terminals receive from the neighboring user terminals in the full-duplex subframe include physical location distances from the N user terminals to the neighboring user terminals in the full-duplex subframe; and the specified activation condition includes: the physical location distances to the neighboring user terminals in the full-duplex subframe are greater than or equal to a second threshold.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect or the sixth possible implementation manner of the first aspect or the seventh possible implementation manner of the first aspect or the eighth possible implementation manner of the first aspect or the ninth possible implementation manner of the first aspect, in a tenth possible implementation manner of the first aspect, the transmitter is further configured to use directional downlink transmission in the full-duplex subframe, where a beam corresponding to the directional downlink transmission covers at least one user terminal in the K user terminals.

With reference to the tenth possible implementation manner of the first aspect, in an eleventh possible implementation manner of the first aspect, the transmitter is further configured to transmit a directional downlink transmission parameter about the directional downlink transmission used in the full-duplex subframe by the transmitter to a neighboring base station, where the directional downlink transmission parameter includes a beam direction and/or a beam width.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect or the sixth possible implementation manner of the first aspect or the seventh possible implementation manner of the first aspect or the eighth possible implementation manner of the first aspect or the ninth possible implementation manner of the first aspect or the tenth possible implementation manner of the first aspect or the eleventh possible implementation manner of the first aspect, in a twelfth possible implementation manner of the first aspect, the transmitter is further configured to notify the full-duplex subframe to the neighboring base station.

According to a second aspect, an embodiment provides a communications terminal, including a receiver, configured to receive a configuration message from a base station, where the configuration message carries a secondary configuration indication, and the secondary configuration indication is used to indicate a secondary transmission configuration configured by the base station for the communications terminal, where the secondary transmission configuration of the communications terminal is different from a primary transmission configuration of M user terminals in a cell, the communications terminal is one of the M user terminals, and M is a positive integer. The communications terminal also includes a transmitter, configured to report, to the base station, an interference parameter about interference that the communications terminal receives from a neighboring user terminal in a full-duplex subframe. Additionally, the communications terminal includes a transmission control unit, configured to activate, if an activation message is received from the base station, the secondary transmission configuration according to the activation message, where the activation message is transmitted after the base station determines that the interference parameter about the interference that the communications terminal receives from the neighboring user terminal in the full-duplex subframe meets a specified activation condition. The primary transmission configuration is a primary carrier, and the secondary transmission configuration is a secondary carrier, and an uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier.

With reference to the second aspect, in a first possible implementation manner of the second aspect, the activation message and/or the configuration message further carry/carries an effective indication parameter, where the effective indication parameter is used to indicate an effective time of the activated secondary transmission configuration; and the transmission control unit is further configured to allow the secondary transmission configuration activated according to the activation message to take effect at the effective time indicated by the effective indication parameter.

With reference to the first possible implementation manner of the second aspect, in a second possible implementation manner of the second aspect, the effective indication parameter includes an effective period and an offset, where the configuration message carries the effective period, and the activation message carries the offset, or the configuration message carries the effective period and the offset, or the activation message carries the effective period and the offset.

With reference to the second aspect or the first possible implementation manner of the second aspect or the second possible implementation manner of the second aspect, in a third possible implementation manner of the second aspect, the activated secondary transmission configuration takes effect once, or takes effect multiple times, or takes effect periodically.

With reference to the second aspect or the first possible implementation manner of the second aspect or the second possible implementation manner of the second aspect or the third possible implementation manner of the second aspect, in a fourth possible implementation manner of the second aspect, the transmission control unit is further configured to deactivate, if a deactivation message is received from the base station after the activation message is received from the base station, the secondary transmission configuration according to the deactivation message.

With reference to the second aspect or the first possible implementation manner of the second aspect or the second possible implementation manner of the second aspect or the third possible implementation manner of the second aspect or the fourth possible implementation manner of the second aspect, in a fifth possible implementation manner of the second aspect, the transmitter is specifically configured to report a measurement report to the base station, where the measurement report includes the interference parameter about the interference that the communications terminal receives from the neighboring user terminal in the full-duplex subframe.

With reference to the fifth possible implementation manner of the second aspect, in a sixth possible implementation manner of the second aspect, the interference parameter is used to describe energy of an uplink reference signal of the neighboring user terminal in the full-duplex subframe.

With reference to the sixth possible implementation manner of the second aspect, in a seventh possible implementation manner of the second aspect, the specified activation condition includes: the energy of the uplink reference signal of the neighboring user terminal in the full-duplex subframe, described by the interference parameter, is less than or equal to a first threshold.

With reference to the second aspect or the first possible implementation manner of the second aspect or the second possible implementation manner of the second aspect or the third possible implementation manner of the second aspect or the fourth possible implementation manner of the second aspect, in an eighth possible implementation manner of the second aspect, the transmitter is specifically configured to report location information of the communications terminal to the base station, so that the base station determines, according to the location information, the interference parameter about the interference that the communications terminal receives from the neighboring user terminal in the full-duplex subframe.

With reference to the eighth possible implementation manner of the second aspect, in a ninth possible implementation manner of the second aspect, the interference parameter about the interference that the communications terminal receives from the neighboring user terminal in the full-duplex subframe includes a physical location distance from the communications terminal to the neighboring user terminal in the full-duplex subframe; and the specified activation condition includes: the physical location distance to the neighboring user terminal in the full-duplex subframe is greater than a second threshold.

With reference to the second aspect or the first possible implementation manner of the second aspect or the second possible implementation manner of the second aspect or the third possible implementation manner of the second aspect or the fourth possible implementation manner of the second aspect or the fifth possible implementation manner of the second aspect or the sixth possible implementation manner of the second aspect or the seventh possible implementation manner of the second aspect or the eighth possible implementation manner of the second aspect or the ninth possible implementation manner of the second aspect, in a tenth possible implementation manner of the second aspect, when the uplink band of the primary carrier is the same as the downlink band of the secondary carrier, and the downlink band of the primary carrier is the same as the uplink band of the secondary carrier, the transmission control unit is further configured to use the primary carrier and the secondary carrier to perform uplink/downlink transmission independently, or use the primary carrier and the secondary carrier non-simultaneously to perform uplink/downlink transmission independently; or the transmission control unit is further configured to use the primary carrier and the secondary carrier to perform uplink transmission without performing downlink transmission, or the transmission control unit is further configured to use the primary carrier and the secondary carrier to perform downlink transmission without performing uplink transmission.

According to a third aspect, an embodiment provides a base station, which may include: a processor, a memory, and an antenna, where the processor invokes code stored in the memory, so that the processor is configured to transmit a configuration message to N user terminals in a cell by using the antenna, where the configuration message carries a secondary configuration indication, and the secondary configuration indication is used to indicate a secondary transmission configuration configured by the base station for the N user terminals, where the secondary transmission configuration of the N user terminals is different from a primary transmission configuration of M user terminals in the cell, the N user terminals are a subset of the M user terminals, and N and M are positive integers; obtain interference parameters about interference that the N user terminals receive from neighboring user terminals in a full-duplex subframe, where the full-duplex subframe is a subframe in which the primary transmission configuration corresponds to uplink transmission and the secondary transmission configuration corresponds to downlink transmission in same subframes of a same band; and activate the secondary transmission configuration for K user terminals in the N user terminals by using an activation message, where interference parameters about interference that the K user terminals receive from neighboring user terminals meet a specified activation condition, the K user terminals are a subset of the N user terminals, and K is a positive integer; where the primary transmission configuration is a primary carrier, and the secondary transmission configuration is a secondary carrier; and an uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier.

With reference to the third aspect, in a first possible implementation manner of the third aspect, the activation message and/or the configuration message further carry/carries an effective indication parameter, where the effective indication parameter is used to indicate an effective time of the activated secondary transmission configuration.

With reference to the first possible implementation manner of the third aspect, in a second possible implementation manner of the third aspect, the effective indication parameter includes an effective period and an offset, where the configuration message carries the effective period, and the activation message carries the offset, or the configuration message carries the effective period and the offset, or the activation message carries the effective period and the offset.

With reference to the third aspect or the first possible implementation manner of the third aspect or the second possible implementation manner of the third aspect, in a third possible implementation manner of the third aspect, the activated secondary transmission configuration takes effect once, or takes effect multiple times, or takes effect periodically.

With reference to the third aspect or the first possible implementation manner of the third aspect or the second possible implementation manner of the third aspect or the third possible implementation manner of the third aspect, in a fourth possible implementation manner of the third aspect, the processor is further configured to deactivate the activated secondary transmission configuration of some or all user terminals in the K user terminals by using a deactivation message after the secondary transmission configuration is activated for the K user terminals in the N user terminals by using the activation message.

With reference to the third aspect or the first possible implementation manner of the third aspect or the second possible implementation manner of the third aspect or the third possible implementation manner of the third aspect or the fourth possible implementation manner of the third aspect, in a fifth possible implementation manner of the third aspect, in an aspect of obtaining the interference parameters about the interference that the N user terminals receive from the neighboring user terminals in the full-duplex subframe, the processor is specifically configured to receive measurement reports reported by the N user terminals, where a measurement report reported by each user terminal in the N user terminals includes an interference parameter about interference that the user terminal receives from a neighboring user terminal in the full-duplex subframe.

With reference to the fifth possible implementation manner of the third aspect, in a sixth possible implementation manner of the third aspect, the interference parameter is used to describe energy of an uplink reference signal of the neighboring user terminal in the full-duplex subframe.

With reference to the sixth possible implementation manner of the third aspect, in a seventh possible implementation manner of the third aspect, the specified activation condition includes: the energy of the uplink reference signal of the neighboring user terminal in the full-duplex subframe, described by the interference parameter, is less than or equal to a first threshold.

With reference to the third aspect or the first possible implementation manner of the third aspect or the second possible implementation manner of the third aspect or the third possible implementation manner of the third aspect or the fourth possible implementation manner of the third aspect, in an eighth possible implementation manner of the third aspect, in an aspect of obtaining the interference parameters about the interference that the N user terminals receive from the neighboring user terminals in the full-duplex subframe, the processor is specifically configured to receive location information reported by the N user terminals, and determine, according to the location information reported by the N user terminals, the interference parameters about the interference that the N user terminals receive from the neighboring user terminals in the full-duplex subframe.

With reference to the eighth possible implementation manner of the third aspect, in a ninth possible implementation manner of the third aspect, the interference parameters about the interference that the N user terminals receive from the neighboring user terminals in the full-duplex subframe include physical location distances from the N user terminals to the neighboring user terminals in the full-duplex subframe; and the specified activation condition includes: the physical location distances to the neighboring user terminals in the full-duplex subframe are greater than or equal to a second threshold.

With reference to the third aspect or the first possible implementation manner of the third aspect or the second possible implementation manner of the third aspect or the third possible implementation manner of the third aspect or the fourth possible implementation manner of the third aspect or the fifth possible implementation manner of the third aspect or the sixth possible implementation manner of the third aspect or the seventh possible implementation manner of the third aspect or the eighth possible implementation manner of the third aspect or the ninth possible implementation manner of the third aspect, in a tenth possible implementation manner of the third aspect, the processor is further configured to use directional downlink transmission in the full-duplex subframe, where a beam corresponding to the directional downlink transmission covers at least one user terminal in the K user terminals.

With reference to the tenth possible implementation manner of the third aspect, in an eleventh possible implementation manner of the third aspect, the processor is further configured to transmit a directional downlink transmission parameter about the directional downlink transmission used in the full-duplex subframe by the base station to a neighboring base station, where the directional downlink transmission parameter includes a beam direction and/or a beam width.

With reference to the third aspect or the first possible implementation manner of the third aspect or the second possible implementation manner of the third aspect or the third possible implementation manner of the third aspect or the fourth possible implementation manner of the third aspect or the fifth possible implementation manner of the third aspect or the sixth possible implementation manner of the third aspect or the seventh possible implementation manner of the third aspect or the eighth possible implementation manner of the third aspect or the ninth possible implementation manner of the third aspect or the tenth possible implementation manner of the third aspect or the eleventh possible implementation manner of the third aspect, in a twelfth possible implementation manner of the third aspect, the processor is further configured to notify the full-duplex subframe to the neighboring base station.

According to a fourth aspect, an embodiment provides a communications terminal, which may include: a processor, a memory, and an antenna, where the processor invokes code stored in the memory, so that the processor is configured to receive a configuration message from a base station by using the antenna, where the configuration message carries a secondary configuration indication, and the secondary configuration indication is used to indicate a secondary transmission configuration configured by the base station for the communications terminal, where the secondary transmission configuration of the communications terminal is different from a primary transmission configuration of M user terminals in a cell, the communications terminal is one of the M user terminals, and M is a positive integer; report, to the base station, an interference parameter about interference that the communications terminal receives from a neighboring user terminal in a full-duplex subframe; and activate, if an activation message is received from the base station, the secondary transmission configuration according to the activation message, where the activation message is transmitted after the base station determines that the interference parameter about the interference that the communications terminal receives from the neighboring user terminal in the full-duplex subframe meets a specified activation condition; where the primary transmission configuration is a primary carrier, and the secondary transmission configuration is a secondary carrier; and an uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier.

With reference to the fourth aspect, in a first possible implementation manner of the fourth aspect, the activation message and/or the configuration message further carry/carries an effective indication parameter, where the effective indication parameter is used to indicate an effective time of the activated secondary transmission configuration; and the processor is further configured to allow the secondary transmission configuration activated according to the activation message to take effect at the effective time indicated by the effective indication parameter.

With reference to the first possible implementation manner of the fourth aspect, in a second possible implementation manner of the fourth aspect, the effective indication parameter includes an effective period and an offset, where the configuration message carries the effective period, and the activation message carries the offset, or the configuration message carries the effective period and the offset, or the activation message carries the effective period and the offset.

With reference to the fourth aspect or the first possible implementation manner of the fourth aspect or the second possible implementation manner of the fourth aspect, in a third possible implementation manner of the fourth aspect, the activated secondary transmission configuration takes effect once, or takes effect multiple times, or takes effect periodically.

With reference to the fourth aspect or the first possible implementation manner of the fourth aspect or the second possible implementation manner of the fourth aspect or the third possible implementation manner of the fourth aspect, in a fourth possible implementation manner of the fourth aspect, the processor is further configured to deactivate, if a deactivation message is received from the base station after the activation message is received from the base station, the secondary transmission configuration according to the deactivation message.

With reference to the fourth aspect or the first possible implementation manner of the fourth aspect or the second possible implementation manner of the fourth aspect or the third possible implementation manner of the fourth aspect or the fourth possible implementation manner of the fourth aspect, in a fifth possible implementation manner of the fourth aspect, in an aspect of reporting, to the base station, the interference parameter about the interference that the communications terminal receives from the neighboring user terminal in the full-duplex subframe, the processor is specifically configured to report a measurement report to the base station, where the measurement report includes the interference parameter about the interference that the communications terminal receives from the neighboring user terminal in the full-duplex subframe.

With reference to the fifth possible implementation manner of the fourth aspect, in a sixth possible implementation manner of the fourth aspect, the interference parameter is used to describe energy of an uplink reference signal of the neighboring user terminal in the full-duplex subframe.

With reference to the sixth possible implementation manner of the fourth aspect, in a seventh possible implementation manner of the fourth aspect, the specified activation condition includes: the energy of the uplink reference signal of the neighboring user terminal in the full-duplex subframe, described by the interference parameter, is less than or equal to a first threshold.

With reference to the fourth aspect or the first possible implementation manner of the fourth aspect or the second possible implementation manner of the fourth aspect or the third possible implementation manner of the fourth aspect or the fourth possible implementation manner of the fourth aspect, in an eighth possible implementation manner of the fourth aspect, in an aspect of reporting, to the base station, the interference parameter about the interference that the communications terminal receives from the neighboring user terminal in the full-duplex subframe, the processor is specifically configured to report location information of the communications terminal to the base station, so that the base station determines, according to the location information, the interference parameter about the interference that the communications terminal receives from the neighboring user terminal in the full-duplex subframe.

With reference to the eighth possible implementation manner of the fourth aspect, in a ninth possible implementation manner of the fourth aspect, the interference parameter about the interference that the communications terminal receives from the neighboring user terminal in the full-duplex subframe includes a physical location distance from the communications terminal to the neighboring user terminal in the full-duplex subframe; and the specified activation condition includes: the physical location distance to the neighboring user terminal in the full-duplex subframe is greater than a second threshold.

With reference to the fourth aspect or the first possible implementation manner of the fourth aspect or the second possible implementation manner of the fourth aspect or the third possible implementation manner of the fourth aspect or the fourth possible implementation manner of the fourth aspect or the fifth possible implementation manner of the fourth aspect or the sixth possible implementation manner of the fourth aspect or the seventh possible implementation manner of the fourth aspect or the eighth possible implementation manner of the fourth aspect or the ninth possible implementation manner of the fourth aspect, in a tenth possible implementation manner of the fourth aspect, when the uplink band of the primary carrier is the same as the downlink band of the secondary carrier, and the downlink band of the primary carrier is the same as the uplink band of the secondary carrier, the transmission control unit is further configured to use the primary carrier and the secondary carrier to perform uplink/downlink transmission independently, or use the primary carrier and the secondary carrier non-simultaneously to perform uplink/downlink transmission independently; or the transmission control unit is further configured to use the primary carrier and the secondary carrier to perform uplink transmission without performing downlink transmission, or the transmission control unit is further configured to use the primary carrier and the secondary carrier to perform downlink transmission without performing uplink transmission.

According to a fifth aspect, an embodiment provides a communication control method, which may include: transmitting, by a base station, a configuration message to N user terminals in a cell, where the configuration message carries a secondary configuration indication, and the secondary configuration indication is used to indicate a secondary transmission configuration configured by the base station for the N user terminals, where the secondary transmission configuration of the N user terminals is different from a primary transmission configuration of M user terminals in the cell, the N user terminals are a subset of the M user terminals, and N and M are positive integers; obtaining, by the base station, interference parameters about interference that the N user terminals receive from neighboring user terminals in a full-duplex subframe, where the full-duplex subframe is a subframe in which the primary transmission configuration corresponds to uplink transmission and the secondary transmission configuration corresponds to downlink transmission in same subframes of a same band; and activating, by the base station, the secondary transmission configuration for K user terminals in the N user terminals by using an activation message, where interference parameters about interference that the K user terminals receive from neighboring user terminals meet a specified activation condition, the K user terminals are a subset of the N user terminals, and K is a positive integer; where the primary transmission configuration is a primary carrier, and the secondary transmission configuration is a secondary carrier; and an uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier.

With reference to the fifth aspect, in a first possible implementation manner of the fifth aspect, the activation message and/or the configuration message further carry/carries an effective indication parameter, where the effective indication parameter is used to indicate an effective time of the activated secondary transmission configuration.

With reference to the first possible implementation manner of the fifth aspect, in a second possible implementation manner of the fifth aspect, the effective indication parameter includes an effective period and an offset, where the configuration message carries the effective period, and the activation message carries the offset, or the configuration message carries the effective period and the offset, or the activation message carries the effective period and the offset.

With reference to the fifth aspect or the first possible implementation manner of the fifth aspect or the second possible implementation manner of the fifth aspect, in a third possible implementation manner of the fifth aspect, the activated secondary transmission configuration takes effect once, or takes effect multiple times, or takes effect periodically.

With reference to the fifth aspect or the first possible implementation manner of the fifth aspect or the second possible implementation manner of the fifth aspect or the third possible implementation manner of the fifth aspect, in a fourth possible implementation manner of the fifth aspect, after the activating, by the base station, the secondary transmission configuration for K user terminals in the N user terminals by using an activation message, the method further includes: deactivating, by the base station, the activated secondary transmission configuration of some or all user terminals in the K user terminals by using a deactivation message.

With reference to the fifth aspect or the first possible implementation manner of the fifth aspect or the second possible implementation manner of the fifth aspect or the third possible implementation manner of the fifth aspect or the fourth possible implementation manner of the fifth aspect, in a fifth possible implementation manner of the fifth aspect, the obtaining, by the base station, interference parameters about interference that the N user terminals receive from neighboring user terminals in a full-duplex subframe, includes: receiving, by the base station, measurement reports reported by the N user terminals, where a measurement report reported by each user terminal in the N user terminals includes an interference parameter about interference that the user terminal receives from a neighboring user terminal in the full-duplex subframe.

With reference to the fifth possible implementation manner of the fifth aspect, in a sixth possible implementation manner of the fifth aspect, the interference parameter is used to describe energy of an uplink reference signal of the neighboring user terminal in the full-duplex subframe.

With reference to the sixth possible implementation manner of the fifth aspect, in a seventh possible implementation manner of the fifth aspect, the specified activation condition includes: the energy of the uplink reference signal of the neighboring user terminal in the full-duplex subframe, described by the interference parameter, is less than or equal to a first threshold.

With reference to the fifth aspect or the first possible implementation manner of the fifth aspect or the second possible implementation manner of the fifth aspect or the third possible implementation manner of the fifth aspect or the fourth possible implementation manner of the fifth aspect, in an eighth possible implementation manner of the fifth aspect, the obtaining, by the base station, interference parameters about interference that the N user terminals receive from neighboring user terminals in a full-duplex subframe, includes: receiving, by the base station, location information reported by the N user terminals, and determining, according to the location information reported by the N user terminals, the interference parameters about the interference that the N user terminals receive from the neighboring user terminals in the full-duplex subframe.

With reference to the eighth possible implementation manner of the fifth aspect, in a ninth possible implementation manner of the fifth aspect, the interference parameters about the interference that the N user terminals receive from the neighboring user terminals in the full-duplex subframe include physical location distances from the N user terminals to the neighboring user terminals in the full-duplex subframe; and the specified activation condition includes: the physical location distances to the neighboring user terminals in the full-duplex subframe are greater than or equal to a second threshold.

With reference to the fifth aspect or the first possible implementation manner of the fifth aspect or the second possible implementation manner of the fifth aspect or the third possible implementation manner of the fifth aspect or the fourth possible implementation manner of the fifth aspect or the fifth possible implementation manner of the fifth aspect or the sixth possible implementation manner of the fifth aspect or the seventh possible implementation manner of the fifth aspect or the eighth possible implementation manner of the fifth aspect or the ninth possible implementation manner of the fifth aspect, in a tenth possible implementation manner of the fifth aspect, the base station uses directional downlink transmission in the full-duplex subframe, where a beam corresponding to the directional downlink transmission covers at least one user terminal in the K user terminals.

With reference to the tenth possible implementation manner of the fifth aspect, in an eleventh possible implementation manner of the fifth aspect, the method further includes: transmitting, by the base station, a directional downlink transmission parameter about the directional downlink transmission used in the full-duplex subframe by the base station to a neighboring base station, where the directional downlink transmission parameter includes a beam direction and/or a beam width.

With reference to the fifth aspect or the first possible implementation manner of the fifth aspect or the second possible implementation manner of the fifth aspect or the third possible implementation manner of the fifth aspect or the fourth possible implementation manner of the fifth aspect or the fifth possible implementation manner of the fifth aspect or the sixth possible implementation manner of the fifth aspect or the seventh possible implementation manner of the fifth aspect or the eighth possible implementation manner of the fifth aspect or the ninth possible implementation manner of the fifth aspect or the tenth possible implementation manner of the fifth aspect or the eleventh possible implementation manner of the fifth aspect, in a twelfth possible implementation manner of the fifth aspect, the method further includes: notifying, by the base station, the full-duplex subframe to the neighboring base station.

According to a sixth aspect, an embodiment provides a communication control method, which may include: receiving, by a first user terminal, a configuration message from a base station, where the configuration message carries a secondary configuration indication, and the secondary configuration indication is used to indicate a secondary transmission configuration configured by the base station for the first user terminal, where the secondary transmission configuration of the first user terminal is different from a primary transmission configuration of M user terminals in a cell, the first user terminal is one of the M user terminals, and M is a positive integer; reporting, by the first user terminal, to the base station, an interference parameter about interference that the first user terminal receives from a neighboring user terminal in a full-duplex subframe; and if an activation message is received from the base station, activating, by the first user terminal, the secondary transmission configuration according to the activation message, where the activation message is transmitted after the base station determines that the interference parameter about the interference that the first user terminal receives from the neighboring user terminal in the full-duplex subframe meets a specified activation condition; where the primary transmission configuration is a primary carrier, and the secondary transmission configuration is a secondary carrier; and an uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier.

With reference to the sixth aspect, in a first possible implementation manner of the sixth aspect, the activation message and/or the configuration message further carry/carries an effective indication parameter, where the effective indication parameter is used to indicate an effective time of the activated secondary transmission configuration.

With reference to the first possible implementation manner of the sixth aspect, in a second possible implementation manner of the sixth aspect, the effective indication parameter includes an effective period and an offset, where the configuration message carries the effective period, and the activation message carries the offset, or the configuration message carries the effective period and the offset, or the activation message carries the effective period and the offset.

With reference to the sixth aspect or the first possible implementation manner of the sixth aspect or the second possible implementation manner of the sixth aspect, in a third possible implementation manner of the sixth aspect, the activated secondary transmission configuration takes effect once, or takes effect multiple times, or takes effect periodically.

With reference to the sixth aspect or the first possible implementation manner of the sixth aspect or the second possible implementation manner of the sixth aspect or the third possible implementation manner of the sixth aspect, in a fourth possible implementation manner of the sixth aspect, after the activation message is received from the base station, the method further includes: if a deactivation message is received from the base station, deactivating, by the first user terminal, the secondary transmission configuration according to the deactivation message.

With reference to the sixth aspect or the first possible implementation manner of the sixth aspect or the second possible implementation manner of the sixth aspect or the third possible implementation manner of the sixth aspect or the fourth possible implementation manner of the sixth aspect, in a fifth possible implementation manner of the sixth aspect, the reporting, by the first user terminal, to the base station, an interference parameter about interference that the first user terminal receives from a neighboring user terminal in a full-duplex subframe, includes: reporting, by the first user terminal, a measurement report to the base station, where the measurement report includes the interference parameter about the interference that the first user terminal receives from the neighboring user terminal in the full-duplex subframe.

With reference to the fifth possible implementation manner of the sixth aspect, in a sixth possible implementation manner of the sixth aspect, the interference parameter is used to describe energy of an uplink reference signal of the neighboring user terminal in the full-duplex subframe.

With reference to the sixth possible implementation manner of the sixth aspect, in a seventh possible implementation manner of the sixth aspect, the specified activation condition includes: the energy of the uplink reference signal of the neighboring user terminal in the full-duplex subframe, described by the interference parameter, is less than or equal to a first threshold.

With reference to the sixth aspect or the first possible implementation manner of the sixth aspect or the second possible implementation manner of the sixth aspect or the third possible implementation manner of the sixth aspect or the fourth possible implementation manner of the sixth aspect, in an eighth possible implementation manner of the sixth aspect, the reporting, by the first user terminal, to the base station, an interference parameter about interference that the first user terminal receives from a neighboring user terminal in a full-duplex subframe, includes: reporting, by the first user terminal, location information of the first user terminal to the base station, so that the base station determines, according to the location information, the interference parameter about the interference that the first user terminal receives from the neighboring user terminal in the full-duplex subframe.

With reference to the eighth possible implementation manner of the sixth aspect, in a ninth possible implementation manner of the sixth aspect, the interference parameter about the interference that the first user terminal receives from the neighboring user terminal in the full-duplex subframe includes a physical location distance from the first user terminal to the neighboring user terminal in the full-duplex subframe; and the specified activation condition includes: the physical location distance to the neighboring user terminal in the full-duplex subframe is greater than or equal to a second threshold.

With reference to the sixth aspect or the first possible implementation manner of the sixth aspect or the second possible implementation manner of the sixth aspect or the third possible implementation manner of the sixth aspect or the fourth possible implementation manner of the sixth aspect or the fifth possible implementation manner of the sixth aspect or the sixth possible implementation manner of the sixth aspect or the seventh possible implementation manner of the sixth aspect or the eighth possible implementation manner of the sixth aspect or the ninth possible implementation manner of the sixth aspect, in a tenth possible implementation manner of the sixth aspect, when the uplink band of the primary carrier is the same as the downlink band of the secondary carrier, and the downlink band of the primary carrier is the same as the uplink band of the secondary carrier, the first user terminal uses the primary carrier and the secondary carrier to perform uplink/downlink transmission independently, or uses the primary carrier and the secondary carrier non-simultaneously to perform uplink/downlink transmission independently; or the first user terminal uses the primary carrier and the secondary carrier to perform uplink transmission without performing downlink transmission, or the first user terminal uses the primary carrier and the secondary carrier to perform downlink transmission without performing uplink transmission.

According to a seventh aspect, an embodiment provides a computer storage medium, where the computer storage medium stores a program, and when executed, the program includes some or all steps of any communication control method provided by embodiments.

As can be seen from above, in the technical solutions of the embodiments, a base station transmits a configuration message to N user terminals in a cell, where the configuration message carries a secondary configuration indication that is used to indicate a secondary transmission configuration configured by the base station for the N user terminals, where the secondary transmission configuration of the N user terminals is different from a primary transmission configuration of M user terminals in the cell, the N user terminals are a subset of the M user terminals, the primary transmission configuration is a primary carrier, and the secondary transmission configuration is a secondary carrier; an uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier; the base station obtains interference parameters about interference that the N user terminals receive from neighboring user terminals in a full-duplex subframe; and the base station activates the secondary transmission configuration for K user terminals in the N user terminals by using an activation message according to the interference parameters. Because the solutions allow the base station to have a full-duplex communication capability, but a user terminal may still keep a standard frequency division duplex (FDD) or TDD communication capability, in this communication architecture, enhancing the base station through upgrade may increase a capacity of an entire system. It can be seen that the solutions help to apply a full-duplex technology while minimizing changes to a user terminal.

BRIEF DESCRIPTION OF THE DRAWINGS

To describe the technical solutions in the embodiments more clearly, the following briefly describes the accompanying drawings required for describing the embodiments. Apparently, the accompanying drawings in the following description show merely some embodiments, and a person of ordinary skill in the art may still derive other drawings from these accompanying drawings without creative efforts.

FIG. 11-a is a schematic flowchart of another communication control method according to an embodiment;

FIG. 11-b is a schematic diagram of directional transmission according to an embodiment;

FIG. 11-c is a schematic diagram of interference in directional transmission according to an embodiment;

FIG. 11-d is a schematic diagram of interference in another directional transmission according to an embodiment.

DETAILED DESCRIPTION OF ILLUSTRATIVE EMBODIMENTS

Embodiments provide a communication control method and a related apparatus, which help to apply a full-duplex technology while minimizing changes to a user terminal.

To make the embodiment objectives, features, and advantages of the embodiments clearer and more comprehensible, the following clearly describes the technical solutions in the embodiments with reference to the accompanying drawings in the embodiments. Apparently, the embodiments described in the following are merely some but not all of the embodiments. All other embodiments obtained by a person of ordinary skill in the art based on the embodiments without creative efforts shall fall within the protection scope.

In the specification, claims, and accompanying drawings of the embodiments, the terms "first", "second", "third", "fourth", and so on are intended to distinguish between different objects but are not intended to describe a specific order. In addition, the terms "including", "having", and any other variant thereof, are intended to cover a non-exclusive inclusion. For example, a process, method, system, product, or device that includes a series of steps or units is not limited to the expressly listed steps or units, but optionally further includes other steps or units that are not expressly listed, or optionally further includes other steps or units that are inherent to the process, method, product, or device.

Figure 1:
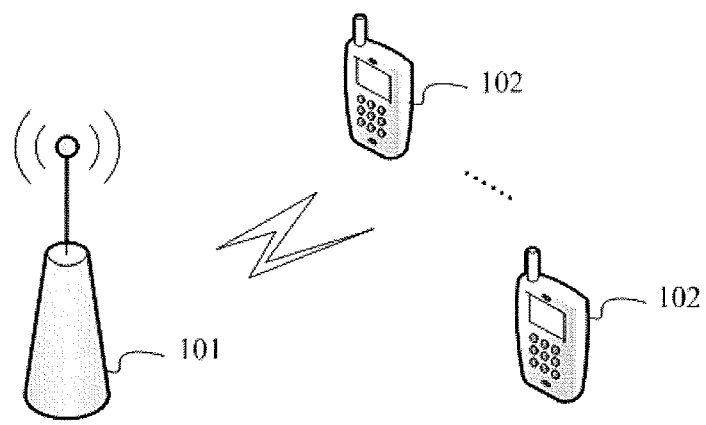
FIG. 1 is a schematic diagram of a communications system according to an embodiment.

First, referring to FIG. 1, an embodiment provides a communications system, which may include a base station 101 and M user terminals 102, where the base station 101 has wireless connections with the M user terminals 102.

The base station 101 is configured to transmit a configuration message to N user terminals 102 in a cell, where the configuration message carries a secondary configuration indication, and the secondary configuration indication is used to indicate a secondary transmission configuration configured by the base station for the N user terminals, where the secondary transmission configuration of the N user terminals 102 is different from a primary transmission configuration of the M user terminals in the cell, the N user terminals are a subset of the M user terminals 102, and N and M are positive integers; obtain interference parameters about interference that the N user terminals receive from neighboring user terminals in a full-duplex subframe, where the full-duplex subframe is a subframe in which the primary transmission configuration corresponds to uplink transmission and the secondary transmission configuration corresponds to downlink transmission in same subframes of a same band; and activate the secondary transmission configuration for K user terminals in the N user terminals by using an activation message, where interference parameters about interference that the K user terminals receive from neighboring user terminals meet a specified activation condition, the K user terminals are a subset of the N user terminals, and K is a positive integer; where the primary transmission configuration is a primary carrier, and the secondary transmission configuration is a secondary carrier; and an uplink band of the primary carrier is the same as a downlink band of the secondary carrier, and a downlink band of the primary carrier is the same as an uplink band of the secondary carrier; or a band of the primary carrier is the same as a band of the secondary carrier, and a time division duplex (TDD) uplink-downlink configuration of the primary carrier is different from a TDD uplink-downlink configuration of the secondary carrier.

The M user terminals 102 may be some or all user terminals in the cell.

It is understandable that the base station 101 configures the same secondary transmission configuration for the N user terminals 102.

For example, N is 1, 2, 3, 5, 10, 20, 30, 50, 100, or any other value.

In some embodiments, the base station 101 may obtain the interference parameters about the interference that the N user terminals receive from the neighboring user terminals in some or all full-duplex subframes. For example, the base station 101 may explicitly or implicitly indicate a to-be-measured full-duplex subframe to the N user terminals, and the N user terminals may report, to the base station 101, the interference parameters about the interference that the N user terminals receive from the neighboring user terminals in the to-be-measured full-duplex subframe indicated by the base station 101. Certainly, the N user terminals may also voluntarily report, to the base station 101, the interference parameters about the interference that the N user terminals receive from the neighboring user terminals in some or all full-duplex subframes.

For example, the base station 101 may explicitly indicate a to-be-measured full-duplex subframe to the N user terminals, that is, transmit an explicit measurement request to the N user terminals, instructing the user terminals to perform interference measurement based on a particular time-frequency resource, where the particular time-frequency resource may be the full-duplex subframe. Alternatively, the base station 101 may implicitly indicate a to-be-measured full-duplex subframe to the N user terminals, that is, the N user terminals receive the secondary transmission configuration, and the N terminals may determine a location of the full-duplex subframe by comparing the secondary transmission configuration with the primary transmission configuration, and perform interference measurement based on the full-duplex subframe.

It should be noted that the secondary transmission configuration configured by the base station 101 for the user terminals, and in particular, the full-duplex subframe, do not necessarily take effect immediately. For example, after the secondary transmission configuration is configured, for a user terminal for which the secondary transmission configuration is not configured, the full-duplex subframe is still an uplink subframe, but for a user terminal for which the secondary transmission configuration is configured, the full-duplex subframe may be considered as a blank subframe that can be used for measurement, that is, in the blank subframe, the user terminal for which the secondary transmission configuration is configured does not transmit an uplink signal, and does not receive a downlink signal from the base station 101. Some or all blank subframes may be used as subframes for measurement.

After the secondary transmission configuration is activated, the base station 101 may perform communication with the K user terminals according to the secondary transmission configuration in an effective period of the secondary transmission configuration. Certainly, after the secondary transmission configuration is activated, the base station 101 may still perform communication with the K user terminals according to the primary transmission configuration in a period in which the secondary transmission configuration is not effective. The foregoing periods may be, for example, radio frames. Certainly, the foregoing periods may also be other granularities. For example, the foregoing periods may be subframes or timeslots. In the 3rd Generation Partnership Project (3GPP), one radio frame is 10 milliseconds, and one radio frame includes 10 subframes or 20 timeslots.

In some embodiments, the activation message and/or the configuration message may further carry an effective indication parameter, where the effective indication parameter is used to indicate an effective time of the activated secondary transmission configuration. Certainly, the activation message and/or the configuration message may also not carry the effective indication parameter, and the K user terminals may allow the activated secondary transmission configuration to take effect according to a prescribed effective time. For example, the K user terminals may prescribe that the configuration takes effect in a $u^{th}$ radio frame after the activation message is delivered.

In some embodiments, the effective indication parameter may include, for example, an effective period and/or an offset. For example, the configuration message may carry the effective period, and the activation message may carry the offset; or the configuration message may carry the effective period and the offset; or the activation message may carry the effective period and the offset.

In some embodiments, assuming that the configuration message carries the effective period and that the activation message carries the offset, the base station 101, for example, may configure the secondary transmission configuration for multiple user terminals by using the same configuration message or by using different offsets in the activation message (for example, different user terminals may correspond to different offsets), so as to implement fair scheduling for the user terminals as much as possible and alleviate a problem of interference between the user terminals.

In some embodiments, the effective indication parameter indicates that the activated secondary transmission configuration takes effect once, or takes effect multiple times (for example, 2 times, 4 times, 8 times, 16 times, 32 times, or other times), or takes effect periodically (the effective period for taking effect periodically may be indicated by the base station 101 or prescribed in advance or prescribed by a protocol). In a scenario in which the configuration takes effect once or takes effect for finite times (for example, 2 times, 4 times, 8 times, 16 times, 32 times, or other times), the base station 101 may not need to indicate the effective time of the secondary transmission configuration by using the effective indication parameter. For example, it may be prescribed that the configuration takes effect in the $u^{th}$ radio frame after the activation message is delivered.

In some embodiments, when the uplink band of the primary carrier is the same as the downlink band of the secondary carrier, and the downlink band of the primary carrier is the same as the uplink band of the secondary carrier, a first user terminal in the K user terminals, for example, may use the primary carrier and the secondary carrier to perform uplink/downlink transmission independently, or use the primary carrier and the secondary carrier non-simultaneously to perform uplink/downlink transmission independently; or the first user terminal uses the primary carrier and the secondary carrier to perform uplink transmission without performing downlink transmission, or the first user terminal uses the primary carrier and the secondary carrier to perform downlink transmission without performing uplink transmission, where the first user terminal may be any user terminal in the K user terminals.

In some embodiments, the base station 101 may be further configured to deactivate the activated secondary transmission configuration of some or all user terminals in the K user terminals by using a deactivation message after the secondary transmission configuration is activated for the K user terminals in the N user terminals by using the activation message. It is understandable that introduction of a mechanism for activating and deactivating the secondary transmission configuration helps to improve flexibility of using the secondary transmission configuration.

Certainly, in some scenarios in which the secondary transmission configuration takes effect only once or several times, the base station 101 may also not perform the operation of deactivating the secondary transmission configuration, because the secondary transmission configuration loses effectiveness automatically after it takes effect only once or several times. It is understandable that introduction of a mechanism for automatically deactivating the secondary transmission configuration helps to reduce control signaling overheads.

An interference parameter about interference that a user terminal receives from a neighboring user terminal in the full-duplex subframe may be various parameters that can be used to represent or obtain strength of the interference that the user terminal receives from the neighboring user terminal in the full-duplex subframe.

In some embodiments, that the base station 101 obtains interference parameters about interference that the N user terminals receive from neighboring user terminals in a full-duplex subframe may include: the base station 101 receives measurement reports reported by the N user terminals, where a measurement report reported by each user terminal in the N user terminals includes an interference parameter about interference that the user terminal receives from a neighboring user terminal in the full-duplex subframe.

For example, the interference parameter is used to describe energy of an uplink reference signal of the neighboring user terminal in the full-duplex subframe. For example, the specified activation condition may include: the energy of the uplink reference signal of the neighboring user terminal in the full-duplex subframe, described by the interference parameter, is less than or equal to a first threshold. For example, the first threshold may be −100 dBm, −80 dBm, −50 dBm, −40 dBm, −30 dBm, or other values that may meet requirements in actual scenarios. For example, a value range of the first threshold may be −100 dBm to −30 dBm. Certainly, the first threshold may also have other value ranges that meet requirements in actual scenarios.

In other embodiments, that the base station 101 obtains interference parameters about interference that the N user terminals receive from neighboring user terminals in a full-duplex subframe, for example, may include: the base station 101 receives location information reported by the N user terminals, and determines, according to the location information reported by the N user terminals, the interference parameters about the interference that the N user terminals receive from the neighboring user terminals in the full-duplex subframe.

For example, the interference parameters about the interference that the N user terminals receive from the neighboring user terminals in the full-duplex subframe may include physical location distances from the N user terminals to the neighboring user terminals in the full-duplex subframe. The specified activation condition may include: the physical location distances to the neighboring user terminals in the full-duplex subframe are greater than or equal to a second threshold.

For example, the second threshold may be 10 meters, 15 meters, 20 meters, 30 meters, 50 meters, or other values that may meet requirements in actual scenarios.

In some embodiments, the base station 101 may be further configured to use directional downlink transmission in the full-duplex subframe, where a beam corresponding to the directional downlink transmission covers at least one user terminal in the K user terminals. The use of directional downlink transmission in the full-duplex subframe by the base station 101 helps to reduce interference from the base station 101 to a neighboring base station 101 in uplink reception and further increase a system capacity.

In some embodiments, the base station 101 may be further configured to transmit a directional downlink transmission parameter about the directional downlink transmission used in the full-duplex subframe by the base station 101 to the neighboring base station 101, where the directional downlink transmission parameter includes a beam direction and/or a beam width and so on. The base station 101 transmits the directional downlink transmission parameter to the neighboring base station 101, so that the neighboring base station 101 may perform interference coordination processing accordingly, which further helps to reduce inter-cell interference and further increase the system capacity.

In some embodiments, the base station 101 may be further configured to notify the full-duplex subframe to the neighboring base station 101. The base station 101 notifies the full-duplex subframe to the neighboring base station 101, so that the neighboring base station 101 may perform interference coordination processing accordingly, which further helps to reduce inter-cell interference and further increase the system capacity.

As can be seen from above, in the technical solution of this embodiment, a base station 101 transmits a configuration message to N user terminals in a cell, where the configuration message carries a secondary configuration indication that is used to indicate a secondary transmission configuration configured by the base station 101 for the N user terminals, where the secondary transmission configuration of the N user terminals is different from a primary transmission configuration of M user terminals in the cell, the N user terminals are a subset of the M user terminals, the primary transmission configuration may be a primary carrier, and the secondary transmission configuration is a secondary carrier; an uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier; the base station 101 obtains interference parameters about interference that the N user terminals receive from neighboring user terminals in a full-duplex subframe; and the base station 101 activates the secondary transmission configuration for K user terminals in the N user terminals by using an activation message according to the interference parameters. Because the solution allows the base station 101 to have a full-duplex communication capability, but a user terminal device still keeps a standard frequency division duplex (FDD) or TDD communication capability, in this communication architecture, enhancing the base station 101 through upgrade may increase a capacity of an entire system. It can be seen that the solution helps to apply a full-duplex technology while minimizing changes to a user terminal.

Further, because the base station 101 activates the secondary transmission configuration for the K user terminals in the N user terminals by using the activation message according to the obtained interference parameters about the interference that the N user terminals receive from the neighboring user terminals in the full-duplex subframe, the base station 101 can implement interference controllability to some extent during data transmission in the full-duplex subframe. This helps to reduce mutual interference in full-duplex communication and further helps to ensure communication quality.

Figure 2:
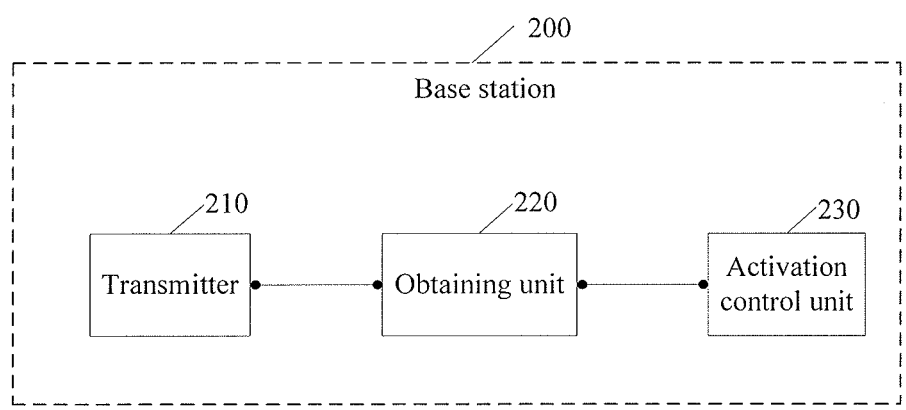
FIG. 2 is a schematic diagram of a base station according to an embodiment.

Referring to FIG. 2, an embodiment provides a base station 200, which may include a transmitter 210, an obtaining unit 220, and an activation control unit 230.

The transmitter 210 is configured to transmit a configuration message to N user terminals in a cell, where the configuration message carries a secondary configuration indication, and the secondary configuration indication is used to indicate a secondary transmission configuration configured by the base station for the N user terminals, where the secondary transmission configuration of the N user terminals is different from a primary transmission configuration of M user terminals in the cell, the N user terminals are a subset of the M user terminals, and N and M are positive integers.

The obtaining unit 220 is configured to obtain interference parameters about interference that the N user terminals receive from neighboring user terminals in a full-duplex subframe, where the full-duplex subframe is a subframe in which the primary transmission configuration corresponds to uplink transmission and the secondary transmission configuration corresponds to downlink transmission in same subframes of a same band.

The activation control unit 230 is configured to activate the secondary transmission configuration for K user terminals in the N user terminals by using an activation message, where interference parameters about interference that the K user terminals receive from neighboring user terminals meet a specified activation condition, the K user terminals are a subset of the N user terminals, and K is a positive integer.

The primary transmission configuration is a primary carrier, and the secondary transmission configuration is a secondary carrier.

An uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier.

In some embodiments, the activation message and/or the configuration message further carry/carries an effective indication parameter, where the effective indication parameter is used to indicate an effective time of the activated secondary transmission configuration.

In some embodiments, the effective indication parameter includes an effective period and an offset, where the configuration message carries the effective period, and the activation message carries the offset, or the configuration message carries the effective period and the offset, or the activation message carries the effective period and the offset.

In some embodiments, the activated secondary transmission configuration takes effect once, or takes effect multiple times, or takes effect periodically.

In some embodiments, the activation control unit 230 is further configured to deactivate the activated secondary transmission configuration of some or all user terminals in the K user terminals by using a deactivation message after the secondary transmission configuration is activated for the K user terminals in the N user terminals by using the activation message.

In some embodiments, the obtaining unit 220 is specifically configured to receive measurement reports reported by the N user terminals, where a measurement report reported by each user terminal in the N user terminals includes an interference parameter about interference that the user terminal receives from a neighboring user terminal in the full-duplex subframe.

In some embodiments, the interference parameter is used to describe energy of an uplink reference signal of the neighboring user terminal in the full-duplex subframe.

In some embodiments, the specified activation condition may include: the energy of the uplink reference signal of the neighboring user terminal in the full-duplex subframe, described by the interference parameter, is less than or equal to a first threshold.

In some embodiments, the obtaining unit 220 is specifically configured to receive location information reported by the N user terminals, and determine, according to the location information reported by the N user terminals, the interference parameters about the interference that the N user terminals receive from the neighboring user terminals in the full-duplex subframe.

In some embodiments, the interference parameters about the interference that the N user terminals receive from the neighboring user terminals in the full-duplex subframe may include physical location distances from the N user terminals to the neighboring user terminals in the full-duplex subframe. The specified activation condition includes: physical location distances to the neighboring user terminals in the full-duplex subframe are greater than or equal to a second threshold.

In some embodiments, the transmitter 210 may be further configured to use directional downlink transmission in the full-duplex subframe, where a beam corresponding to the directional downlink transmission covers at least one user terminal in the K user terminals.

In some embodiments, the transmitter 210 may be further configured to transmit a directional downlink transmission parameter about the directional downlink transmission used in the full-duplex subframe by the transmitter 210 to a neighboring base station, where the directional downlink transmission parameter includes a beam direction and/or a beam width.

In some embodiments, the transmitter 210 is further configured to notify the full-duplex subframe to the neighboring base station.

It is understandable that, functions of each functional module of the base station 200 in this embodiment may be specifically implemented according to a method in a following method embodiment. For a specific implementation process thereof, reference may be made to a related description in the foregoing method embodiment, and details are not described herein.

As can be seen from above, in the solution of this embodiment, a base station 200 transmits a configuration message to N user terminals in a cell, where the configuration message carries a secondary configuration indication that is used to indicate a secondary transmission configuration configured by the base station for the N user terminals, where the secondary transmission configuration of the N user terminals is different from a primary transmission configuration of M user terminals in the cell, the N user terminals are a subset of the M user terminals, the primary transmission configuration may be a primary carrier, and the secondary transmission configuration is a secondary carrier; an uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier; the base station obtains interference parameters about interference that the N user terminals receive from neighboring user terminals in a full-duplex subframe; and the base station activates the secondary transmission configuration for K user terminals in the N user terminals by using an activation message according to the interference parameters. Because the solution allows the base station to have a full-duplex communication capability, but a user terminal device still keeps a standard FDD or TDD communication capability, in this communication architecture, enhancing the base station through upgrade may increase a capacity of an entire system. It can be seen that the solution helps to apply a full-duplex technology while minimizing changes to a user terminal.

Further, because the base station activates the secondary transmission configuration for the K user terminals in the N user terminals by using the activation message according to the obtained interference parameters about the interference that the N user terminals receive from the neighboring user terminals in the full-duplex subframe, the base station can implement interference controllability to some extent during data transmission in the full-duplex subframe. This helps to reduce mutual interference in full-duplex communication and further helps to ensure communication quality.

Figure 3:
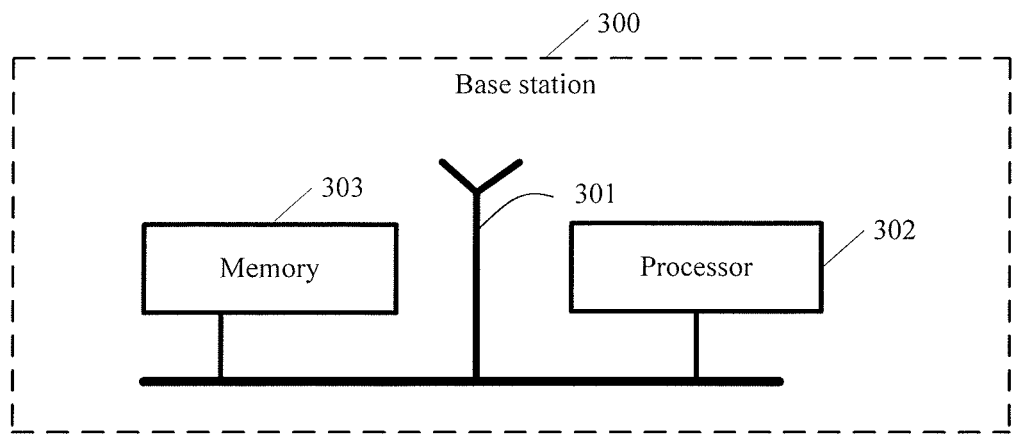
FIG. 3 is a schematic diagram of another base station according to an embodiment.

Referring to FIG. 3, FIG. 3 is a schematic diagram of a base station 300 according to an embodiment. The base station 300 may include a processor 302, a memory 303, and an antenna 301.

The processor 302 invokes code stored in the memory 303, so that the processor 302 is configured to transmit a configuration message to N user terminals in a cell by using the antenna 301, where the configuration message carries a secondary configuration indication, and the secondary configuration indication is used to indicate a secondary transmission configuration configured by the base station for the N user terminals, where the secondary transmission configuration of the N user terminals is different from a primary transmission configuration of M user terminals in the cell, the N user terminals are a subset of the M user terminals, and N and M are positive integers; obtain interference parameters about interference that the N user terminals receive from neighboring user terminals in a full-duplex subframe, where the full-duplex subframe is a subframe in which the primary transmission configuration corresponds to uplink transmission and the secondary transmission configuration corresponds to downlink transmission in same subframes of a same band; and activate the secondary transmission configuration for K user terminals in the N user terminals by using an activation message, where interference parameters about interference that the K user terminals receive from neighboring user terminals meet a specified activation condition, the K user terminals are a subset of the N user terminals, and K is a positive integer; where the primary transmission configuration is a primary carrier, and the secondary transmission configuration is a secondary carrier; and an uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier.

The M user terminals may be some or all user terminals in the cell.

It is understandable that the processor 302 configures the same secondary transmission configuration for the N user terminals.

For example, N is 1, 2, 3, 5, 10, 20, 30, 50, 100, or any other value.

In some embodiments, the processor 302 may obtain the interference parameters about the interference that the N user terminals receive from the neighboring user terminals in some or all full-duplex subframes. For example, the processor 302 may explicitly or implicitly indicate a to-be-measured full-duplex subframe to the N user terminals, and the N user terminals may report, to the base station 300, the interference parameters about the interference that the N user terminals receive from the neighboring user terminals in the to-be-measured full-duplex subframe indicated by the base station 300. Certainly, the N user terminals may also voluntarily report, to the base station 300, the interference parameters about the interference that the N user terminals receive from the neighboring user terminals in some or all full-duplex subframes.

For example, the processor 302 may explicitly indicate a to-be-measured full-duplex subframe to the N user terminals, that is, transmit an explicit measurement request to the N user terminals, instructing the user terminals to perform interference measurement based on a particular time-frequency resource, where the particular time-frequency resource may be the full-duplex subframe. Alternatively, the processor 302 may implicitly indicate a to-be-measured full-duplex subframe to the N user terminals, that is, the N user terminals receive the secondary transmission configuration, and the N terminals may determine a location of the full-duplex subframe by comparing the secondary transmission configuration with the primary transmission configuration, and perform interference measurement based on the full-duplex subframe.

It should be noted that the secondary transmission configuration configured by the processor 302 for the user terminals, and in particular, the full-duplex subframe, do not necessarily take effect immediately. For example, after the secondary transmission configuration is configured, for a user terminal for which the secondary transmission configuration is not configured, the full-duplex subframe is still an uplink subframe, but for a user terminal for which the secondary transmission configuration is configured, the full-duplex subframe may be considered as a blank subframe that can be used for measurement, that is, in the blank subframe, the user terminal for which the secondary transmission configuration is configured does not transmit an uplink signal, and does not receive a downlink signal from the base station. Some or all blank subframes may be used as subframes for measurement.

After the secondary transmission configuration is activated, the processor 302 may perform communication with the K user terminals according to the secondary transmission configuration in an effective period of the secondary transmission configuration. Certainly, after the secondary transmission configuration is activated, the processor 302 may still perform communication with the K user terminals according to the primary transmission configuration in a period in which the secondary transmission configuration is not effective. The foregoing periods may be, for example, radio frames. Certainly, the foregoing periods may also be other granularities. For example, the foregoing periods may be subframes or timeslots.

In some embodiments, the activation message and/or the configuration message may further carry an effective indication parameter, where the effective indication parameter is used to indicate an effective time of the activated secondary transmission configuration. Certainly, the activation message and/or the configuration message may also not carry the effective indication parameter, and the K user terminals may allow the activated secondary transmission configuration to take effect according to a prescribed effective time. For example, the K user terminals may prescribe that the configuration takes effect in a $u^{th}$ radio frame after the activation message is delivered.

In some embodiments, the effective indication parameter may include, for example, an effective period and/or an offset. For example, the configuration message may carry the effective period, and the activation message may carry the offset; or the configuration message may carry the effective period and the offset; or the activation message may carry the effective period and the offset.

In some embodiments, assuming that the configuration message carries the effective period and that the activation message carries the offset, the processor 302, for example, may configure the secondary transmission configuration for multiple user terminals by using the same configuration message or by using different offsets in the activation message (for example, different user terminals may correspond to different offsets), so as to implement fair scheduling for the user terminals as much as possible and alleviate a problem of interference between the user terminals.

In some embodiments, the effective indication parameter indicates that the activated secondary transmission configuration takes effect once, or takes effect multiple times (for example, 2 times, 4 times, 8 times, 13 times, 32 times, or other times), or takes effect periodically (the effective period for taking effect periodically may be indicated by the base station or prescribed in advance or prescribed by a protocol). In a scenario in which the configuration takes effect once or takes effect for finite times (for example, 2 times, 4 times, 8 times, 13 times, 32 times, or other times), the base station may not need to indicate the effective time of the secondary transmission configuration by using the effective indication parameter. For example, it may be prescribed that the configuration takes effect in the $u^{th}$ radio frame after the activation message is delivered.

In some embodiments, when the uplink band of the primary carrier is the same as the downlink band of the secondary carrier, and the downlink band of the primary carrier is the same as the uplink band of the secondary carrier, a first user terminal in the K user terminals, for example, may use the primary carrier and the secondary carrier to perform uplink/downlink transmission independently, or use the primary carrier and the secondary carrier non-simultaneously to perform uplink/downlink transmission independently; or the first user terminal uses the primary carrier and the secondary carrier to perform uplink transmission without performing downlink transmission, or the first user terminal uses the primary carrier and the secondary carrier to perform downlink transmission without performing uplink transmission, where the first user terminal may be any user terminal in the K user terminals.

In some embodiments, after the processor 302 activates the secondary transmission configuration for the K user terminals in the N user terminals by using the activation message, the following may be further included: the processor 302 deactivates the activated secondary transmission configuration of some or all user terminals in the K user terminals by using a deactivation message. It is understandable that introduction of a mechanism for activating and deactivating the secondary transmission configuration helps to improve flexibility of using the secondary transmission configuration.

Certainly, in some scenarios in which the secondary transmission configuration takes effect only once or several times, the base station may also not perform the operation of deactivating the secondary transmission configuration, because the secondary transmission configuration loses effectiveness automatically after it takes effect only once or several times. It is understandable that introduction of a mechanism for automatically deactivating the secondary transmission configuration helps to reduce control signaling overheads.

An interference parameter about interference that a user terminal receives from a neighboring user terminal in the full-duplex subframe may be various parameters that can be used to represent or obtain strength of the interference that the user terminal receives from the neighboring user terminal in the full-duplex subframe.

In some embodiments, that the processor 302 obtains interference parameters about interference that the N user terminals receive from neighboring user terminals in a full-duplex subframe may include: the processor 302 receives measurement reports reported by the N user terminals, where a measurement report reported by each user terminal in the N user terminals includes an interference parameter about interference that the user terminal receives from a neighboring user terminal in the full-duplex subframe.

For example, the interference parameter is used to describe energy of an uplink reference signal of the neighboring user terminal in the full-duplex subframe. For example, the specified activation condition may include: the energy of the uplink reference signal of the neighboring user terminal in the full-duplex subframe, described by the interference parameter, is less than or equal to a first threshold. For example, the first threshold may be −100 dBm, −80 dBm, −50 dBm, −40 dBm, 30 dBm, or other values that may meet requirements in actual scenarios. For example, a value range of the first threshold may be −100 dBm to −30 dBm. Certainly, the first threshold may also have other value ranges that meet requirements in actual scenarios.

In other embodiments, that the processor 302 obtains interference parameters about interference that the N user terminals receive from neighboring user terminals in a full-duplex subframe, for example, may include: the processor 302 receives location information reported by the N user terminals, and determines, according to the location information reported by the N user terminals, the interference parameters about the interference that the N user terminals receive from the neighboring user terminals in the full-duplex subframe.

For example, the interference parameters about the interference that the N user terminals receive from the neighboring user terminals in the full-duplex subframe may include physical location distances from the N user terminals to the neighboring user terminals in the full-duplex subframe. The specified activation condition may include: the physical location distances to the neighboring user terminals in the full-duplex subframe are greater than or equal to a second threshold.

For example, the second threshold may be 10 meters, 15 meters, 20 meters, 30 meters, 50 meters, or other values that may meet requirements in actual scenarios.

In some embodiments, the processor 302 may use directional downlink transmission in the full-duplex subframe, where a beam corresponding to the directional downlink transmission covers at least one user terminal in the K user terminals. The use of directional downlink transmission in the full-duplex subframe by the processor 302 helps to reduce interference from the base station to a neighboring base station in uplink reception and further increase a system capacity.

In some embodiments, the processor 302 may further transmit a directional downlink transmission parameter about the directional downlink transmission used in the full-duplex subframe by the base station to the neighboring base station, where the directional downlink transmission parameter includes a beam direction and/or a beam width and so on. The processor 302 transmits the directional downlink transmission parameter to the neighboring base station, so that the neighboring base station may perform interference coordination processing accordingly, which further helps to reduce inter-cell interference and further increase the system capacity.

In some embodiments, the processor 302 may also notify the full-duplex subframe to the neighboring base station. The processor 302 notifies the full-duplex subframe to the neighboring base station, so that the neighboring base station may perform interference coordination processing accordingly, which further helps to reduce inter-cell interference and further increase the system capacity.

It is understandable that, functions of each functional module of the base station 300 in this embodiment may be specifically implemented according to a method in a following method embodiment. For a specific implementation process thereof, reference may be made to a related description in the foregoing method embodiment, and details are not described herein.

As can be seen from above, in the solution of this embodiment, a base station 300 transmits a configuration message to N user terminals in a cell, where the configuration message carries a secondary configuration indication that is used to indicate a secondary transmission configuration configured by the base station for the N user terminals, where the secondary transmission configuration of the N user terminals is different from a primary transmission configuration of M user terminals in the cell, the N user terminals are a subset of the M user terminals, the primary transmission configuration may be a primary carrier, and the secondary transmission configuration is a secondary carrier; an uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier; the base station obtains interference parameters about interference that the N user terminals receive from neighboring user terminals in a full-duplex subframe; and the base station activates the secondary transmission configuration for K user terminals in the N user terminals by using an activation message according to the interference parameters. Because the solution allows the base station to have a full-duplex communication capability, but a user terminal device still keeps a standard FDD or TDD communication capability, in this communication architecture, enhancing the base station through upgrade may increase a capacity of an entire system. It can be seen that the solution helps to apply a full-duplex technology while minimizing changes to a user terminal.

Further, because the base station activates the secondary transmission configuration for the K user terminals in the N user terminals by using the activation message according to the obtained interference parameters about the interference that the N user terminals receive from the neighboring user terminals in the full-duplex subframe, the base station can implement interference controllability to some extent during data transmission in the full-duplex subframe. This helps to reduce mutual interference in full-duplex communication and further helps to ensure communication quality.

Figure 4:
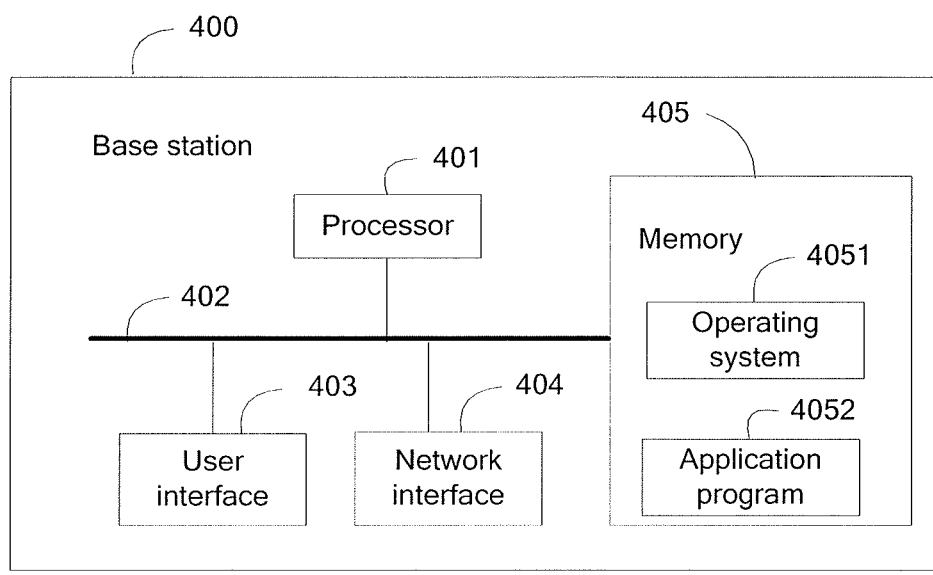
FIG. 4 is a schematic diagram of another base station according to an embodiment.

Referring to FIG. 4, FIG. 4 is a structural block diagram of a base station 400 according to another embodiment.

The base station 400 may include at least one processor 401, at least one network interface 404 or another user interface 403, a memory 405, and at least one communications bus 402. The communications bus 402 is configured to implement connections and communication between the components. The base station 400 optionally includes the user interface 403, including a display (for example, a touchscreen, an LCD, a CRT, a holographic (Holographic), or a projector (Projector)), a pointing device (for example, a mouse, a trackball (trackball), a touchpad, or a touchscreen), a camera, and/or a pickup apparatus, and so on.

The memory 405, for example, may include a read-only memory and a random access memory, and provide an instruction and data for the processor 401.

A part of the memory 405 further includes a non-volatile memory (NVRAM) and so on.

In some implementation manners, the memory 405 stores the following elements: an executable module or data structure, or a subset thereof, or an extended set thereof: an operating system 4051, including various system programs, used to implement various basic services and process hardware-based tasks; and an application program module 4052, including various application programs and configured to implement various application services.

In the embodiment, by invoking a program or an instruction stored in the memory 405, the processor 401 transmits a configuration message to N user terminals in a cell, where the configuration message carries a secondary configuration indication, and the secondary configuration indication is used to indicate a secondary transmission configuration configured by the base station for the N user terminals, where the secondary transmission configuration of the N user terminals is different from a primary transmission configuration of M user terminals in the cell, the N user terminals are a subset of the M user terminals, and N and M are positive integers; obtains interference parameters about interference that the N user terminals receive from neighboring user terminals in a full-duplex subframe, where the full-duplex subframe is a subframe in which the primary transmission configuration corresponds to uplink transmission and the secondary transmission configuration corresponds to downlink transmission in same subframes of a same band; and activates the secondary transmission configuration for K user terminals in the N user terminals by using an activation message, where interference parameters about interference that the K user terminals receive from neighboring user terminals meet a specified activation condition, the K user terminals are a subset of the N user terminals, and K is a positive integer; where the primary transmission configuration is a primary carrier, and the secondary transmission configuration is a secondary carrier; and an uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier.

The M user terminals may be some or all user terminals in the cell.

It is understandable that the processor 401 configures the same secondary transmission configuration for the N user terminals.

For example, N is 1, 2, 3, 5, 10, 20, 30, 50, 100, or any other value.

In some embodiments, the processor 401 may obtain the interference parameters about the interference that the N user terminals receive from the neighboring user terminals in some or all full-duplex subframes. For example, the processor 401 may explicitly or implicitly indicate a to-be-measured full-duplex subframe to the N user terminals, and the N user terminals may report, to the base station 400, the interference parameters about the interference that the N user terminals receive from the neighboring user terminals in the to-be-measured full-duplex subframe indicated by the base station 400. Certainly, the N user terminals may also voluntarily report, to the base station 400, the interference parameters about the interference that the N user terminals receive from the neighboring user terminals in some or all full-duplex subframes.

For example, the processor 401 may explicitly indicate a to-be-measured full-duplex subframe to the N user terminals, that is, transmit an explicit measurement request to the N user terminals, instructing the user terminals to perform interference measurement based on a particular time-frequency resource, where the particular time-frequency resource may be the full-duplex subframe. Alternatively, the processor 401 may implicitly indicate a to-be-measured full-duplex subframe to the N user terminals, that is, the N user terminals receive the secondary transmission configuration, and the N terminals may determine a location of the full-duplex subframe by comparing the secondary transmission configuration with the primary transmission configuration, and perform interference measurement based on the full-duplex subframe.

It should be noted that the secondary transmission configuration configured by the processor 401 for the user terminals, and in particular, the full-duplex subframe, do not necessarily take effect immediately. For example, after the secondary transmission configuration is configured, for a user terminal for which the secondary transmission configuration is not configured, the full-duplex subframe is still an uplink subframe, but for a user terminal for which the secondary transmission configuration is configured, the full-duplex subframe may be considered as a blank subframe that can be used for measurement, that is, in the blank subframe, the user terminal for which the secondary transmission configuration is configured does not transmit an uplink signal, and does not receive a downlink signal from the base station. Some or all blank subframes may be used as subframes for measurement.

After the secondary transmission configuration is activated, the processor 401 may perform communication with the K user terminals according to the secondary transmission configuration in an effective period of the secondary transmission configuration. Certainly, after the secondary transmission configuration is activated, the processor 401 may still perform communication with the K user terminals according to the primary transmission configuration in a period in which the secondary transmission configuration is not effective. The foregoing periods may be, for example, radio frames. Certainly, the foregoing periods may also be other granularities. For example, the foregoing periods may be subframes or timeslots.

In some embodiments, the activation message and/or the configuration message may further carry an effective indication parameter, where the effective indication parameter is used to indicate an effective time of the activated secondary transmission configuration. Certainly, the activation message and/or the configuration message may also not carry the effective indication parameter, and the K user terminals may allow the activated secondary transmission configuration to take effect according to a prescribed effective time. For example, the K user terminals may prescribe that the configuration takes effect in a $u^{th}$ radio frame after the activation message is delivered.

In some embodiments, the effective indication parameter may include, for example, an effective period and/or an offset. For example, the configuration message may carry the effective period, and the activation message may carry the offset; or the configuration message may carry the effective period and the offset; or the activation message may carry the effective period and the offset.

In some embodiments, assuming that the configuration message carries the effective period and that the activation message carries the offset, the processor 401, for example, may configure the secondary transmission configuration for multiple user terminals by using the same configuration message or by using different offsets in the activation message (for example, different user terminals may correspond to different offsets), so as to implement fair scheduling for the user terminals as much as possible and alleviate a problem of interference between the user terminals.

In some embodiments, the effective indication parameter indicates that the activated secondary transmission configuration takes effect once, or takes effect multiple times (for example, 2 times, 4 times, 8 times, 16 times, 32 times, or other times), or takes effect periodically (the effective period for taking effect periodically may be indicated by the base station or prescribed in advance or prescribed by a protocol). In a scenario in which the configuration takes effect once or takes effect for finite times (for example, 2 times, 4 times, 8 times, 16 times, 32 times, or other times), the base station may not need to indicate the effective time of the secondary transmission configuration by using the effective indication parameter. For example, it may be prescribed that the configuration takes effect in the $u^{th}$ radio frame after the activation message is delivered.

In some embodiments, when the uplink band of the primary carrier is the same as the downlink band of the secondary carrier, and the downlink band of the primary carrier is the same as the uplink band of the secondary carrier, a first user terminal in the K user terminals, for example, may use the primary carrier and the secondary carrier to perform uplink/downlink transmission independently, or use the primary carrier and the secondary carrier non-simultaneously to perform uplink/downlink transmission independently; or the first user terminal uses the primary carrier and the secondary carrier to perform uplink transmission without performing downlink transmission, or the first user terminal uses the primary carrier and the secondary carrier to perform downlink transmission without performing uplink transmission, where the first user terminal may be any user terminal in the K user terminals.

In some embodiments, after the processor 401 activates the secondary transmission configuration for the K user terminals in the N user terminals by using the activation message, the following may be further included: the processor 401 deactivates the activated secondary transmission configuration of some or all user terminals in the K user terminals by using a deactivation message. It is understandable that introduction of a mechanism for activating and deactivating the secondary transmission configuration helps to improve flexibility of using the secondary transmission configuration.

Certainly, in some scenarios in which the secondary transmission configuration takes effect only once or several times, the base station may also not perform the operation of deactivating the secondary transmission configuration, because the secondary transmission configuration loses effectiveness automatically after it takes effect only once or several times. It is understandable that introduction of a mechanism for automatically deactivating the secondary transmission configuration helps to reduce control signaling overheads.

An interference parameter about interference that a user terminal receives from a neighboring user terminal in the full-duplex subframe may be various parameters that can be used to represent or obtain strength of the interference that the user terminal receives from the neighboring user terminal in the full-duplex subframe.

In some embodiments, that the processor 401 obtains interference parameters about interference that the N user terminals receive from neighboring user terminals in a full-duplex subframe may include: the processor 401 receives measurement reports reported by the N user terminals, where a measurement report reported by each user terminal in the N user terminals includes an interference parameter about interference that the user terminal receives from a neighboring user terminal in the full-duplex subframe.

For example, the interference parameter is used to describe energy of an uplink reference signal of the neighboring user terminal in the full-duplex subframe. For example, the specified activation condition may include: the energy of the uplink reference signal of the neighboring user terminal in the full-duplex subframe, described by the interference parameter, is less than or equal to a first threshold. For example, the first threshold may be −100 dBm, −80 dBm, −50 dBm, −40 dBm, −30 dBm, or other values that may meet requirements in actual scenarios. For example, a value range of the first threshold may be −100 dBm to −30 dBm. Certainly, the first threshold may also have other value ranges that meet requirements in actual scenarios.

In other embodiments, that the processor 401 obtains interference parameters about interference that the N user terminals receive from neighboring user terminals in a full-duplex subframe, for example, may include: the processor 401 receives location information reported by the N user terminals, and determines, according to the location information reported by the N user terminals, the interference parameters about the interference that the N user terminals receive from the neighboring user terminals in the full-duplex subframe.

For example, the interference parameters about the interference that the N user terminals receive from the neighboring user terminals in the full-duplex subframe may include physical location distances from the N user terminals to the neighboring user terminals in the full-duplex subframe. The specified activation condition may include: the physical location distances to the neighboring user terminals in the full-duplex subframe are greater than or equal to a second threshold.

For example, the second threshold may be 10 meters, 15 meters, 20 meters, 30 meters, 50 meters, or other values that may meet requirements in actual scenarios.

In some embodiments, the processor 401 may use directional downlink transmission in the full-duplex subframe, where a beam corresponding to the directional downlink transmission covers at least one user terminal in the K user terminals. The use of directional downlink transmission in the full-duplex subframe by the processor 401 helps to reduce interference from the base station to a neighboring base station in uplink reception and further increase a system capacity.

In some embodiments, the processor 401 may further transmit a directional downlink transmission parameter about the directional downlink transmission used in the full-duplex subframe by the base station to the neighboring base station, where the directional downlink transmission parameter includes a beam direction and/or a beam width and so on. The processor 401 transmits the directional downlink transmission parameter to the neighboring base station, so that the neighboring base station may perform interference coordination processing accordingly, which further helps to reduce inter-cell interference and further increase the system capacity.

In some embodiments, the processor 401 may also notify the full-duplex subframe to the neighboring base station. The processor 401 notifies the full-duplex subframe to the neighboring base station, so that the neighboring base station may perform interference coordination processing accordingly, which further helps to reduce inter-cell interference and further increase the system capacity.

It is understandable that, functions of each functional module of the base station 400 in this embodiment may be specifically implemented according to a method in a following method embodiment. For a specific implementation process thereof, reference may be made to a related description in the foregoing method embodiment, and details are not described herein.

As can be seen from above, in the solution of this embodiment, a base station 400 transmits a configuration message to N user terminals in a cell, where the configuration message carries a secondary configuration indication that is used to indicate a secondary transmission configuration configured by the base station for the N user terminals, where the secondary transmission configuration of the N user terminals is different from a primary transmission configuration of M user terminals in the cell, the N user terminals are a subset of the M user terminals, the primary transmission configuration may be a primary carrier, and the secondary transmission configuration is a secondary carrier; an uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier; the base station obtains interference parameters about interference that the N user terminals receive from neighboring user terminals in a full-duplex subframe; and the base station activates the secondary transmission configuration for K user terminals in the N user terminals by using an activation message according to the interference parameters. Because the solution allows the base station to have a full-duplex communication capability, but a user terminal device still keeps a standard FDD or TDD communication capability, in this communication architecture, enhancing the base station through upgrade may increase a capacity of an entire system. It can be seen that the solution helps to apply a full-duplex technology while minimizing changes to a user terminal.

Further, because the base station activates the secondary transmission configuration for the K user terminals in the N user terminals by using the activation message according to the obtained interference parameters about the interference that the N user terminals receive from the neighboring user terminals in the full-duplex subframe, the base station can implement interference controllability to some extent during data transmission in the full-duplex subframe. This helps to reduce mutual interference in full-duplex communication and further helps to ensure communication quality.

Figure 5:
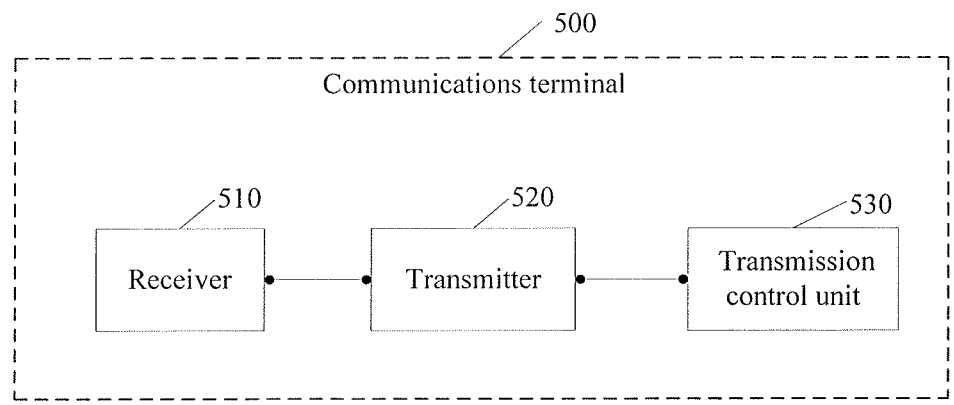
FIG. 5 is a schematic diagram of a communications terminal according to an embodiment.

Referring to FIG. 5, an embodiment provides a communications terminal 500, which may include: a receiver 510, a transmitter 520, and a transmission control unit 530.

The receiver 510 is configured to receive a configuration message from a base station.

The configuration message carries a secondary configuration indication, and the secondary configuration indication is used to indicate a secondary transmission configuration configured by the base station for the communications terminal, where the secondary transmission configuration of the communications terminal is different from a primary transmission configuration of M user terminals in a cell, the communications terminal is one of the M user terminals, and M is a positive integer.

The transmitter 520 is configured to report, to the base station, an interference parameter about interference that the communications terminal receives from a neighboring user terminal in a full-duplex subframe.

The transmission control unit 530 is configured to activate, if an activation message is received from the base station, the secondary transmission configuration according to the activation message, where the activation message is transmitted after the base station determines that the interference parameter about the interference that the communications terminal receives from the neighboring user terminal in the full-duplex subframe meets a specified activation condition.

The primary transmission configuration is a primary carrier, and the secondary transmission configuration is a secondary carrier.

An uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier.

In some embodiments, the activation message and/or the configuration message further carry/carries an effective indication parameter, where the effective indication parameter is used to indicate an effective time of the activated secondary transmission configuration and the transmission control unit 530 is further configured to allow the secondary transmission configuration activated according to the activation message to take effect at the effective time indicated by the effective indication parameter.

In some embodiments, the effective indication parameter includes an effective period and an offset, where the configuration message carries the effective period, and the activation message carries the offset, or the configuration message carries the effective period and the offset, or the activation message carries the effective period and the offset.

In some embodiments, the activated secondary transmission configuration takes effect once, or takes effect multiple times, or takes effect periodically.

In some embodiments, the transmission control unit 530 is further configured to deactivate, if a deactivation message is received from the base station after the activation message is received from the base station, the secondary transmission configuration according to the deactivation message.

In some embodiments, the transmitter 520 may be specifically configured to report a measurement report to the base station, where the measurement report includes the interference parameter about the interference that the communications terminal receives from the neighboring user terminal in the full-duplex subframe.

In some embodiments, the interference parameter is used to describe energy of an uplink reference signal of the neighboring user terminal in the full-duplex subframe.

In some embodiments, the specified activation condition includes: the energy of the uplink reference signal of the neighboring user terminal in the full-duplex subframe, described by the interference parameter, is less than or equal to a first threshold.

In other embodiments, the transmitter 520 may be specifically configured to report location information of the communications terminal to the base station, so that the base station determines, according to the location information, the interference parameter about the interference that the communications terminal receives from the neighboring user terminal in the full-duplex subframe. For example, the interference parameter about the interference that the communications terminal receives from the neighboring user terminal in the full-duplex subframe includes a physical location distance from the communications terminal to the neighboring user terminal in the full-duplex subframe. The specified activation condition may include: the physical location distance to the neighboring user terminal in the full-duplex subframe is greater than or equal to a second threshold.

In some embodiments, when the uplink band of the primary carrier is the same as the downlink band of the secondary carrier, and the downlink band of the primary carrier is the same as the uplink band of the secondary carrier, the transmission control unit is further configured to use the primary carrier and the secondary carrier to perform uplink/downlink transmission independently, or use the primary carrier and the secondary carrier non-simultaneously to perform uplink/downlink transmission independently; or the transmission control unit is further configured to use the primary carrier and the secondary carrier to perform uplink transmission without performing downlink transmission, or the transmission control unit is further configured to use the primary carrier and the secondary carrier to perform downlink transmission without performing uplink transmission.

In some embodiments, the base station may use directional downlink transmission in the full-duplex subframe, where a beam corresponding to the directional downlink transmission covers the first user terminal. It is proved by tests that the use of directional downlink transmission in the full-duplex subframe by the base station helps to reduce mutual interference and further increase a system capacity.

In some embodiments, the base station may further transmit a directional downlink transmission parameter about the directional downlink transmission used in the full-duplex subframe by the base station to a neighboring base station, where the directional downlink transmission parameter includes a beam direction and/or a beam width and so on. The base station transmits the directional downlink transmission parameter to the neighboring base station, so that the neighboring base station may perform interference coordination processing accordingly, which further helps to reduce inter-cell interference and further increase the system capacity.

In some embodiments, the base station may further notify the full-duplex subframe to the neighboring base station. The base station notifies the full-duplex subframe to the neighboring base station, so that the neighboring base station may perform interference coordination processing accordingly, which further helps to reduce inter-cell interference and further increase the system capacity.

It is understandable that, functions of each functional module of the communications terminal 500 in this embodiment may be specifically implemented according to a method in a following method embodiment. For a specific implementation process thereof, reference may be made to a related description in the foregoing method embodiment, and details are not described herein.

As can be seen from above, in the technical solution of this embodiment, a communications terminal 500 in a cell receives a configuration message from a base station, where the configuration message carries a secondary configuration indication that is used to indicate a secondary transmission configuration configured by the base station for the communications terminal 500, where a primary transmission configuration of M user terminals in the cell is different from a primary transmission configuration of the communications terminal 500, the communications terminal 500 is one of the M user terminals, the primary transmission configuration may be a primary carrier, and the secondary transmission configuration is a secondary carrier; an uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier; the communications terminal 500 reports, to the base station, an interference parameter about interference that the communications terminal 500 receives from a neighboring user terminal in a full-duplex subframe, so that the base station determines, according to the interference parameter, whether to activate the secondary transmission configuration for the communications terminal 500 by using an activation message. Because the solution allows the base station to have a full-duplex communication capability, but a user terminal device still keeps a standard FDD or TDD communication capability, in this communication architecture, enhancing the base station through upgrade may increase a capacity of an entire system. It can be seen that the solution helps to apply a full-duplex technology while minimizing changes to a user terminal.

Further, because the base station determines, according to the obtained interference parameter about the interference that the communications terminal 500 receives from the neighboring user terminal in the full-duplex subframe, whether to activate the secondary transmission configuration for the communications terminal 500 by using the activation message, the base station can implement interference controllability to some extent during data transmission in the full-duplex subframe. This helps to reduce mutual interference in full-duplex communication and further helps to ensure communication quality.

Figure 6:
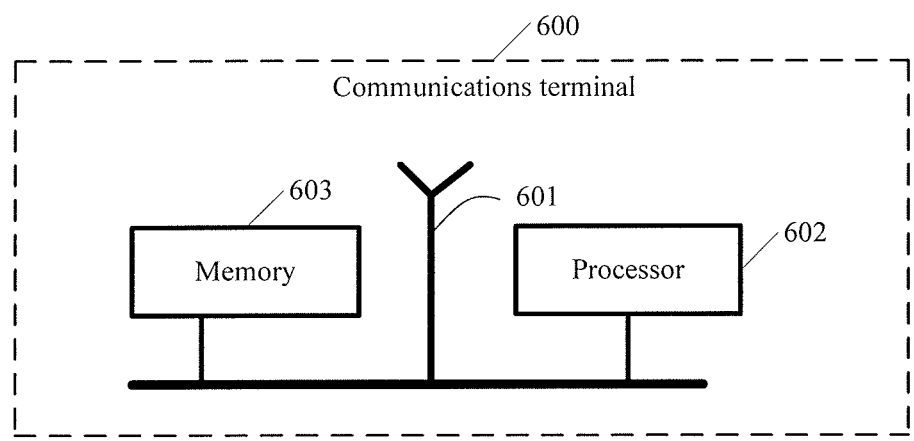
FIG. 6 is a schematic diagram of another communications terminal according to an embodiment.

Referring to FIG. 6, FIG. 6 is a schematic diagram of a communications terminal 600 according to an embodiment.

The communications terminal 600 may include an antenna 601, a processor 602, and a memory 603.

The processor 602 invokes code stored in the memory 603, so that the processor 602 is configured to receive a configuration message from a base station by using the antenna 601, where the configuration message carries a secondary configuration indication, and the secondary configuration indication is used to indicate a secondary transmission configuration configured by the base station for the communications terminal 600, where the secondary transmission configuration of the communications terminal 600 is different from a primary transmission configuration of M user terminals in a cell, the communications terminal 600 is one of the M user terminals, and M is a positive integer; report, to the base station, an interference parameter about interference that the communications terminal 600 receives from a neighboring user terminal in a full-duplex subframe; and activate, if an activation message is received from the base station, the secondary transmission configuration according to the activation message, where the activation message is transmitted after the base station determines that the interference parameter about the interference that the communications terminal 600 receives from the neighboring user terminal in the full-duplex subframe meets a specified activation condition.

The M user terminals may be some or all user terminals in the cell.

The primary transmission configuration may be a primary carrier, and the secondary transmission configuration is a secondary carrier.

An uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier.

A location of the full-duplex subframe in which interference measurement is performed by the communications terminal 600 may be explicitly or implicitly indicated by the base station, and the communications terminal 600 may perform interference measurement in the full-duplex subframe explicitly or implicitly indicated by the base station.

In some embodiments, the base station may obtain interference parameters about interference that N user terminals including the communications terminal 600 receive from neighboring user terminals in some or all full-duplex subframes. For example, the base station may explicitly or implicitly indicate a to-be-measured full-duplex subframe to the N user terminals, and the N user terminals may report, to the base station, the interference parameters about the interference that the N user terminals receive from the neighboring user terminals in the to-be-measured full-duplex subframe indicated by the base station. Certainly, the N user terminals may also voluntarily report, to the base station, the interference parameters about the interference that the N user terminals receive from the neighboring user terminals in some or all full-duplex subframes.

For example, the base station may explicitly indicate a to-be-measured full-duplex subframe to the N user terminals, that is, transmit an explicit measurement request to the N user terminals, so that interference measurement is performed based on a particular time-frequency resource, where the particular resource is the full-duplex subframe. Alternatively, the base station may implicitly indicate a to-be-measured full-duplex subframe to the N user terminals, that is, the N user terminals receive the secondary transmission configuration, and the N terminals may determine a location of the full-duplex subframe by comparing the secondary transmission configuration with the primary transmission configuration, and perform interference measurement based on the full-duplex subframe.

It should be noted that the secondary transmission configuration configured by the base station for the user terminals, and in particular, the full-duplex subframe, do not necessarily take effect immediately. For example, after the secondary transmission configuration is configured, for a user terminal for which the secondary transmission configuration is not configured, the full-duplex subframe is still an uplink subframe, but for a user terminal for which the secondary transmission configuration is configured, the full-duplex subframe may be considered as a blank subframe that can be used for measurement, that is, in the blank subframe, the user terminal for which the secondary transmission configuration is configured does not transmit an uplink signal, and does not receive a downlink signal from the base station. Some or all blank subframes may be used as subframes for measurement.

In some embodiments, the activation message and/or the configuration message may further carry an effective indication parameter, where the effective indication parameter is used to indicate an effective time of the activated secondary transmission configuration. Certainly, the activation message and/or the configuration message may also not carry the effective indication parameter, but the processor 602 may allow the activated secondary transmission configuration to take effect according to a prescribed effective time. For example, the base station and the communications terminal 600 may prescribe that the configuration takes effect in a $u^{th}$ radio frame after the activation message is delivered.

In some embodiments, the effective indication parameter may include, for example, an effective period and/or an offset. For example, the configuration message may carry the effective period, and the activation message may carry the offset; or the configuration message may carry the effective period and the offset; or the activation message may carry the effective period and the offset.

In some embodiments, assuming that the configuration message carries the effective period and that the activation message carries the offset, the base station, for example, may configure the secondary transmission configuration for multiple user terminals by using the same configuration message or by using different offsets in the activation message (for example, different user terminals may correspond to different offsets), so as to implement fair scheduling for the user terminals as much as possible and alleviate a problem of interference between the user terminals.

In some embodiments, the effective indication parameter indicates that the activated secondary transmission configuration takes effect once, or takes effect multiple times (for example, 2 times, 4 times, 8 times, 16 times, 32 times, or other times), or takes effect periodically (the effective period for taking effect periodically may be indicated by the base station or prescribed in advance or prescribed by a protocol). In a scenario in which the configuration takes effect once or takes effect for finite times (for example, 2 times, 4 times, 8 times, 16 times, 32 times, or other times), the base station may not need to indicate the effective time of the secondary transmission configuration by using the effective indication parameter. For example, it may be prescribed that the configuration takes effect in the $u^{th}$ radio frame after the activation message is delivered, where u may be a positive integer.

In some embodiments, the processor 602 may be further configured to deactivate, if a deactivation message is received from the base station after the activation message is received from the base station, the secondary transmission configuration according to the deactivation message. It is understandable that introduction of a mechanism for activating and deactivating the secondary transmission configuration helps to improve flexibility of using the secondary transmission configuration.

Certainly, in some scenarios in which the secondary transmission configuration takes effect only once or several times, the base station may also not perform the operation of deactivating the secondary transmission configuration, because the secondary transmission configuration loses effectiveness automatically after it takes effect only once or several times. It is understandable that introduction of a mechanism for automatically deactivating the secondary transmission configuration helps to reduce control signaling overheads.

An interference parameter about interference that a user terminal receives from a neighboring user terminal in the full-duplex subframe may be various parameters that can be used to represent or obtain strength of the interference that the user terminal receives from the neighboring user terminal in the full-duplex subframe.

In some embodiments, that the processor 602 reports, to the base station, an interference parameter about interference that the communications terminal 600 receives from a neighboring user terminal in a full-duplex subframe, may include: the processor 602 reports a measurement report to the base station, where the measurement report includes the interference parameter about the interference that the communications terminal 600 receives from the neighboring user terminal in the full-duplex subframe. For example, the interference parameter is used to describe energy of an uplink reference signal of the neighboring user terminal in the full-duplex subframe. For example, the specified activation condition may include: the energy of the uplink reference signal of the neighboring user terminal in the full-duplex subframe, described by the interference parameter, is less than or equal to a first threshold.

For example, the first threshold is −100 dBm, −80 dBm, −50 dBm, −40 dBm, −30 dBm, or other values that may meet requirements in actual scenarios. For example, a value range of the first threshold may be −100 dBm to −30 dBm. Certainly, the first threshold may also have other value ranges that meet requirements in actual scenarios.

In other embodiments, that the processor 602 reports, to the base station, an interference parameter about interference that the communications terminal 600 receives from a neighboring user terminal in a full-duplex subframe, includes: the processor 602 reports location information of the communications terminal 600 to the base station, so that the base station determines, according to the location information, the interference parameter about the interference that the communications terminal 600 receives from the neighboring user terminal in the full-duplex subframe.

For example, the interference parameter about the interference that the communications terminal 600 receives from the neighboring user terminal in the full-duplex subframe may include a physical location distance from the communications terminal 600 to the neighboring user terminal in the full-duplex subframe (the physical location distance from the communications terminal 600 to the neighboring user terminal in the full-duplex subframe may represent, to some extent, strength of the interference that the communications terminal 600 receives from the neighboring user terminal in the full-duplex subframe; for example, if the physical location distance is shorter, it indicates that the interference that the communications terminal 600 receives from the neighboring user terminal in the full-duplex subframe is weaker, and if the physical location distance is longer, it indicates that the interference that the communications terminal 600 receives from the neighboring user terminal in the full-duplex subframe is stronger). The specified activation condition may include: the physical location distance to the neighboring user terminal in the full-duplex subframe is greater than or equal to a second threshold.

For example, the second threshold may be 10 meters, 15 meters, 20 meters, 30 meters, 50 meters, or other values that may meet requirements in actual scenarios.

In some embodiments, if the uplink band of the primary carrier is the same as the downlink band of the secondary carrier, and the downlink band of the primary carrier is the same as the uplink band of the secondary carrier, the processor 602 uses the primary carrier and the secondary carrier to perform uplink/downlink transmission independently, or uses the primary carrier and the secondary carrier non-simultaneously to perform uplink/downlink transmission independently; or the processor 602 uses the primary carrier and the secondary carrier to perform uplink transmission without performing downlink transmission, or the processor 602 uses the primary carrier and the secondary carrier to perform downlink transmission without performing uplink transmission.

In some embodiments, the base station may use directional downlink transmission in the full-duplex subframe, where a beam corresponding to the directional downlink transmission covers the communications terminal 600. It is proved by tests that the use of directional downlink transmission in the full-duplex subframe by the base station helps to reduce mutual interference and further increase a system capacity.

In some embodiments, the base station may further transmit a directional downlink transmission parameter about the directional downlink transmission used in the full-duplex subframe by the base station to a neighboring base station, where the directional downlink transmission parameter includes a beam direction and/or a beam width and so on. The base station transmits the directional downlink transmission parameter to the neighboring base station, so that the neighboring base station may perform interference coordination processing accordingly, which further helps to reduce inter-cell interference and further increase the system capacity.

In some embodiments, the base station may further notify the full-duplex subframe to the neighboring base station. The base station notifies the full-duplex subframe to the neighboring base station, so that the neighboring base station may perform interference coordination processing accordingly, which further helps to reduce inter-cell interference and further increase the system capacity.

It is understandable that, functions of each functional module of the communications terminal 600 in this embodiment may be specifically implemented according to a method in a following method embodiment. For a specific implementation process thereof, reference may be made to a related description in the foregoing method embodiment, and details are not described herein.

As can be seen from above, in the technical solution of this embodiment, a communications terminal 600 in a cell receives a configuration message from a base station, where the configuration message carries a secondary configuration indication that is used to indicate a secondary transmission configuration configured by the base station for the communications terminal 600, where a primary transmission configuration of M user terminals in the cell is different from a primary transmission configuration of the communications terminal 600, the communications terminal 600 is one of the M user terminals, the primary transmission configuration may be a primary carrier, and the secondary transmission configuration is a secondary carrier; an uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier; the communications terminal 600 reports, to the base station, an interference parameter about interference that the communications terminal 600 receives from a neighboring user terminal in a full-duplex subframe, so that the base station determines, according to the interference parameter, whether to activate the secondary transmission configuration for the communications terminal 600 by using an activation message. Because the solution allows the base station to have a full-duplex communication capability, but a user terminal device still keeps a standard FDD or TDD communication capability, in this communication architecture, enhancing the base station through upgrade may increase a capacity of an entire system. It can be seen that the solution helps to apply a full-duplex technology while minimizing changes to a user terminal.

Further, because the base station determines, according to the obtained interference parameter about the interference that the communications terminal 600 receives from the neighboring user terminal in the full-duplex subframe, whether to activate the secondary transmission configuration for the communications terminal 600 by using the activation message, the base station can implement interference controllability to some extent during data transmission in the full-duplex subframe. This helps to reduce mutual interference in full-duplex communication and further helps to ensure communication quality.

Figure 7:
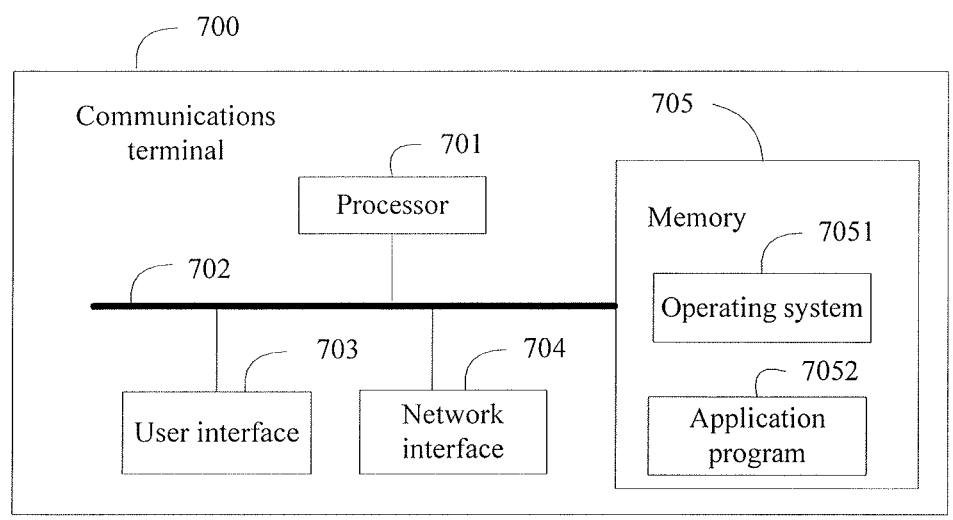
FIG. 7 is a schematic diagram of another communications terminal according to an embodiment.

Referring to FIG. 7, FIG. 7 is a structural block diagram of a communications terminal 700 according to another embodiment.

The communications terminal 700 may include at least one processor 701, at least one network interface 704 or another user interface 703, a memory 705, and at least one communications bus 702. The communications bus 702 is configured to implement connections and communication between the components. The communications terminal 700 optionally includes the user interface 703, including a display (for example, a touchscreen, an LCD, a CRT, a holographic (Holographic), or a projector (Projector)), a pointing device (for example, a mouse, a trackball (trackball), a touchpad, or a touchscreen), a camera, and/or a pickup apparatus, and so on.

The memory 705, for example, may include a read-only memory and a random access memory, and provide an instruction and data for the processor 701.

A part of the memory 705 further includes a non-volatile memory (NVRAM) and so on.

In some implementation manners, the memory 705 stores the following elements: an executable module or data structure, or a subset thereof, or an extended set thereof: an operating system 7051, including various system programs, used to implement various basic services and process hardware-based tasks; and an application program module 7052, including various application programs and configured to implement various application services.

In the embodiment, by invoking a program or an instruction stored in the memory 705, the processor 701 receives a configuration message from a base station, where the configuration message carries a secondary configuration indication, and the secondary configuration indication is used to indicate a secondary transmission configuration configured by the base station for the communications terminal 700, where the secondary transmission configuration of the communications terminal 700 is different from a primary transmission configuration of M user terminals in a cell, the communications terminal 700 is one of the M user terminals, and M is a positive integer; reports, to the base station, an interference parameter about interference that the communications terminal 700 receives from a neighboring user terminal in a full-duplex subframe; and activates, if an activation message is received from the base station, the secondary transmission configuration according to the activation message, where the activation message is transmitted after the base station determines that the interference parameter about the interference that the communications terminal 700 receives from the neighboring user terminal in the full-duplex subframe meets a specified activation condition.

The M user terminals may be some or all user terminals in the cell.

The primary transmission configuration may be a primary carrier, and the secondary transmission configuration is a secondary carrier.

An uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier.

A location of the full-duplex subframe in which interference measurement is performed by the communications terminal 700 may be explicitly or implicitly indicated by the base station, and the communications terminal 700 may perform interference measurement in the full-duplex subframe explicitly or implicitly indicated by the base station.

In some embodiments, the base station may obtain interference parameters about interference that N user terminals including the communications terminal 700 receive from neighboring user terminals in some or all full-duplex subframes. For example, the base station may explicitly or implicitly indicate a to-be-measured full-duplex subframe to the N user terminals, and the N user terminals may report, to the base station, the interference parameters about the interference that the N user terminals receive from the neighboring user terminals in the to-be-measured full-duplex subframe indicated by the base station. Certainly, the N user terminals may also voluntarily report, to the base station, the interference parameters about the interference that the N user terminals receive from the neighboring user terminals in some or all full-duplex subframes.

For example, the base station may explicitly indicate a to-be-measured full-duplex subframe to the N user terminals, that is, transmit an explicit measurement request to the N user terminals, so that interference measurement is performed based on a particular time-frequency resource, where the particular resource is the full-duplex subframe. Alternatively, the base station may implicitly indicate a to-be-measured full-duplex subframe to the N user terminals, that is, the N user terminals receive the secondary transmission configuration, and the N terminals may determine a location of the full-duplex subframe by comparing the secondary transmission configuration with the primary transmission configuration, and perform interference measurement based on the full-duplex subframe.

It should be noted that the secondary transmission configuration configured by the base station for the user terminals, and in particular, the full-duplex subframe, do not necessarily take effect immediately. For example, after the secondary transmission configuration is configured, for a user terminal for which the secondary transmission configuration is not configured, the full-duplex subframe is still an uplink subframe, but for a user terminal for which the secondary transmission configuration is configured, the full-duplex subframe may be considered as a blank subframe that can be used for measurement, that is, in the blank subframe, the user terminal for which the secondary transmission configuration is configured does not transmit an uplink signal, and does not receive a downlink signal from the base station. Some or all blank subframes may be used as subframes for measurement.

In some embodiments, the activation message and/or the configuration message may further carry an effective indication parameter, where the effective indication parameter is used to indicate an effective time of the activated secondary transmission configuration. Certainly, the activation message and/or the configuration message may also not carry the effective indication parameter, but the processor 701 may allow the activated secondary transmission configuration to take effect according to a prescribed effective time. For example, the base station and the communications terminal 700 may prescribe that the configuration takes effect in a $u^{th}$ radio frame after the activation message is delivered.

In some embodiments, the effective indication parameter may include, for example, an effective period and/or an offset. For example, the configuration message may carry the effective period, and the activation message may carry the offset; or the configuration message may carry the effective period and the offset; or the activation message may carry the effective period and the offset.

In some embodiments, assuming that the configuration message carries the effective period and that the activation message carries the offset, the base station, for example, may configure the secondary transmission configuration for multiple user terminals by using the same configuration message or by using different offsets in the activation message (for example, different user terminals may correspond to different offsets), so as to implement fair scheduling for the user terminals as much as possible and alleviate a problem of interference between the user terminals.

In some embodiments, the effective indication parameter indicates that the activated secondary transmission configuration takes effect once, or takes effect multiple times (for example, 2 times, 4 times, 8 times, 16 times, 32 times, or other times), or takes effect periodically (the effective period for taking effect periodically may be indicated by the base station or prescribed in advance or prescribed by a protocol). In a scenario in which the configuration takes effect once or takes effect for finite times (for example, 2 times, 4 times, 8 times, 16 times, 32 times, or other times), the base station may not need to indicate the effective time of the secondary transmission configuration by using the effective indication parameter. For example, it may be prescribed that the configuration takes effect in the $u^{th}$ radio frame after the activation message is delivered, where u may be a positive integer.

In some embodiments, the processor 701 may be further configured to deactivate, if a deactivation message is received from the base station after the activation message is received from the base station, the secondary transmission configuration according to the deactivation message. It is understandable that introduction of a mechanism for activating and deactivating the secondary transmission configuration helps to improve flexibility of using the secondary transmission configuration.

Certainly, in some scenarios in which the secondary transmission configuration takes effect only once or several times, the base station may also not perform the operation of deactivating the secondary transmission configuration, because the secondary transmission configuration loses effectiveness automatically after it takes effect only once or several times. It is understandable that introduction of a mechanism for automatically deactivating the secondary transmission configuration helps to reduce control signaling overheads.

An interference parameter about interference that a user terminal receives from a neighboring user terminal in the full-duplex subframe may be various parameters that can be used to represent or obtain strength of the interference that the user terminal receives from the neighboring user terminal in the full-duplex subframe.

In some embodiments, that the processor 701 reports, to the base station, an interference parameter about interference that the communications terminal 700 receives from a neighboring user terminal in a full-duplex subframe, may include: the processor 701 reports a measurement report to the base station, where the measurement report includes the interference parameter about the interference that the communications terminal 700 receives from the neighboring user terminal in the full-duplex subframe. For example, the interference parameter is used to describe energy of an uplink reference signal of the neighboring user terminal in the full-duplex subframe. For example, the specified activation condition may include: the energy of the uplink reference signal of the neighboring user terminal in the full-duplex subframe, described by the interference parameter, is less than or equal to a first threshold.

For example, the first threshold is −100 dBm, −80 dBm, −50 dBm, −40 dBm, −30 dBm, or other values that may meet requirements in actual scenarios. For example, a value range of the first threshold may be −100 dBm to −30 dBm. Certainly, the first threshold may also have other value ranges that meet requirements in actual scenarios.

In other embodiments, that the processor 701 reports, to the base station, an interference parameter about interference that the communications terminal 700 receives from a neighboring user terminal in a full-duplex subframe, includes: the processor 701 reports location information of the communications terminal 700 to the base station, so that the base station determines, according to the location information, the interference parameter about the interference that the communications terminal 700 receives from the neighboring user terminal in the full-duplex subframe.

For example, the interference parameter about the interference that the communications terminal 700 receives from the neighboring user terminal in the full-duplex subframe may include a physical location distance from the communications terminal 700 to the neighboring user terminal in the full-duplex subframe (the physical location distance from the communications terminal 700 to the neighboring user terminal in the full-duplex subframe may represent, to some extent, strength of the interference that the communications terminal 700 receives from the neighboring user terminal in the full-duplex subframe; for example, if the physical location distance is shorter, it indicates that the interference that the communications terminal 700 receives from the neighboring user terminal in the full-duplex subframe is weaker, and if the physical location distance is longer, it indicates that the interference that the communications terminal 700 receives from the neighboring user terminal in the full-duplex subframe is stronger). The specified activation condition may include: the physical location distance to the neighboring user terminal in the full-duplex subframe is greater than or equal to a second threshold.

For example, the second threshold may be 10 meters, 15 meters, 20 meters, 30 meters, 50 meters, or other values that may meet requirements in actual scenarios.

In some embodiments, if the uplink band of the primary carrier is the same as the downlink band of the secondary carrier, and the downlink band of the primary carrier is the same as the uplink band of the secondary carrier, the processor 701 uses the primary carrier and the secondary carrier to perform uplink/downlink transmission independently, or uses the primary carrier and the secondary carrier non-simultaneously to perform uplink/downlink transmission independently; or the processor 701 uses the primary carrier and the secondary carrier to perform uplink transmission without performing downlink transmission, or the processor 701 uses the primary carrier and the secondary carrier to perform downlink transmission without performing uplink transmission.

In some embodiments, the base station may use directional downlink transmission in the full-duplex subframe, where a beam corresponding to the directional downlink transmission covers the communications terminal 700. It is proved by tests that the use of directional downlink transmission in the full-duplex subframe by the base station helps to reduce mutual interference and further increase a system capacity.

In some embodiments, the base station may further transmit a directional downlink transmission parameter about the directional downlink transmission used in the full-duplex subframe by the base station to a neighboring base station, where the directional downlink transmission parameter includes a beam direction and/or a beam width and so on. The base station transmits the directional downlink transmission parameter to the neighboring base station, so that the neighboring base station may perform interference coordination processing accordingly, which further helps to reduce inter-cell interference and further increase the system capacity.

In some embodiments, the base station may further notify the full-duplex subframe to the neighboring base station. The base station notifies the full-duplex subframe to the neighboring base station, so that the neighboring base station may perform interference coordination processing accordingly, which further helps to reduce inter-cell interference and further increase the system capacity.

It is understandable that, functions of each functional module of the communications terminal 700 in this embodiment may be specifically implemented according to a method in a following method embodiment. For a specific implementation process thereof, reference may be made to a related description in the foregoing method embodiment, and details are not described herein.

As can be seen from above, in the technical solution of this embodiment, a communications terminal 700 in a cell receives a configuration message from a base station, where the configuration message carries a secondary configuration indication that is used to indicate a secondary transmission configuration configured by the base station for the communications terminal 700, where a primary transmission configuration of M user terminals in the cell is different from a primary transmission configuration of the communications terminal 700, the communications terminal 700 is one of the M user terminals, the primary transmission configuration may be a primary carrier, and the secondary transmission configuration is a secondary carrier; an uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier; the communications terminal 700 reports, to the base station, an interference parameter about interference that the communications terminal 700 receives from a neighboring user terminal in a full-duplex subframe, so that the base station determines, according to the interference parameter, whether to activate the secondary transmission configuration for the communications terminal 700 by using an activation message. Because the solution allows the base station to have a full-duplex communication capability, but a user terminal device still keeps a standard FDD or TDD communication capability, in this communication architecture, enhancing the base station through upgrade may increase a capacity of an entire system. It can be seen that the solution helps to apply a full-duplex technology while minimizing changes to a user terminal.

Further, because the base station determines, according to the obtained interference parameter about the interference that the communications terminal 700 receives from the neighboring user terminal in the full-duplex subframe, whether to activate the secondary transmission configuration for the communications terminal 700 by using the activation message, the base station can implement interference controllability to some extent during data transmission in the full-duplex subframe. This helps to reduce mutual interference in full-duplex communication and further helps to ensure communication quality.

Figure 8:
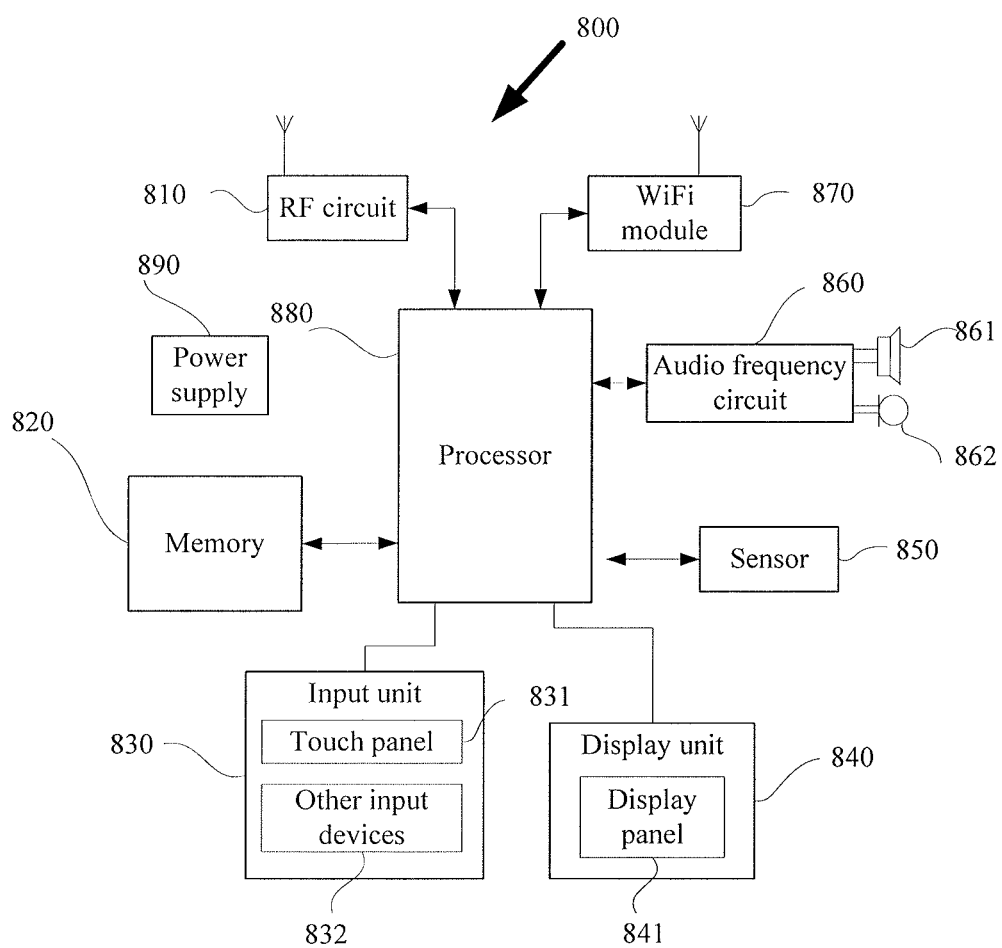
FIG. 8 is a schematic diagram of a mobile communications terminal according to an embodiment.

An embodiment further provides a schematic diagram of a mobile communications terminal 800, where the mobile communications terminal 800 may be configured to implement some or all functions of the communications terminal 500 or the communications terminal 600 or the communications terminal 700 in the foregoing embodiments. As shown in FIG. 8, for ease of description, only parts that may be related to the embodiment are illustrated. For some specific technical details that are not disclosed, reference may be made to the method part in the embodiments.

Referring to FIG. 8, the mobile communications terminal 800 includes components such as a radio frequency (Radio Frequency, RF) circuit 810, a memory 820, an input unit 830, a wireless fidelity (wireless fidelity, WiFi) module 870, a display unit 840, a sensor 850, an audio frequency circuit 860, a processor 880, and a power supply 890.

A person skilled in the art may understand that, a structure of the mobile communications terminal 800 shown in FIG. 8 does not constitute a limitation on the mobile communications terminal. The mobile communications terminal may include more or less components than those shown in the figure, or combine some components, or have different component arrangements.

The RF circuit Bio may be configured to receive or transmit signals in an information reception or transmission or call process, and in particular, after receiving downlink information from a base station, transmit the information to the processor 880 for processing, and in addition, transmit designed uplink data to the base station. Generally, the RF circuit includes but is not limited to an antenna, at least one amplifier, a transceiver, a coupler, a low noise amplifier (Low Noise Amplifier, LNA), a duplexer, and so on. In addition, the RF circuit Bio may further communicate with a network and other devices through wireless communication. The wireless communication may use any communication standard or protocol, including but not limited to the Global System for Mobile communication (Global System of Mobile communication, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), e-mail, Short Messaging Service (Short Messaging Service, SMS), and so on.

The memory 820 may be configured to store a software program and module. The processor 880 executes various function applications and data processing of the mobile communications terminal by running the software program and module stored in the memory 820. The memory 820 may mainly include a program storage area and a data storage area, where the program storage area may store an operating system, an application program required by at least one function (such as an audio playing function and an image playing function), and so on; the data storage area may store data (such as audio data and a phone book) that is created according to use of the mobile communications terminal, and so on. In addition, the memory 820 may include a high-speed random access memory, and may further include a non-volatile memory, for example, at least one magnetic disk storage, a flash memory, or other volatile solid state memories.

The input unit 830 may be configured to receive input digit or character information, and generate a key signal input related to a user setting and function control of the communications terminal 800. Specifically, the input unit 830 may include a touch panel 831 and other input devices 832. The touch panel 831, also referred to as a touchscreen, may capture a touch operation of a user on the touch panel (for example, an operation performed by the user by using any appropriate object or accessory such as a finger or a stylus on the touch panel 831 or near the touch panel 831), and drive a corresponding connection apparatus according to a preset program. Optionally, the touch panel 831 may include two parts: a touch detection apparatus and a touch controller. The touch detection apparatus detects a touch direction of the user, detects a signal generated by the touch operation, and transmits the signal to the touch controller; the touch controller receives touch information from the touch detection apparatus, converts the touch information into touch point coordinates, and transmits the touch point coordinates to the processor 880, and can receive a command transmitted by the processor 880 and execute the command. In addition, the touch panel 831 may be implemented by using multiple types such as resistive, capacitive, infrared, and surface acoustic wave. In addition to the touch panel 831, the input unit 830 may further include the other input devices 832. Specifically, the other input devices 832 may include but are not limited to one or more of a physical keyboard, a function key (such as a volume control button and a power on/off button), a trackball, a mouse, a joystick, and so on.

The display unit 840 may be configured to display information input by the user or information provided for the user and various menus of the mobile communications terminal. The display unit 840 may include a display panel 841. Optionally, the display panel 841 may be configured in forms such as a liquid crystal display (Liquid Crystal Display, LCD) and an organic light-emitting diode (Organic Light-Emitting Diode, OLED). Further, the touch panel 831 may cover the display panel 841. When the touch panel 831 detects a touch operation on or near the touch panel, the touch panel 831 transmits the touch operation to the processor 880 to determine a type of a touch event. Afterward, the processor 880 provides a corresponding visual output on the display panel 841 according to the type of the touch event. Although the touch panel 831 and the display panel 841 are used as two independent components to implement input and output functions of the mobile communications terminal in FIG. 8, the touch panel 831 and the display panel 841 may be integrated to implement input and output functions of the mobile communications terminal in some embodiments.

The mobile communications terminal 800 may further include at least one sensor 850, for example, a light sensor, a motion sensor, and other sensors. Specifically, the light sensor may include an ambient light sensor and a proximity sensor, where the ambient light sensor may adjust luminance of the display panel 841 according to brightness of ambient light, and the proximity sensor may turn off and/or backlight the display panel 841 when the mobile communications terminal moves to an ear. As a type of motion sensor, an accelerometer sensor may detect acceleration magnitudes in all directions (generally three axes), and when the accelerometer sensor is stationary, may detect a magnitude and a direction of gravity, and may be configured to recognize a posture application of the mobile communications terminal (such as switching between landscape and portrait, related games, and magnetometer posture calibration), vibration recognition related functions (such as a pedometer and stroke), and so on; as regards other sensors such as a gyroscope, a barometer, a hygrometer, a thermometer, and an infrared sensor, details are not described herein.

The audio frequency circuit 860, a speaker 861, and a microphone 862 may provide an audio interface between the user and the mobile communications terminal. The audio frequency circuit 860 may transmit an electrical signal converted from received audio data to the speaker 861, and the speaker 861 converts the electrical signal into an audio signal for outputting. On the other hand, the microphone 862 converts a captured audio signal into an electrical signal, and the audio frequency circuit 860 converts the received electrical signal into audio data, and then outputs the audio data to the processor 880 for processing; then the audio data is transmitted to another mobile communications terminal through the RF circuit 810, or the audio data is output to the memory 820 for further processing.

WiFi is a short-distance wireless transmission technology. The mobile communications terminal may help, by using the WiFi module 870, the user to send and receive e-mails, browse web pages, access streaming media, and so on. It provides wireless broadband Internet access for the user. Although FIG. 8 shows the WiFi module 870, it is understandable that, the WiFi module 870 is not a necessary component of the mobile communications terminal 800, and may be omitted according to a requirement without changing the essence of the embodiments.

The processor 880 is a control center of the mobile communications terminal. The processor 880 uses various interfaces and lines to connect all parts of the entire mobile communications terminal, and executes various functions and data processing of the mobile communications terminal by running or executing the software program and/or module stored in the memory 820 and invoking data stored in the memory 820, thereby performing overall monitoring on the mobile communications terminal. Optionally, the processor 880 may include one or more processing units. Preferably, the processor 880 may integrate an application processor and a modem processor, where the application processor mainly processes the operating system, a user interface, the application program, and so on, and the modem processor mainly processes wireless communication.

It is understandable that the modem processor may also not be integrated in the processor 880.

The mobile communications terminal 800 further includes the power supply 890 (such as a battery) that supplies power to each component.

Preferably, the power supply may be logically connected to the processor 880 by using a power management system, so as to implement functions such as charge and discharge management and power consumption management by using the power management system. Although not shown, the mobile communications terminal 800 may further include a camera, a Bluetooth module, and so on, which are not described herein.

In some embodiments, the processor 880 receives a configuration message from a base station, where the configuration message carries a secondary configuration indication, and the secondary configuration indication is used to indicate a secondary transmission configuration configured by the base station for the mobile communications terminal 800, where the secondary transmission configuration of the mobile communications terminal 800 is different from a primary transmission configuration of M user terminals in a cell, the mobile communications terminal 800 is one of the M user terminals, and M is a positive integer; reports, to the base station, an interference parameter about interference that the mobile communications terminal 800 receives from a neighboring user terminal in a full-duplex subframe; and activates, if an activation message is received from the base station, the secondary transmission configuration according to the activation message, where the activation message is transmitted after the base station determines that the interference parameter about the interference that the mobile communications terminal 800 receives from the neighboring user terminal in the full-duplex subframe meets a specified activation condition.

The M user terminals may be some or all user terminals in the cell.

The primary transmission configuration may be a primary carrier, and the secondary transmission configuration is a secondary carrier.

An uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier.

A location of the full-duplex subframe in which interference measurement is performed by the mobile communications terminal 800 may be explicitly or implicitly indicated by the base station, and the mobile communications terminal 800 may perform interference measurement in the full-duplex subframe explicitly or implicitly indicated by the base station.

In some embodiments, the base station may obtain interference parameters about interference that N user terminals including the mobile communications terminal 800 receive from neighboring user terminals in some or all full-duplex subframes. For example, the base station may explicitly or implicitly indicate a to-be-measured full-duplex subframe to the N user terminals, and the N user terminals may report, to the base station, the interference parameters about the interference that the N user terminals receive from the neighboring user terminals in the to-be-measured full-duplex subframe indicated by the base station. Certainly, the N user terminals may also voluntarily report, to the base station, the interference parameters about the interference that the N user terminals receive from the neighboring user terminals in some or all full-duplex subframes.

For example, the base station may explicitly indicate a to-be-measured full-duplex subframe to the N user terminals, that is, transmit an explicit measurement request to the N user terminals, so that interference measurement is performed based on a particular time-frequency resource, where the particular resource is the full-duplex subframe. Alternatively, the base station may implicitly indicate a to-be-measured full-duplex subframe to the N user terminals, that is, the N user terminals receive the secondary transmission configuration, and the N terminals may determine a location of the full-duplex subframe by comparing the secondary transmission configuration with the primary transmission configuration, and perform interference measurement based on the full-duplex subframe.

It should be noted that the secondary transmission configuration configured by the base station for the user terminals, and in particular, the full-duplex subframe, do not necessarily take effect immediately. For example, after the secondary transmission configuration is configured, for a user terminal for which the secondary transmission configuration is not configured, the full-duplex subframe is still an uplink subframe, but for a user terminal for which the secondary transmission configuration is configured, the full-duplex subframe may be considered as a blank subframe that can be used for measurement, that is, in the blank subframe, the user terminal for which the secondary transmission configuration is configured does not transmit an uplink signal, and does not receive a downlink signal from the base station. Some or all blank subframes may be used as subframes for measurement.

In some embodiments, the activation message and/or the configuration message may further carry an effective indication parameter, where the effective indication parameter is used to indicate an effective time of the activated secondary transmission configuration. Certainly, the activation message and/or the configuration message may also not carry the effective indication parameter, but the processor 880 may allow the activated secondary transmission configuration to take effect according to a prescribed effective time. For example, the base station and the mobile communications terminal 800 may prescribe that the configuration takes effect in a $u^{th}$ radio frame after the activation message is delivered.

In some embodiments, the effective indication parameter may include, for example, an effective period and/or an offset. For example, the configuration message may carry the effective period, and the activation message may carry the offset; or the configuration message may carry the effective period and the offset; or the activation message may carry the effective period and the offset.

In some embodiments, assuming that the configuration message carries the effective period and that the activation message carries the offset, the base station, for example, may configure the secondary transmission configuration for multiple user terminals by using the same configuration message or by using different offsets in the activation message (for example, different user terminals may correspond to different offsets), so as to implement fair scheduling for the user terminals as much as possible and alleviate a problem of interference between the user terminals.

In some embodiments, the effective indication parameter indicates that the activated secondary transmission configuration takes effect once, or takes effect multiple times (for example, 2 times, 4 times, 8 times, 16 times, 32 times, or other times), or takes effect periodically (the effective period for taking effect periodically may be indicated by the base station or prescribed in advance or prescribed by a protocol). In a scenario in which the configuration takes effect once or takes effect for finite times (for example, 2 times, 4 times, 8 times, 16 times, 32 times, or other times), the base station may not need to indicate the effective time of the secondary transmission configuration by using the effective indication parameter. For example, it may be prescribed that the configuration takes effect in the $u^{th}$ radio frame after the activation message is delivered, where u may be a positive integer.

In some embodiments, the processor 880 may be further configured to deactivate, if a deactivation message is received from the base station after the activation message is received from the base station, the secondary transmission configuration according to the deactivation message. It is understandable that introduction of a mechanism for activating and deactivating the secondary transmission configuration helps to improve flexibility of using the secondary transmission configuration.

Certainly, in some scenarios in which the secondary transmission configuration takes effect only once or several times, the base station may also not perform the operation of deactivating the secondary transmission configuration, because the secondary transmission configuration loses effectiveness automatically after it takes effect only once or several times. It is understandable that introduction of a mechanism for automatically deactivating the secondary transmission configuration helps to reduce control signaling overheads.

An interference parameter about interference that a user terminal receives from a neighboring user terminal in the full-duplex subframe may be various parameters that can be used to represent or obtain strength of the interference that the user terminal receives from the neighboring user terminal in the full-duplex subframe.

In some embodiments, that the processor 880 reports, to the base station, an interference parameter about interference that the mobile communications terminal 800 receives from a neighboring user terminal in a full-duplex subframe, may include: the processor 880 reports a measurement report to the base station, where the measurement report includes the interference parameter about the interference that the mobile communications terminal 800 receives from the neighboring user terminal in the full-duplex subframe. For example, the interference parameter is used to describe energy of an uplink reference signal of the neighboring user terminal in the full-duplex subframe. For example, the specified activation condition may include: the energy of the uplink reference signal of the neighboring user terminal in the full-duplex subframe, described by the interference parameter, is less than or equal to a first threshold.

For example, the first threshold is −100 dBm, −80 dBm, −50 dBm, −40 dBm, −30 dBm, or other values that may meet requirements in actual scenarios. For example, a value range of the first threshold may be −100 dBm to −30 dBm. Certainly, the first threshold may also have other value ranges that meet requirements in actual scenarios.

In other embodiments, that the processor 880 reports, to the base station, an interference parameter about interference that the mobile communications terminal 800 receives from a neighboring user terminal in a full-duplex subframe, includes: the processor 880 reports location information of the mobile communications terminal 800 to the base station, so that the base station determines, according to the location information, the interference parameter about the interference that the mobile communications terminal 800 receives from the neighboring user terminal in the full-duplex subframe.

For example, the interference parameter about the interference that the mobile communications terminal 800 receives from the neighboring user terminal in the full-duplex subframe may include a physical location distance from the mobile communications terminal 800 to the neighboring user terminal in the full-duplex subframe (the physical location distance from the mobile communications terminal 800 to the neighboring user terminal in the full-duplex subframe may represent, to some extent, strength of the interference that the mobile communications terminal 800 receives from the neighboring user terminal in the full-duplex subframe; for example, if the physical location distance is shorter, it indicates that the interference that the mobile communications terminal 800 receives from the neighboring user terminal in the full-duplex subframe is weaker, and if the physical location distance is longer, it indicates that the interference that the mobile communications terminal 800 receives from the neighboring user terminal in the full-duplex subframe is stronger). The specified activation condition may include: the physical location distance to the neighboring user terminal in the full-duplex subframe is greater than or equal to a second threshold.

For example, the second threshold may be 10 meters, 15 meters, 20 meters, 30 meters, 50 meters, or other values that may meet requirements in actual scenarios.

In some embodiments, if the uplink band of the primary carrier is the same as the downlink band of the secondary carrier, and the downlink band of the primary carrier is the same as the uplink band of the secondary carrier, the processor 880 uses the primary carrier and the secondary carrier to perform uplink/downlink transmission independently, or uses the primary carrier and the secondary carrier non-simultaneously to perform uplink/downlink transmission independently; or the processor 880 uses the primary carrier and the secondary carrier to perform uplink transmission without performing downlink transmission, or the processor 880 uses the primary carrier and the secondary carrier to perform downlink transmission without performing uplink transmission.

In some embodiments, the base station may use directional downlink transmission in the full-duplex subframe, where a beam corresponding to the directional downlink transmission covers the mobile communications terminal 800. It is proved by tests that the use of directional downlink transmission in the full-duplex subframe by the base station helps to reduce mutual interference and further increase a system capacity.

In some embodiments, the base station may further transmit a directional downlink transmission parameter about the directional downlink transmission used in the full-duplex subframe by the base station to a neighboring base station, where the directional downlink transmission parameter includes a beam direction and/or a beam width and so on. The base station transmits the directional downlink transmission parameter to the neighboring base station, so that the neighboring base station may perform interference coordination processing accordingly, which further helps to reduce inter-cell interference and further increase the system capacity.

In some embodiments, the base station may further notify the full-duplex subframe to the neighboring base station. The base station notifies the full-duplex subframe to the neighboring base station, so that the neighboring base station may perform interference coordination processing accordingly, which further helps to reduce inter-cell interference and further increase the system capacity.

It is understandable that, functions of each functional module of the mobile communications terminal 800 in this embodiment may be specifically implemented according to a method in a following method embodiment. For a specific implementation process thereof, reference may be made to a related description in the foregoing method embodiment, and details are not described herein.

As can be seen from above, in the technical solution of this embodiment, a mobile communications terminal 800 in a cell receives a configuration message from a base station, where the configuration message carries a secondary configuration indication that is used to indicate a secondary transmission configuration configured by the base station for the mobile communications terminal 800, where a primary transmission configuration of M user terminals in the cell is different from a primary transmission configuration of the mobile communications terminal 800, the mobile communications terminal 800 is one of the M user terminals, the primary transmission configuration may be a primary carrier, and the secondary transmission configuration is a secondary carrier; an uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier; the mobile communications terminal 800 reports, to the base station, an interference parameter about interference that the mobile communications terminal 800 receives from a neighboring user terminal in a full-duplex subframe, so that the base station determines, according to the interference parameter, whether to activate the secondary transmission configuration for the mobile communications terminal 800 by using an activation message. Because the solution allows the base station to have a full-duplex communication capability, but a user terminal device still keeps a standard FDD or TDD communication capability, in this communication architecture, enhancing the base station through upgrade may increase a capacity of an entire system. It can be seen that the solution helps to apply a full-duplex technology while minimizing changes to a user terminal.

Further, because the base station determines, according to the obtained interference parameter about the interference that the mobile communications terminal 800 receives from the neighboring user terminal in the full-duplex subframe, whether to activate the secondary transmission configuration for the mobile communications terminal 800 by using the activation message, the base station can implement interference controllability to some extent during data transmission in the full-duplex subframe. This helps to reduce mutual interference in full-duplex communication and further helps to ensure communication quality.

In an embodiment of a communication control method according to the embodiments, a communication control method may include: transmitting, by a base station, a configuration message to N user terminals in a cell, where the configuration message carries a secondary configuration indication, and the secondary configuration indication is used to indicate a secondary transmission configuration configured by the base station for the N user terminals, where the secondary transmission configuration of the N user terminals is different from a primary transmission configuration of M user terminals in the cell, the N user terminals are a subset of the M user terminals, and N and M are positive integers; obtaining, by the base station, interference parameters about interference that the N user terminals receive from neighboring user terminals in a full-duplex subframe, where the full-duplex subframe is a subframe in which the primary transmission configuration corresponds to uplink transmission and the secondary transmission configuration corresponds to downlink transmission in same subframes of a same band; and activating, by the base station, the secondary transmission configuration for K user terminals in the N user terminals by using an activation message, where interference parameters about interference that the K user terminals receive from neighboring user terminals meet a specified activation condition, the K user terminals are a subset of the N user terminals, and K is a positive integer; where the primary transmission configuration is a primary carrier, and the secondary transmission configuration is a secondary carrier; and an uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier.

Figure 9:
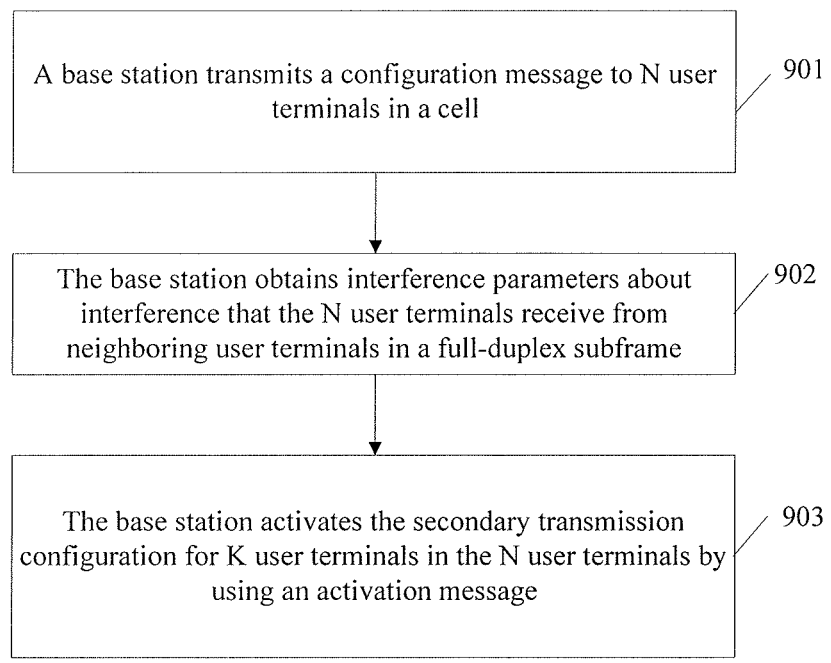
FIG. 9 is a schematic flowchart of a communication control method according to an embodiment.

Referring to FIG. 9, FIG. 9 is a schematic flowchart of a communication control method provided by an embodiment. An embodiment provides a communication control method, which may include the following content.

901. A base station transmits a configuration message to N user terminals in a cell.

The configuration message carries a secondary configuration indication, and the secondary configuration indication is used to indicate a secondary transmission configuration configured by the base station for the N user terminals, where the secondary transmission configuration of the N user terminals is different from a primary transmission configuration of M user terminals in the cell, the N user terminals are a subset of the M user terminals, and N and M are positive integers.

The M user terminals may be some or all user terminals in the cell.

The primary transmission configuration may be a primary carrier, and the secondary transmission configuration is a secondary carrier.

An uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier.

It is understandable that the base station configures the same secondary transmission configuration for the N user terminals.

For example, N is 1, 2, 3, 5, 10, 20, 30, 50, 100, or any other value.

902. The base station obtains interference parameters about interference that the N user terminals receive from neighboring user terminals in a full-duplex subframe. The full-duplex subframe is a subframe in which the primary transmission configuration corresponds to uplink transmission and the secondary transmission configuration corresponds to downlink transmission in same subframes of a same band.

In some embodiments, the base station may obtain the interference parameters about the interference that the N user terminals receive from the neighboring user terminals in some or all full-duplex subframes. For example, the base station may explicitly or implicitly indicate a to-be-measured full-duplex subframe to the N user terminals, and the N user terminals may report, to the base station, the interference parameters about the interference that the N user terminals receive from the neighboring user terminals in the to-be-measured full-duplex subframe indicated by the base station. Certainly, the N user terminals may also voluntarily report, to the base station, the interference parameters about the interference that the N user terminals receive from the neighboring user terminals in some or all full-duplex subframes.

For example, the base station may explicitly indicate a to-be-measured full-duplex subframe to the N user terminals, that is, transmit an explicit measurement request to the N user terminals, instructing the user terminals to perform interference measurement based on a particular time-frequency resource, where the particular time-frequency resource may be the full-duplex subframe. Alternatively, the base station may implicitly indicate a to-be-measured full-duplex subframe to the N user terminals, that is, the N user terminals receive the secondary transmission configuration, and the N terminals may determine a location of the full-duplex subframe by comparing the secondary transmission configuration with the primary transmission configuration, and perform interference measurement based on the full-duplex subframe.

It should be noted that the secondary transmission configuration configured by the base station for the user terminals, and in particular, the full-duplex subframe, do not necessarily take effect immediately. For example, after the secondary transmission configuration is configured, for a user terminal for which the secondary transmission configuration is not configured, the full-duplex subframe is still an uplink subframe, but for a user terminal for which the secondary transmission configuration is configured, the full-duplex subframe may be considered as a blank subframe that can be used for measurement, that is, in the blank subframe, the user terminal for which the secondary transmission configuration is configured does not transmit an uplink signal, and does not receive a downlink signal from the base station. Some or all blank subframes may be used as subframes for measurement.

903. The base station activates the secondary transmission configuration for K user terminals in the N user terminals by using an activation message.

Interference parameters about interference that the K user terminals receive from neighboring user terminals meet a specified activation condition, and the K user terminals may be a subset of the N user terminals.

After the secondary transmission configuration is activated, the base station may perform communication with the K user terminals according to the secondary transmission configuration in an effective period of the secondary transmission configuration. Certainly, after the secondary transmission configuration is activated, the base station may still perform communication with the K user terminals according to the primary transmission configuration in a period in which the secondary transmission configuration is not effective. The foregoing periods may be, for example, radio frames. Certainly, the foregoing periods may also be other granularities. For example, the foregoing periods may be subframes or timeslots. In the 3rd Generation Partnership Project (3GPP), one radio frame is 10 milliseconds, and one radio frame includes 10 subframes or 20 timeslots.

As can be seen from above, in the technical solution of this embodiment, a base station transmits a configuration message to N user terminals in a cell, where the configuration message carries a secondary configuration indication that is used to indicate a secondary transmission configuration configured by the base station for the N user terminals, where the secondary transmission configuration of the N user terminals is different from a primary transmission configuration of M user terminals in the cell, the N user terminals are a subset of the M user terminals, the primary transmission configuration may be a primary carrier, and the secondary transmission configuration is a secondary carrier; an uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier; the base station obtains interference parameters about interference that the N user terminals receive from neighboring user terminals in a full-duplex subframe; and the base station activates the secondary transmission configuration for K user terminals in the N user terminals by using an activation message according to the interference parameters. Because the solution allows the base station to have a full-duplex communication capability, but a user terminal device still keeps a standard FDD or TDD communication capability, in this communication architecture, enhancing the base station through upgrade may increase a capacity of an entire system. It can be seen that the solution helps to apply a full-duplex technology while minimizing changes to a user terminal.

Further, because the base station activates the secondary transmission configuration for the K user terminals in the N user terminals by using the activation message according to the obtained interference parameters about the interference that the N user terminals receive from the neighboring user terminals in the full-duplex subframe, the base station can implement interference controllability to some extent during data transmission in the full-duplex subframe. This helps to reduce mutual interference in full-duplex communication and further helps to ensure communication quality.

In some embodiments, the activation message and/or the configuration message may further carry an effective indication parameter, where the effective indication parameter is used to indicate an effective time of the activated secondary transmission configuration. Certainly, the activation message and/or the configuration message may also not carry the effective indication parameter, and the K user terminals may allow the activated secondary transmission configuration to take effect according to a prescribed effective time. For example, the K user terminals may prescribe that the configuration takes effect in a $u^{th}$ radio frame after the activation message is delivered.

In some embodiments, the effective indication parameter may include, for example, an effective period and/or an offset. For example, the configuration message may carry the effective period, and the activation message may carry the offset; or the configuration message may carry the effective period and the offset; or the activation message may carry the effective period and the offset.

In some embodiments, assuming that the configuration message carries the effective period and that the activation message carries the offset, the base station, for example, may configure the secondary transmission configuration for multiple user terminals by using the same configuration message or by using different offsets in the activation message (for example, different user terminals may correspond to different offsets), so as to implement fair scheduling for the user terminals as much as possible and alleviate a problem of interference between the user terminals.

In some embodiments, the effective indication parameter indicates that the activated secondary transmission configuration takes effect once, or takes effect multiple times (for example, 2 times, 4 times, 8 times, 16 times, 32 times, or other times), or takes effect periodically (the effective period for taking effect periodically may be indicated by the base station or prescribed in advance or prescribed by a protocol). In a scenario in which the configuration takes effect once or takes effect for finite times (for example, 2 times, 4 times, 8 times, 16 times, 32 times, or other times), the base station may not need to indicate the effective time of the secondary transmission configuration by using the effective indication parameter. For example, it may be prescribed that the configuration takes effect in the $u^{th}$ radio frame after the activation message is delivered.

In some embodiments, when the uplink band of the primary carrier is the same as the downlink band of the secondary carrier, and the downlink band of the primary carrier is the same as the uplink band of the secondary carrier, a first user terminal in the K user terminals, for example, may use the primary carrier and the secondary carrier to perform uplink/downlink transmission independently, or use the primary carrier and the secondary carrier non-simultaneously to perform uplink/downlink transmission independently; or the first user terminal uses the primary carrier and the secondary carrier to perform uplink transmission without performing downlink transmission, or the first user terminal uses the primary carrier and the secondary carrier to perform downlink transmission without performing uplink transmission, where the first user terminal may be any user terminal in the K user terminals.

In some embodiments, after the base station activates the secondary transmission configuration for the K user terminals in the N user terminals by using the activation message, the method may further include: the base station deactivates the activated secondary transmission configuration of some or all user terminals in the K user terminals by using a deactivation message. It is understandable that introduction of a mechanism for activating and deactivating the secondary transmission configuration helps to improve flexibility of using the secondary transmission configuration.

Certainly, in some scenarios in which the secondary transmission configuration takes effect only once or several times, the base station may also not perform the operation of deactivating the secondary transmission configuration, because the secondary transmission configuration loses effectiveness automatically after it takes effect only once or several times. It is understandable that introduction of a mechanism for automatically deactivating the secondary transmission configuration helps to reduce control signaling overheads.

An interference parameter about interference that a user terminal receives from a neighboring user terminal in the full-duplex subframe may be various parameters that can be used to represent or obtain strength of the interference that the user terminal receives from the neighboring user terminal in the full-duplex subframe.

In some embodiments, that the base station obtains interference parameters about interference that the N user terminals receive from neighboring user terminals in a full-duplex subframe may include: the base station receives measurement reports reported by the N user terminals, where a measurement report reported by each user terminal in the N user terminals includes an interference parameter about interference that the user terminal receives from a neighboring user terminal in the full-duplex subframe.

For example, the interference parameter is used to describe energy of an uplink reference signal of the neighboring user terminal in the full-duplex subframe. For example, the specified activation condition may include: the energy of the uplink reference signal of the neighboring user terminal in the full-duplex subframe, described by the interference parameter, is less than or equal to a first threshold. For example, the first threshold may be −100 dBm, −80 dBm, −50 dBm, −40 dBm, −30 dBm, or other values that may meet requirements in actual scenarios. For example, a value range of the first threshold may be −100 dBm to −30 dBm. Certainly, the first threshold may also have other value ranges that meet requirements in actual scenarios.

In other embodiments, that the base station obtains interference parameters about interference that the N user terminals receive from neighboring user terminals in a full-duplex subframe, for example, may include: the base station receives location information reported by the N user terminals, and determines, according to the location information reported by the N user terminals, the interference parameters about the interference that the N user terminals receive from the neighboring user terminals in the full-duplex subframe.

For example, the interference parameters about the interference that the N user terminals receive from the neighboring user terminals in the full-duplex subframe may include physical location distances from the N user terminals to the neighboring user terminals in the full-duplex subframe. The specified activation condition may include: the physical location distances to the neighboring user terminals in the full-duplex subframe are greater than or equal to a second threshold.

For example, the second threshold may be 10 meters, 15 meters, 20 meters, 30 meters, 50 meters, or other values that may meet requirements in actual scenarios.

In some embodiments, the base station may use directional downlink transmission in the full-duplex subframe, where a beam corresponding to the directional downlink transmission covers at least one user terminal in the K user terminals. The use of directional downlink transmission in the full-duplex subframe by the base station helps to reduce interference from the base station to a neighboring base station in uplink reception and further increase a system capacity.

In some embodiments, the base station may further transmit a directional downlink transmission parameter about the directional downlink transmission used in the full-duplex subframe by the base station to the neighboring base station, where the directional downlink transmission parameter includes a beam direction and/or a beam width and so on. The base station transmits the directional downlink transmission parameter to the neighboring base station, so that the neighboring base station may perform interference coordination processing accordingly, which further helps to reduce inter-cell interference and further increase the system capacity.

In some embodiments, the base station may notify the full-duplex subframe to the neighboring base station. The base station notifies the full-duplex subframe to the neighboring base station, so that the neighboring base station may perform interference coordination processing accordingly, which further helps to reduce inter-cell interference and further increase the system capacity.

Figure 10:
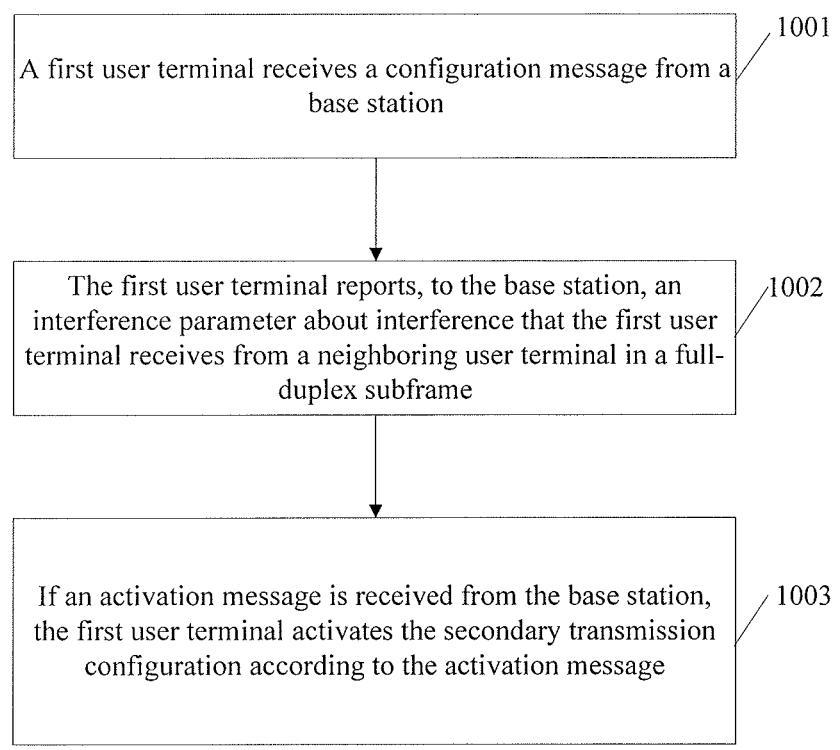
FIG. 10 is a schematic flowchart of another communication control method according to an embodiment.

Referring to FIG. 10, FIG. 10 is a schematic flowchart of another communication control method provided by another embodiment. As shown in FIG. 10, another communication control method provided by another embodiment may include the following content.

1001. A first user terminal receives a configuration message from a base station.

The configuration message carries a secondary configuration indication, and the secondary configuration indication is used to indicate a secondary transmission configuration configured by the base station for the first user terminal, where the secondary transmission configuration of the first user terminal is different from a primary transmission configuration of M user terminals in a cell, the first user terminal is one of the M user terminals, and M is a positive integer.

The M user terminals may be some or all user terminals in the cell.

The primary transmission configuration may be a primary carrier, and the secondary transmission configuration is a secondary carrier.

An uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier.

1002. The first user terminal reports, to the base station, an interference parameter about interference that the first user terminal receives from a neighboring user terminal in a full-duplex subframe.

The full-duplex subframe is a subframe in which the primary transmission configuration corresponds to uplink transmission and the secondary transmission configuration corresponds to downlink transmission in same subframes of a same band. A location of the full-duplex subframe in which interference measurement is performed by the user terminal may be explicitly or implicitly indicated by the base station, and the user terminal may perform interference measurement in the full-duplex subframe explicitly or implicitly indicated by the base station.

In some embodiments, the base station may obtain interference parameters about interference that N user terminals including the communications terminal receive from neighboring user terminals in some or all full-duplex subframes. For example, the base station may explicitly or implicitly indicate a to-be-measured full-duplex subframe to the N user terminals, and the N user terminals may report, to the base station, the interference parameters about the interference that the N user terminals receive from the neighboring user terminals in the to-be-measured full-duplex subframe indicated by the base station. Certainly, the N user terminals may also voluntarily report, to the base station, the interference parameters about the interference that the N user terminals receive from the neighboring user terminals in some or all full-duplex subframes.

For example, the base station may explicitly indicate a to-be-measured full-duplex subframe to the N user terminals, that is, transmit an explicit measurement request to the N user terminals, so that interference measurement is performed based on a particular time-frequency resource, where the particular resource is the full-duplex subframe. Alternatively, the base station may implicitly indicate a to-be-measured full-duplex subframe to the N user terminals, that is, the N user terminals receive the secondary transmission configuration, and the N terminals may determine a location of the full-duplex subframe by comparing the secondary transmission configuration with the primary transmission configuration, and perform interference measurement based on the full-duplex subframe.

It should be noted that the secondary transmission configuration configured by the base station for the user terminals, and in particular, the full-duplex subframe, do not necessarily take effect immediately. For example, after the secondary transmission configuration is configured, for a user terminal for which the secondary transmission configuration is not configured, the full-duplex subframe is still an uplink subframe, but for a user terminal for which the secondary transmission configuration is configured, the full-duplex subframe may be considered as a blank subframe that can be used for measurement, that is, in the blank subframe, the user terminal for which the secondary transmission configuration is configured does not transmit an uplink signal, and does not receive a downlink signal from the base station. Some or all blank subframes may be used as subframes for measurement.

1003. If an activation message is received from the base station, the first user terminal activates the secondary transmission configuration according to the activation message, where the activation message is transmitted after the base station determines that the interference parameter about the interference that the first user terminal receives from the neighboring user terminal in the full-duplex subframe meets a specified activation condition.

As can be seen from above, in the technical solution of this embodiment, a first user terminal in a cell receives a configuration message from a base station, where the configuration message carries a secondary configuration indication that is used to indicate a secondary transmission configuration configured by the base station for the first user terminal, where a primary transmission configuration of M user terminals in the cell is different from a primary transmission configuration of the first user terminal, the first user terminal is one of the M user terminals, the primary transmission configuration may be a primary carrier, and the secondary transmission configuration is a secondary carrier; an uplink band of the primary carrier is the same as a downlink band of the secondary carrier, and a downlink band of the primary carrier is the same as an uplink band of the secondary carrier; or a band of the primary carrier is the same as a band of the secondary carrier, and a TDD uplink-downlink configuration of the primary carrier is different from a TDD uplink-downlink configuration of the secondary carrier; the first user terminal reports, to the base station, an interference parameter about interference that the first user terminal receives from a neighboring user terminal in a full-duplex subframe, so that the base station determines, according to the interference parameter, whether to activate the secondary transmission configuration for the first user terminal by using an activation message. Because the solution allows the base station to have a full-duplex communication capability, but a user terminal device still keeps a standard FDD or TDD communication capability, in this communication architecture, enhancing the base station through upgrade may increase a capacity of an entire system. It can be seen that the solution helps to apply a full-duplex technology while minimizing changes to a user terminal.

Further, because the base station determines, according to the obtained interference parameter about the interference that the first user terminal receives from the neighboring user terminal in the full-duplex subframe, whether to activate the secondary transmission configuration for the first user terminal by using the activation message, the base station can implement interference controllability to some extent during data transmission in the full-duplex subframe. This helps to reduce mutual interference in full-duplex communication and further helps to ensure communication quality.

In some embodiments, the activation message and/or the configuration message may further carry an effective indication parameter, where the effective indication parameter is used to indicate an effective time of the activated secondary transmission configuration. Certainly, the activation message and/or the configuration message may also not carry the effective indication parameter, but the first user terminal may allow the activated secondary transmission configuration to take effect according to a prescribed effective time. For example, the base station and the first user terminal may prescribe that the configuration takes effect in a $u^{th}$ radio frame after the activation message is delivered.

In some embodiments, the effective indication parameter may include, for example, an effective period and/or an offset. For example, the configuration message may carry the effective period, and the activation message may carry the offset; or the configuration message may carry the effective period and the offset; or the activation message may carry the effective period and the offset.

In some embodiments, assuming that the configuration message carries the effective period and that the activation message carries the offset, the base station, for example, may configure the secondary transmission configuration for multiple user terminals by using the same configuration message or by using different offsets in the activation message (for example, different user terminals may correspond to different offsets), so as to implement fair scheduling for the user terminals as much as possible and alleviate a problem of interference between the user terminals.

In some embodiments, the effective indication parameter indicates that the activated secondary transmission configuration takes effect once, or takes effect multiple times (for example, 2 times, 4 times, 8 times, 16 times, 32 times, or other times), or takes effect periodically (the effective period for taking effect periodically may be indicated by the base station or prescribed in advance or prescribed by a protocol). In a scenario in which the configuration takes effect once or takes effect for finite times (for example, 2 times, 4 times, 8 times, 16 times, 32 times, or other times), the base station may not need to indicate the effective time of the secondary transmission configuration by using the effective indication parameter. For example, it may be prescribed that the configuration takes effect in the $u^{th}$ radio frame after the activation message is delivered, where u may be a positive integer.

In some embodiments, after the first user terminal receives the activation message from the base station, the method may further include: if the first user terminal receives a deactivation message from the base station, the first user terminal may deactivate the secondary transmission configuration according to the deactivation message. It is understandable that introduction of a mechanism for activating and deactivating the secondary transmission configuration helps to improve flexibility of using the secondary transmission configuration.

Certainly, in some scenarios in which the secondary transmission configuration takes effect only once or several times, the base station may also not perform the operation of deactivating the secondary transmission configuration, because the secondary transmission configuration loses effectiveness automatically after it takes effect only once or several times. It is understandable that introduction of a mechanism for automatically deactivating the secondary transmission configuration helps to reduce control signaling overheads.

An interference parameter about interference that a user terminal receives from a neighboring user terminal in the full-duplex subframe may be various parameters that can be used to represent or obtain strength of the interference that the user terminal receives from the neighboring user terminal in the full-duplex subframe.

In some embodiments, that the first user terminal reports, to the base station, an interference parameter about interference that the first user terminal receives from a neighboring user terminal in a full-duplex subframe, may include: the first user terminal reports a measurement report to the base station, where the measurement report includes the interference parameter about the interference that the first user terminal receives from the neighboring user terminal in the full-duplex subframe. For example, the interference parameter is used to describe energy of an uplink reference signal of the neighboring user terminal in the full-duplex subframe. For example, the specified activation condition may include: the energy of the uplink reference signal of the neighboring user terminal in the full-duplex subframe, described by the interference parameter, is less than or equal to a first threshold.

For example, the first threshold is −100 dBm, −80 dBm, −50 dBm, −40 dBm, −30 dBm, or other values that may meet requirements in actual scenarios. For example, a value range of the first threshold may be −100 dBm to −30 dBm. Certainly, the first threshold may also have other value ranges that meet requirements in actual scenarios.

In other embodiments, that the first user terminal reports, to the base station, an interference parameter about interference that the first user terminal receives from a neighboring user terminal in a full-duplex subframe, includes: the first user terminal reports location information of the first user terminal to the base station, so that the base station determines, according to the location information, the interference parameter about the interference that the first user terminal receives from the neighboring user terminal in the full-duplex subframe.

For example, the interference parameter about the interference that the first user terminal receives from the neighboring user terminal in the full-duplex subframe may include a physical location distance from the first user terminal to the neighboring user terminal in the full-duplex subframe (the physical location distance from the first user terminal to the neighboring user terminal in the full-duplex subframe may represent, to some extent, strength of the interference that the first user terminal receives from the neighboring user terminal in the full-duplex subframe; for example, if the physical location distance is shorter, it indicates that the interference that the first user terminal receives from the neighboring user terminal in the full-duplex subframe is weaker, and if the physical location distance is longer, it indicates that the interference that the first user terminal receives from the neighboring user terminal in the full-duplex subframe is stronger). The specified activation condition may include: the physical location distance to the neighboring user terminal in the full-duplex subframe is greater than or equal to a second threshold.

For example, the second threshold may be 10 meters, 15 meters, 20 meters, 30 meters, 50 meters, or other values that may meet requirements in actual scenarios.

In some embodiments, if the uplink band of the primary carrier is the same as the downlink band of the secondary carrier, and the downlink band of the primary carrier is the same as the uplink band of the secondary carrier, the first user terminal uses the primary carrier and the secondary carrier to perform uplink/downlink transmission independently, or uses the primary carrier and the secondary carrier non-simultaneously to perform uplink/downlink transmission independently; or the first user terminal uses the primary carrier and the secondary carrier to perform uplink transmission without performing downlink transmission, or the first user terminal uses the primary carrier and the secondary carrier to perform downlink transmission without performing uplink transmission.

In some embodiments, the base station may use directional downlink transmission in the full-duplex subframe, where a beam corresponding to the directional downlink transmission covers the first user terminal. It is proved by tests that the use of directional downlink transmission in the full-duplex subframe by the base station helps to reduce mutual interference and further increase a system capacity.

In some embodiments, the base station may further transmit a directional downlink transmission parameter about the directional downlink transmission used in the full-duplex subframe by the base station to a neighboring base station, where the directional downlink transmission parameter includes a beam direction and/or a beam width and so on. The base station transmits the directional downlink transmission parameter to the neighboring base station, so that the neighboring base station may perform interference coordination processing accordingly, which further helps to reduce inter-cell interference and further increase the system capacity.

In some embodiments, the base station may further notify the full-duplex subframe to the neighboring base station. The base station notifies the full-duplex subframe to the neighboring base station, so that the neighboring base station may perform interference coordination processing accordingly, which further helps to reduce inter-cell interference and further increase the system capacity.

For better understanding and implementing the foregoing technical solutions, the following uses some specific application scenarios as examples for description.

Referring to FIG. 11-a, FIG. 11-a is a schematic flowchart of another communication control method provided by another embodiment. A TDD scenario is mainly used as an example in this embodiment below. Another communication control method provided by another embodiment may include the following content.

1101. A base station notifies, by using a system information block (SIB) message, a primary transmission configuration configured by the base station to all user terminals in a cell, where the primary transmission configuration is a primary carrier. A TDD uplink-downlink configuration corresponding to the primary carrier may be referred to as a primary TDD uplink-downlink configuration.

1102. The base station transmits a configuration message to N user terminals. The configuration message carries a secondary configuration indication, and the secondary configuration indication is used to indicate a secondary transmission configuration configured by the base station for the N user terminals, where the secondary transmission configuration is a secondary carrier. A TDD uplink-downlink configuration corresponding to the secondary carrier may be referred to as a secondary TDD uplink-downlink configuration.

A band of the primary carrier is the same as a band of the secondary carrier, and the TDD uplink-downlink configuration of the primary carrier is different from the TDD uplink-downlink configuration of the secondary carrier.

The configuration message, for example, may be a media access layer message, a radio resource control layer message, or a message of another type. The configuration message includes an indication of performing the secondary transmission configuration by means of addition, deletion, and/or modification, and so on.

The TDD uplink-downlink configuration (such as the TDD uplink-downlink configuration of the primary carrier and the TDD uplink-downlink configuration of the secondary carrier), for example, may use seven TDD uplink-downlink configurations shown in Table 1 and defined in the 3GPP Long Term Evolution (LTE, Long Term Evolution) standard, as shown in Table 1, where D represents a downlink subframe, S represents a special subframe, and U represents an uplink subframe. Certainly, the primary TDD uplink-downlink configuration and/or secondary TDD uplink-downlink configuration in the embodiment may also introduce a new TDD uplink-downlink configuration, which is not particularly limited herein.

TABLE 1

| Uplink-downlink Configuration (uplink-downlink configuration) | Downlink-to-Uplink Switch-point periodicity (downlink-to-uplink switch-point periodicity) | Subframe number (subframe number) | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

It is understandable that the base station configures the same secondary carrier for the N user terminals. For example, N is 1, 2, 3, 5, 10, 20, 30, 50, 100, or any other value. Certainly, N is less than or equal to a total quantity of user terminals in the cell.

1103. The base station obtains interference parameters about interference that the N user terminals receive from neighboring user terminals in a full-duplex subframe. The full-duplex subframe is a subframe in which the TDD uplink-downlink configuration of the primary carrier corresponds to uplink transmission and the TDD uplink-downlink configuration of the secondary carrier corresponds to downlink transmission in same subframes of a same band.

In some embodiments, the base station may obtain the interference parameters about the interference that the N user terminals receive from the neighboring user terminals in some or all full-duplex subframes. For example, the base station may explicitly or implicitly indicate a to-be-measured full-duplex subframe to the N user terminals, and the N user terminals may report, to the base station, the interference parameters about the interference that the N user terminals receive from the neighboring user terminals in the to-be-measured full-duplex subframe indicated by the base station. Certainly, the N user terminals may also voluntarily report, to the base station, the interference parameters about the interference that the N user terminals receive from the neighboring user terminals in some or all full-duplex subframes.

1104. The base station activates the secondary transmission configuration for K user terminals in the N user terminals by using an activation message (that is, activates the TDD uplink-downlink configuration of the secondary carrier).

Interference parameters about interference that the K user terminals receive from neighboring user terminals meet a specified activation condition, and the K user terminals may be a subset of the N user terminals. Certainly, the K user terminals may further meet one or more other preset conditions.

In some embodiments, the activation message may be implemented by a physical layer message, a media access layer message, or a radio resource control layer message.

In some embodiments, the activation message and/or the configuration message may further carry an effective indication parameter, where the effective indication parameter is used to indicate an effective time of the activated secondary transmission configuration. Certainly, the activation message and/or the configuration message may also not carry the effective indication parameter, and the K user terminals may allow the activated secondary transmission configuration to take effect according to a prescribed effective time.

In some embodiments, the effective indication parameter may include, for example, an effective period and/or an offset. For example, the configuration message may carry the effective period, and the activation message may carry the offset; or the configuration message may carry the effective period and the offset; or the activation message may carry the effective period and the offset.

In some embodiments, the effective indication parameter indicates that the activated secondary transmission configuration takes effect once, or takes effect multiple times (for example, 2 times, 4 times, 8 times, 16 times, 32 times, or other times), or takes effect periodically (the effective period for taking effect periodically may be indicated by the base station or prescribed in advance or prescribed by a protocol).

For example, assuming that a user terminal receives, in a subframe numbered 5 in an $N^{th}$ frame, the activation message for activating the secondary transmission configuration, the user terminal allows the secondary transmission configuration to take effect at least in a frame after the $N^{th}$ frame. The specific subframe in which the configuration takes effect may be determined with reference to the effective period and the offset of the indicated secondary transmission configuration.

Assuming that the effective period is 160 ms and that the offset is 2, it may indicate that the secondary transmission configuration, after being activated, takes effect in a radio frame whose frame number mod 16 is equal to 2. In a case in which the configuration takes effect only once, the base station may give an indication by setting the effective period to a specific value (such as zero).

In some embodiments, after the base station activates the secondary transmission configuration for the K user terminals in the N user terminals by using the activation message, the method may further include: the base station deactivates the activated secondary transmission configuration of some or all user terminals in the K user terminals by using a deactivation message. It is understandable that introduction of a mechanism for activating and deactivating the secondary transmission configuration helps the base station to control a full-duplex communication range flexibly and further improve interference controllability.

Certainly, in some scenarios in which the secondary transmission configuration takes effect only once or several times, the base station may also not perform the operation of deactivating the secondary transmission configuration, because the secondary transmission configuration loses effectiveness automatically after it takes effect only once or several times. It is understandable that introduction of a mechanism for automatically deactivating the secondary transmission configuration helps to reduce control signaling overheads.

After the secondary transmission configuration is activated, the base station may perform communication with the K user terminals according to the secondary transmission configuration in the radio frame in which the secondary transmission configuration is effective. Certainly, after the secondary transmission configuration is activated, the base station may still perform communication with the K user terminals according to the primary transmission configuration in a radio frame in which the secondary transmission configuration is not effective.

An interference parameter about interference that a user terminal receives from a neighboring user terminal in the full-duplex subframe may be various parameters that can be used to represent or obtain strength of the interference that the user terminal receives from the neighboring user terminal in the full-duplex subframe.

In some embodiments, that the base station obtains interference parameters about interference that the N user terminals receive from neighboring user terminals in a full-duplex subframe may include: the base station receives measurement reports reported by the N user terminals, where a measurement report reported by each user terminal in the N user terminals includes an interference parameter about interference that the user terminal receives from a neighboring user terminal in the full-duplex subframe.

In some embodiments, some or all user terminals in the N user terminals may report, by using multiple sub-bands, the measurement reports carrying the interference parameters. Certainly, some or all user terminals in the N user terminals may report, by using a single sub-band, the measurement reports carrying the interference parameters.

For example, the interference parameter is used to describe energy of an uplink reference signal (for example, (SRS, sounding Reference signal)) of the neighboring user terminal in the full-duplex subframe. For example, the specified activation condition may include: the energy of the uplink reference signal of the neighboring user terminal in the full-duplex subframe, described by the interference parameter, is less than or equal to a first threshold. For example, the first threshold may be equal to −100 dBm, −80 dBm, −50 dBm, −40 dBm, −30 dBm, or other values that may meet requirements in actual scenarios. For example, a value range of the first threshold may be −100 dBm to −30 dBm. Certainly, the first threshold may also have other value ranges that meet requirements in actual scenarios.

In other embodiments, that the base station obtains interference parameters about interference that the N user terminals receive from neighboring user terminals in a full-duplex subframe may include: the base station receives location information reported by the N user terminals, and determines, according to the location information reported by the N user terminals, the interference parameters about the interference that the N user terminals receive from the neighboring user terminals in the full-duplex subframe.

For example, the interference parameters about the interference that the N user terminals receive from the neighboring user terminals in the full-duplex subframe may include physical location distances from the N user terminals to the neighboring user terminals in the full-duplex subframe. The specified activation condition may include: the physical location distances to the neighboring user terminals in the full-duplex subframe are greater than or equal to a second threshold.

For example, the second threshold may be 10 meters, 15 meters, 20 meters, 30 meters, 50 meters, or other values that may meet requirements in actual scenarios.

In some embodiments, the base station may use directional downlink transmission in the full-duplex subframe, where a beam corresponding to the directional downlink transmission covers at least one user terminal in the K user terminals. It is proved by tests that the use of directional downlink transmission in the full-duplex subframe by the base station helps to reduce mutual interference and further increase a system capacity.

For example, as shown in FIG. 11-b, FIG. 11-b illustrates a schematic diagram of directional downlink transmission used in a full-duplex subframe, for example, by a base station in a cellular network. In the full-duplex subframe, for all base stations, directional downlink transmission is coordinated in an area (such as an area 1), and omnidirectional uplink transmission is coordinated in other areas (such as an area 2 and an area 3).

Spatial isolation may be added to reduce interference. Certainly, this may introduce an additional limitation on scheduling. As shown in FIG. 11-c, a spatial area is divided into six areas, where an area 1, an area 2, and an area 3 are at a first layer, and an area 1', an area 2', and an area 3' are at a second layer. User terminals in spaces of the first layer and the second layer are scheduled non-simultaneously. In addition, at each layer, there may be only one area in which a user terminal is scheduled to receive directional downlink transmission, but uplink transmission is scheduled in other areas. When an uplink or downlink resource in an area is scheduled, neighboring spatial areas are isolated to achieve an objective of reducing interference. Certainly, herein division of spatial areas is not limited to even division. The base station may obtain, through measurement, parameters representing a location of a user terminal, and perform scheduling according to the parameters. The parameters representing the location of the user terminal, for example, may include at least one of the following parameters: a delay of a signal, an angle of arrival of the signal, and signal strength, or may even be a physical location directly. The base station may use a directional antenna to implement directional downlink transmission, so as to reduce transmit power and interference as much as possible.

As shown in FIG. 11-d, in a radio frame, the base station configures, for a user terminal in an area 1, an effective configuration whose TDD uplink-downlink configuration is a configuration numbered 0 in Table 1, and configures, for another user terminal in an area 3, an effective configuration whose TDD uplink-downlink configuration is a configuration numbered 2 in Table 1. Therefore, the base station implements full-duplex in all subframes numbered 3, 4, 8, and 9 in the radio frame. That is, there is a user terminal located in an uplink subframe U, and there is also a user terminal located in a downlink subframe D, and such subframes are full-duplex subframes. In addition, the base station may preferably use directional downlink transmission in a full-duplex subframe, so that interference caused by omnidirectional transmission to uplink signal reception of other base stations, interference to downlink reception, and so on, are reduced. When the base station selects to perform directional downlink transmission to a user terminal in the area 1, uplink signals transmitted by other user terminals in the area 1 are shielded, so that intra-cell interference between user terminals in the area 1 is reduced. The base station schedules uplink transmission of user terminals in areas except the area 1, such as areas 2 and 3, so as to reduce interference in a full-duplex cell.

In some embodiments, the base station may further transmit a directional downlink transmission parameter about the directional downlink transmission used in the full-duplex subframe by the base station to a neighboring base station, where the directional downlink transmission parameter includes a beam direction and/or a beam width and so on. The base station transmits the directional downlink transmission parameter to the neighboring base station, so that the neighboring base station may perform interference coordination processing accordingly, which further helps to reduce inter-cell interference and further increase the system capacity.

In some embodiments, the base station may notify the full-duplex subframe to the neighboring base station. The base station notifies the full-duplex subframe to the neighboring base station, so that the neighboring base station may perform interference coordination processing accordingly, which further helps to reduce inter-cell interference and further increase the system capacity.

As can be seen from above, in the technical solution of this embodiment, a base station transmits a configuration message to N user terminals in a cell, where the configuration message carries a secondary configuration indication that is used to indicate a secondary transmission configuration configured by the base station for the N user terminals, where the secondary transmission configuration of the N user terminals is different from a primary transmission configuration of M user terminals in the cell, the primary transmission configuration is a primary carrier, and the secondary transmission configuration is a secondary carrier; a band of the primary carrier is the same as a band of the secondary carrier, and a TDD uplink-downlink configuration of the primary carrier is different from a TDD uplink-downlink configuration of the secondary carrier; after the base station obtains interference parameters about interference that the N user terminals receive from neighboring user terminals in a full-duplex subframe, the base station activates the secondary transmission configuration for K user terminals in the N user terminals by using an activation message according to the interference parameters. Because the solution allows the base station to have a full-duplex communication capability, but a user terminal device still keeps a standard TDD communication capability, in this communication architecture, enhancing the base station through upgrade may increase a capacity of an entire system. It can be seen that the solution helps to apply a full-duplex technology while minimizing changes to a user terminal.

Further, because the base station activates the secondary transmission configuration for the K user terminals in the N user terminals by using the activation message according to the obtained interference parameters about the interference that the N user terminals receive from the neighboring user terminals in the full-duplex subframe, the base station can implement interference controllability to some extent during data transmission in the full-duplex subframe. This helps to reduce mutual interference in full-duplex communication and further helps to ensure communication quality.

Figure 12:
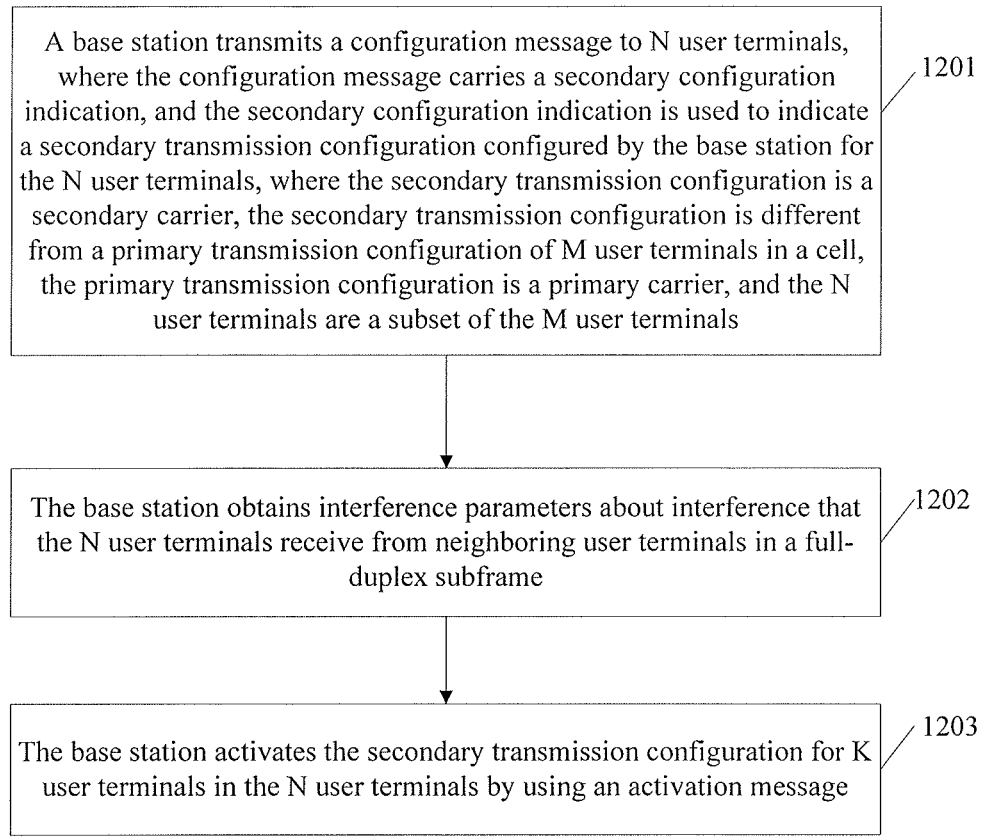
FIG. 12 is a schematic flowchart of another communication control method according to an embodiment.

Referring to FIG. 12, FIG. 12 is a schematic flowchart of another communication control method provided by another embodiment. An FDD scenario is mainly used as an example in this embodiment below. Another communication control method provided by another embodiment may include the following content.

1201. A base station transmits a configuration message to N user terminals. The configuration message carries a secondary configuration indication, and the secondary configuration indication is used to indicate a secondary transmission configuration configured by the base station for the N user terminals. The secondary transmission configuration is a secondary carrier, the secondary carrier is different from a primary transmission configuration of M user terminals in a cell, the primary transmission configuration is a primary carrier, and the N user terminals are a subset of the M user terminals.

The M user terminals may be some or all user terminals in the cell.

The M user terminals in the cell may determine the primary transmission configuration by search.

An uplink band of the primary carrier is the same as a downlink band of the secondary carrier, and a downlink band of the primary carrier is the same as an uplink band of the secondary carrier.

The configuration message, for example, may be a media access layer message, a radio resource control layer message, or a message of another type. The configuration message includes an indication of performing the secondary transmission configuration by means of addition, deletion, and/or modification, and so on.

It is understandable that the base station may configure the same secondary carrier for the N user terminals. For example, N is 1, 2, 3, 5, 10, 20, 30, 50, 100, or any other value. Certainly, N is less than or equal to M.

1202. The base station obtains interference parameters about interference that the N user terminals receive from neighboring user terminals in a full-duplex subframe.

The full-duplex subframe is a subframe in which the primary carrier corresponds to uplink transmission and the secondary carrier corresponds to downlink transmission in same subframes of a same band.

In some embodiments, the base station may obtain the interference parameters about the interference that the N user terminals receive from the neighboring user terminals in some or all full-duplex subframes. For example, the base station may explicitly or implicitly indicate a to-be-measured full-duplex subframe to the N user terminals, and the N user terminals may report, to the base station, the interference parameters about the interference that the N user terminals receive from the neighboring user terminals in the to-be-measured full-duplex subframe indicated by the base station. Certainly, the N user terminals may also voluntarily report, to the base station, the interference parameters about the interference that the N user terminals receive from the neighboring user terminals in some or all full-duplex subframes.

1203. The base station activates the secondary transmission configuration for K user terminals in the N user terminals by using an activation message.

Interference parameters about interference that the K user terminals receive from neighboring user terminals meet a specified activation condition, and the K user terminals may be a subset of the N user terminals. Certainly, the K user terminals may further meet one or more other preset conditions.

In some embodiments, the activation message may be implemented by a physical layer message, a media access layer message, or a radio resource control layer message.

In some embodiments, the activation message and/or the configuration message may further carry an effective indication parameter, where the effective indication parameter is used to indicate an effective time of the activated secondary transmission configuration. Certainly, the activation message and/or the configuration message may also not carry the effective indication parameter, and the K user terminals may allow the activated secondary transmission configuration to take effect according to a prescribed effective time.

In some embodiments, the effective indication parameter may include, for example, an effective period and/or an offset. For example, the configuration message may carry the effective period, and the activation message may carry the offset; or the configuration message may carry the effective period and the offset; or the activation message may carry the effective period and the offset.

In some embodiments, the effective indication parameter indicates that the activated secondary transmission configuration takes effect once, or takes effect multiple times (for example, 2 times, 4 times, 8 times, 16 times, 32 times, or other times), or takes effect periodically (the effective period for taking effect periodically may be indicated by the base station or prescribed in advance or prescribed by a protocol).

For example, assuming that a user terminal receives, in a subframe numbered 5 in an $N^{th}$ frame, the activation message for activating the secondary carrier, the user terminal allows the secondary carrier to take effect at least in a frame after the $N^{th}$ frame. The specific subframe in which the secondary carrier takes effect may be determined with reference to the effective period and the offset of the configured secondary carrier.

Assuming that the effective period is 160 ms and that the offset is 2, it may indicate that the secondary carrier, after being activated, takes effect in a radio frame whose frame number mod 16 is equal to 2. In a case in which the secondary carrier takes effect only once, the base station may give an indication by setting the effective period to a specific value (such as zero).

In some embodiments, after the base station activates the secondary transmission configuration for the K user terminals in the N user terminals by using the activation message, the method may further include: the base station deactivates the activated secondary transmission configuration of some or all user terminals in the K user terminals by using a deactivation message. It is understandable that introduction of a mechanism for activating and deactivating the secondary transmission configuration helps to improve flexibility of using the secondary transmission configuration.

Certainly, in some scenarios in which the secondary transmission configuration takes effect only once or several times, the base station may also not perform the operation of deactivating the secondary transmission configuration, because the secondary transmission configuration loses effectiveness automatically after it takes effect only once or several times. It is understandable that introduction of a mechanism for automatically deactivating the secondary transmission configuration helps to reduce control signaling overheads.

An interference parameter about interference that a user terminal receives from a neighboring user terminal in the full-duplex subframe may be various parameters that can be used to represent or obtain strength of the interference that the user terminal receives from the neighboring user terminal in the full-duplex subframe.

In some embodiments, that the base station obtains interference parameters about interference that the N user terminals receive from neighboring user terminals in a full-duplex subframe may include: the base station receives measurement reports reported by the N user terminals, where a measurement report reported by each user terminal in the N user terminals includes an interference parameter about interference that the user terminal receives from a neighboring user terminal in the full-duplex subframe. In some embodiments, some or all user terminals in the N user terminals may report, by using multiple sub-bands, the measurement reports carrying the interference parameters. Certainly, some or all user terminals in the N user terminals may report, by using a single sub-band, the measurement reports carrying the interference parameters.

For example, the interference parameter is used to describe energy of an uplink reference signal (for example, an SRS) of the neighboring user terminal in the full-duplex subframe. For example, the specified activation condition may include: the energy of the uplink reference signal of the neighboring user terminal in the full-duplex subframe, described by the interference parameter, is less than or equal to a first threshold.

For example, the first threshold may be −100 dBm, −80 dBm, −50 dBm, −40 dBm, −30 dBm, or other values that may meet requirements in actual scenarios. For example, a value range of the first threshold may be −100 dBm to −30 dBm. Certainly, the first threshold may also have other value ranges that meet requirements in actual scenarios.

In other embodiments, that the base station obtains interference parameters about interference that the N user terminals receive from neighboring user terminals in a full-duplex subframe may include: the base station receives location information (such as a delay of a signal, an angle of arrival of the signal, and signal strength, or may even be a physical location) reported by the N user terminals, and determines, according to the location information reported by the N user terminals, the interference parameters about the interference that the N user terminals receive from the neighboring user terminals in the full-duplex subframe.

For example, the interference parameters about the interference that the N user terminals receive from the neighboring user terminals in the full-duplex subframe may include physical location distances from the N user terminals to the neighboring user terminals in the full-duplex subframe. The specified activation condition may include: the physical location distances to the neighboring user terminals in the full-duplex subframe are greater than or equal to a second threshold.

For example, the second threshold may be 10 meters, 15 meters, 20 meters, 30 meters, 50 meters, or other values that may meet requirements in actual scenarios.

In some embodiments, the base station may use directional downlink transmission in the full-duplex subframe, where a beam corresponding to the directional downlink transmission covers at least one user terminal in the K user terminals. It is proved by tests that the use of directional downlink transmission in the full-duplex subframe by the base station helps to reduce mutual interference and further increase a system capacity.

For example, as shown in FIG. 11-*b*, FIG. 11-*b* illustrates a schematic diagram of directional downlink transmission used in a full-duplex subframe, for example, by a base station in a cellular network. In the full-duplex subframe, for all base stations, directional downlink transmission is coordinated in an area (such as an area 1), and omnidirectional uplink transmission is coordinated in other areas (such as an area 2 and an area 3).

Spatial isolation may be added to reduce interference. Certainly, this may introduce an additional limitation on scheduling. As shown in FIG. 11-*c*, a spatial area is divided into six areas, where an area 1, an area 2, and an area 3 are at a first layer, and an area 1', an area 2', and an area 3' are at a second layer. User terminals in spaces of the first layer and the second layer are scheduled non-simultaneously. In addition, at each layer, there may be only one area in which a user terminal is scheduled to receive directional downlink transmission, but uplink transmission is scheduled in other areas. When an uplink or downlink resource in an area is scheduled, neighboring spatial areas are isolated to achieve an objective of reducing interference. Certainly, herein division of spatial areas is not limited to even division. The base station may obtain, through measurement, parameters representing a location of a user terminal, and perform scheduling according to the parameters. The parameters representing the location of the user terminal, for example, may include at least one of the following parameters: a delay of a signal, an angle of arrival of the signal, and signal strength, or may even be a physical location directly. The base station may use a directional antenna to implement directional downlink transmission, so as to reduce transmit power and interference as much as possible.

In some embodiments, the base station may use directional downlink transmission in the full-duplex subframe, where a beam corresponding to the directional downlink transmission covers at least one user terminal in the K user terminals. It is proved by tests that the use of directional downlink transmission in the full-duplex subframe by the base station helps to reduce mutual interference and further increase a system capacity.

In some embodiments, the base station may further transmit a directional downlink transmission parameter about the directional downlink transmission used in the full-duplex subframe by the base station to a neighboring base station, where the directional downlink transmission parameter includes a beam direction and/or a beam width and so on. The base station transmits the directional downlink transmission parameter to the neighboring base station, so that the neighboring base station may perform interference coordination processing accordingly, which further helps to reduce inter-cell interference and further increase the system capacity.

In some embodiments, the base station may notify the full-duplex subframe to the neighboring base station. The base station notifies the full-duplex subframe to the neighboring base station, so that the neighboring base station may perform interference coordination processing accordingly, which further helps to reduce inter-cell interference and further increase the system capacity.

Because an FDD terminal may work in two bands, with $f_1$ for uplink transmission and $f_2$ for downlink transmission in the primary carrier, for an FDD user terminal, the base station may further define a use relationship between the secondary carrier and the primary carrier, so as to distinguish from a carrier aggregation technology. When the base station activates the secondary carrier ($f_2$ for uplink transmission and $f_1$ for downlink transmission), because a user terminal not supporting single channel full-duplex actually does not have a capability of performing transmission and reception simultaneously on $f_1$ or $f_2$, the base station needs to avoid this case. Allowed cases are: both $f_1$ and $f_2$ are used for reception; both $f_1$ and $f_2$ are used for transmission; $f_1$ is used for transmission but $f_2$ is used for reception; or $f_2$ is used for transmission but $f_1$ is used for reception.

For example, in some embodiments, when the primary transmission configuration is the primary carrier and the secondary transmission configuration is the secondary carrier, a first user terminal in the K user terminals, for example, may use the primary carrier and the secondary carrier to perform uplink/downlink transmission independently, or use the primary carrier and the secondary carrier non-simultaneously to perform uplink/downlink transmission independently; or the first user terminal uses the primary carrier and the secondary carrier to perform uplink transmission without performing downlink transmission, or the first user terminal uses the primary carrier and the secondary carrier to perform downlink transmission without performing uplink transmission. The first user terminal may be any user terminal in the K user terminals.

As can be seen from above, in the technical solution of this embodiment, a base station transmits a configuration message to N user terminals in a cell, where the configuration message carries a secondary configuration indication that is used to indicate a secondary transmission configuration configured by the base station for the N user terminals, where the secondary transmission configuration of the N user terminals is different from a primary transmission configuration of M user terminals in the cell, the N user terminals are a subset of the M user terminals, the primary transmission configuration is a primary carrier, and the secondary transmission configuration is a secondary carrier; an uplink band of the primary carrier is the same as a downlink band of the secondary carrier, and a downlink band of the primary carrier is the same as an uplink band of the secondary carrier; the base station obtains interference parameters about interference that the N user terminals receive from neighboring user terminals in a full-duplex subframe; and the base station activates the secondary transmission configuration for K user terminals in the N user terminals by using an activation message according to the interference parameters. Because the solution allows the base station to have a full-duplex communication capability, but a user terminal device still keeps a standard FDD or TDD communication capability, in this communication architecture, enhancing the base station through upgrade may increase a capacity of an entire system. It can be seen that the solution helps to apply a full-duplex technology while minimizing changes to a user terminal.

Further, because the base station activates the secondary transmission configuration for the K user terminals in the N user terminals by using the activation message according to the obtained interference parameters about the interference that the N user terminals receive from the neighboring user terminals in the full-duplex subframe, the base station can implement interference controllability to some extent during data transmission in the full-duplex subframe. This helps to reduce mutual interference in full-duplex communication and further helps to ensure communication quality.

An embodiment further provides a computer storage medium. The computer storage medium may store a program. When being executed, the program includes some or all steps of the communication control method described in the foregoing method embodiments.

In the foregoing embodiments, the description of each embodiment has respective focuses. For a part that is not described in detail in an embodiment, reference may be made to related descriptions in other embodiments.

It should be noted that, for brief description, the foregoing method embodiments are represented as a series of actions. However, a person skilled in the art should appreciate that the embodiments are not limited to the described order of the actions, because according to the embodiments, some steps may be performed in other orders or simultaneously. In addition, a person skilled in the art should also understand that all the embodiments described in this specification belong to exemplary embodiments, and the involved actions and modules are not necessarily mandatory to the embodiments.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the embodiments essentially, or the part contributing, or all or a part of the technical solutions may be implemented in the form of a software product. The software product is stored in a storage medium and includes several instructions for instructing a computer device (which may be a personal computer, a server, or a network device, and may specifically be a processor in a computer device) to perform all or a part of the steps of the foregoing methods described in the embodiments. The foregoing storage medium may include: any medium that can store program code, such as a universal serial bus (USB) flash drive, a removable hard disk, a magnetic disk, an optical disc, a read-only memory (ROM), or a random access memory (RAM).

The foregoing embodiments are merely intended for describing the technical solutions of the embodiments, but not for limiting the embodiments. Although the embodiments are described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. A base station comprising:
an antenna;
a processor coupled to the antenna; and
a non-transitory computer readable storage medium storing a program for execution by the processor, the program including instructions to:
transmit, by the base station to N user terminals using the antenna, a configuration message, wherein the configuration message carries a secondary configuration indication, the secondary configuration indication indicating a secondary transmission configuration configured by the base station for the N user terminals, and wherein the secondary transmission configuration of the N user terminals is different from a primary transmission configuration of M user terminals in a cell, the N user terminals being a subset of the M user terminals, and N and M being positive integers;
obtain interference parameters about interference that the N user terminals receive from neighboring user terminals in a full-duplex subframe, wherein the full-duplex subframe is a subframe in which the primary transmission configuration corresponds to uplink transmission and the secondary transmission configuration corresponds to downlink transmission in the same subframes of the same band;
activate the secondary transmission configuration for K user terminals of the N user terminals using an activation message, wherein interference parameters about interference that the K user terminals receive from neighboring user terminals meet a specified activation condition, the K user terminals being a subset of the N user terminals, and K being a positive integer; and
use directional downlink transmission in the full-duplex subframe, wherein a beam corresponding to the directional downlink transmission covers at least one user terminal of the K user terminals,
wherein the primary transmission configuration is a primary carrier, and the secondary transmission configuration is a secondary carrier, and
wherein an uplink band of the primary carrier is the same as a downlink band of the secondary carrier, and a downlink band of the primary carrier is the same as an uplink band of the secondary carrier, or a band of the primary carrier is the same as a band of the secondary carrier, and a time division duplex (TDD) uplink-downlink configuration of the primary carrier is different from a TDD uplink-downlink configuration of the secondary carrier.

2. The base station according to claim 1, wherein at least one of the activation message or the configuration message further carries an effective indication parameter, and wherein the effective indication parameter indicates an effective time of the activated secondary transmission configuration.

3. The base station according to claim 1, wherein the instructions to obtain the interference parameters about the interference that the N user terminals receive from the neighboring user terminals in the full-duplex subframe further comprise instructions to receive measurement reports reported by the N user terminals, and wherein a measurement report reported by each user terminal of the N user terminals comprises an interference parameter about interference that the corresponding user terminal receives from a neighboring user terminal in the full-duplex subframe.

4. The base station according to claim 3, wherein the interference parameter describes energy of an uplink reference signal of the neighboring user terminal in the full-duplex subframe.

5. The base station according to claim 1, wherein the instructions to obtain the interference parameters about the interference that the N user terminals receive from the neighboring user terminals in the full-duplex subframe, comprise instructions to receive location information reported by the N user terminals, and determine, according to the location information reported by the N user terminals, the interference parameters about the interference that the N user terminals receive from the neighboring user terminals in the full-duplex subframe.

6. A communications terminal comprising:
an antenna;
a processor coupled to the antenna; and
a non-transitory computer readable storage medium storing a program for execution by the processor, the program including instructions to:
receive, from a base station using the antenna, a configuration message, wherein the configuration message carries a secondary configuration indication, the secondary configuration indication indicating a secondary transmission configuration configured by the base station for the communications terminal, and wherein the secondary transmission configuration of the communications terminal is different from a primary transmission configuration of M user terminals in a cell, the communications terminal being one of the M user terminals and M being a positive integer;
report, to the base station, an interference parameter about interference that the communications terminal receives from a neighboring user terminal in a full-duplex subframe, wherein the instructions to report comprise instructions to report location information of the communications terminal to the base station so that the base station can determine, according to the location information, the interference parameter about the interference that the communications terminal receives from the neighboring user terminal in the full-duplex subframe; and
activate the secondary transmission configuration according to an activation message in response to receiving the activation message from the base station, wherein the activation message is transmitted after the base station determines that the interference parameter about the interference that the communications terminal receives from the neighboring user terminal in the full-duplex subframe meets a specified activation condition, wherein the primary transmission configuration is a primary carrier and the secondary transmission configuration is a secondary carrier, and wherein an uplink band of the primary carrier is the same as a downlink band of the secondary carrier, and a downlink band of the primary carrier is the same as an uplink band of the secondary carrier, or a band of the primary carrier is the same as a band of the secondary carrier, and a time division duplex (TDD) uplink-downlink configuration of the primary carrier is different from a TDD uplink-downlink configuration of the secondary carrier.

7. The communications terminal according to claim 6, wherein at least one of the activation message or the configuration message further carries an effective indication parameter, and wherein the effective indication parameter indicates an effective time of the activated secondary transmission configuration and to allow the secondary transmission configuration to be activated according to the activation message to take effect at the effective time indicated by the effective indication parameter.

8. The communications terminal according to claim 6, wherein the instructions to report, to the base station, the interference parameter about the interference that the communications terminal receives from the neighboring user terminal in the full-duplex subframe further comprises instructions to report a measurement report to the base station, and wherein the measurement report comprises the interference parameter about the interference that the communications terminal receives from the neighboring user terminal in the full-duplex subframe.

9. The communications terminal according to claim 8, wherein the interference parameter describes energy of an uplink reference signal of the neighboring user terminal in the full-duplex subframe.

10. The communications terminal according to claim 6, wherein when the uplink band of the primary carrier is the same as the downlink band of the secondary carrier, wherein the downlink band of the primary carrier is the same as the uplink band of the secondary carrier, and wherein the instructions further comprise instructions to use the primary carrier and the secondary carrier to perform uplink/downlink transmission independently, to use the primary carrier and the secondary carrier non-simultaneously to perform uplink/downlink transmission independently, to use the primary carrier and the secondary carrier to perform uplink transmission without performing downlink transmission, or to perform downlink transmission without performing uplink transmission.

11. A method comprising:
transmitting, by a base station to N user terminals in a cell, a configuration message, wherein the configuration message carries a secondary configuration indication, the secondary configuration indication indicating a secondary transmission configuration configured by the base station for the N user terminals, and wherein the secondary transmission configuration of the N user terminals is different from a primary transmission configuration of M user terminals in the cell, the N user terminals being a subset of the M user terminals, and N and M being positive integers;

obtaining, by the base station, interference parameters about interference that the N user terminals receive from neighboring user terminals in a full-duplex subframe, wherein obtaining the interference parameters comprises:
receiving, by the base station, location information reported by the N user terminals, and
determining, according to the location information reported by the N user terminals, the interference parameters about the interference that the N user terminals receive from the neighboring user terminals in the full-duplex subframe, wherein the full-duplex subframe is a subframe in which the primary transmission configuration corresponds to uplink transmission and the secondary transmission configuration corresponds to downlink transmission in the same subframes of the same band; and activating, by the base station, the secondary transmission configuration for K user terminals in the N user terminals by using an activation message, wherein interference parameters about interference that the K user terminals receive from neighboring user terminals meet a specified activation condition, the K user terminals being a subset of the N user terminals and K being a positive integer, wherein the primary transmission configuration is a primary carrier, and the secondary transmission configuration is a secondary carrier, and wherein an uplink band of the primary carrier is the same as a downlink band of the secondary carrier, and a downlink band of the primary carrier is the same as an uplink band of the secondary carrier, or a band of the primary carrier is the same as a band of the secondary carrier, and a time division duplex (TDD) uplink-downlink configuration of the primary carrier is different from a TDD uplink-downlink configuration of the secondary carrier.

12. The method according to claim 11, wherein at least one of the activation message or the configuration message further carries an effective indication parameter, and wherein the effective indication parameter indicates an effective time of the activated secondary transmission configuration.

13. The method according to claim 11, wherein obtaining, by the base station, the interference parameters about interference that the N user terminals receive from neighboring user terminals in the full-duplex subframe comprises receiving, by the base station, measurement reports reported by the N user terminals, wherein a measurement report reported by each user terminal in the N user terminals comprises an interference parameter about interference that the corresponding user terminal receives from a neighboring user terminal in the full-duplex subframe.

14. The method according to claim 13, wherein the interference parameter describes energy of an uplink reference signal of the neighboring user terminal in the full-duplex subframe.

15. The method according to claim 11, further comprising using, by the base station, directional downlink transmission in the full-duplex subframe, wherein a beam corresponding to the directional downlink transmission covers at least one user terminal in the K user terminals.

16. A method comprising:
receiving, by a first user terminal from a base station, a configuration message, wherein the configuration message carries a secondary configuration indication, the secondary configuration indication being used to indicate a secondary transmission configuration configured by the base station for the first user terminal, and wherein the secondary transmission configuration of the first user terminal is different from a primary transmission configuration of M user terminals in a cell, the first user terminal being one of the M user terminals and M being a positive integer;

reporting, by the first user terminal to the base station, an interference parameter about interference that the first user terminal receives from a neighboring user terminal in a full-duplex subframe; and activating, by the first user terminal, the secondary transmission configuration according to an activation message in response to receiving the activation message from the base station, wherein the activation message is transmitted after the base station determines that the interference parameter about the interference that the first user terminal receives from the neighboring user terminal in the full-duplex subframe meets a specified activation condition, wherein the primary transmission configuration is a primary carrier and the secondary transmission configuration is a secondary carrier, wherein an uplink band of the primary carrier is the same as a downlink band of the secondary carrier, and a downlink band of the primary carrier is the same as an uplink band of the secondary carrier, or a band of the primary carrier is the same as a band of the secondary carrier, and a time division duplex (TDD) uplink-downlink configuration of the primary carrier is different from a TDD uplink-downlink configuration of the secondary carrier, wherein the first user terminal uses the primary carrier and the secondary carrier to Perform uplink/downlink transmission independently, or uses the primary carrier and the secondary carrier non-simultaneously to perform uplink/downlink transmission independently in response to the uplink band of the primary carrier being the same as the downlink band of the secondary carrier, and the downlink band of the primary carrier being the same as the uplink band of the secondary carrier, and wherein the first user terminal uses the primary carrier and the secondary carrier to Perform uplink transmission without performing downlink transmission, or the first user terminal uses the primary carrier and the secondary carrier to perform downlink transmission without performing uplink transmission.

17. The method according to claim 16, wherein at least one of the activation message or the configuration message further carries an effective indication parameter, and wherein the effective indication parameter indicates an effective time of the activated secondary transmission configuration.

18. The method according to claim 16, wherein reporting, by the first user terminal, to the base station, the interference parameter about interference that the first user terminal receives from a neighboring user terminal in a full-duplex subframe comprises reporting, by the first user terminal, a measurement report to the base station, wherein the measurement report comprises the interference parameter about the interference that the first user terminal receives from the neighboring user terminal in the full-duplex subframe.

19. The method according to claim 18, wherein the interference parameter is used to describe energy of an uplink reference signal of the neighboring user terminal in the full-duplex subframe.

20. The method according to claim 16, wherein reporting, by the first user terminal, to the base station, the interference parameter about interference that the first user terminal receives from a neighboring user terminal in a full-duplex subframe comprises reporting, by the first user terminal, location information of the first user terminal to the base station so that the base station is able to determine, according to the location information, the interference parameter about the interference that the first user terminal receives from the neighboring user terminal in the full-duplex subframe.

* * * * *